Sept. 15, 1970 J. R. LOURIE 3,529,298

GRAPHICAL DESIGN OF TEXTILES

Filed Aug. 23, 1967 52 Sheets-Sheet 1

INVENTOR
JANICE RICHMOND LOURIE

BY Charles P. Boberg
ATTORNEY

Sept. 15, 1970 J. R. LOURIE 3,529,298

GRAPHICAL DESIGN OF TEXTILES

Filed Aug. 23, 1967 52 Sheets-Sheet 2

Sept. 15, 1970 J. R. LOURIE 3,529,298

GRAPHICAL DESIGN OF TEXTILES

Filed Aug. 23, 1967 52 Sheets-Sheet 4

Sept. 15, 1970 J. R. LOURIE 3,529,298

GRAPHICAL DESIGN OF TEXTILES

Filed Aug. 23, 1967 52 Sheets-Sheet 7

Sept. 15, 1970 J. R. LOURIE 3,529,298

GRAPHICAL DESIGN OF TEXTILES

Filed Aug. 23, 1967 52 Sheets-Sheet 8

SCAN

"S" ROUTINE

Sept. 15, 1970 J. R. LOURIE 3,529,298

GRAPHICAL DESIGN OF TEXTILES

Filed Aug. 23, 1967 52 Sheets-Sheet 16

GRAPHICAL DESIGN OF TEXTILES

Filed Aug. 23, 1967 52 Sheets-Sheet 17

Sept. 15, 1970 J. R. LOURIE 3,529,298

GRAPHICAL DESIGN OF TEXTILES

Filed Aug. 23, 1967 52 Sheets-Sheet 19

Sept. 15, 1970 J. R. LOURIE 3,529,298

GRAPHICAL DESIGN OF TEXTILES

Filed Aug. 23, 1967 52 Sheets-Sheet 20

Sept. 15, 1970 J. R. LOURIE 3,529,298

GRAPHICAL DESIGN OF TEXTILES

Filed Aug. 23, 1967 52 Sheets-Sheet 21

Sept. 15, 1970 J. R. LOURIE 3,529,298

GRAPHICAL DESIGN OF TEXTILES

Filed Aug. 23, 1967 52 Sheets-Sheet 25

Sept. 15, 1970 J. R. LOURIE 3,529,298

GRAPHICAL DESIGN OF TEXTILES

Filed Aug. 23, 1967 52 Sheets-Sheet 26

LABEL "L" ROUTINE

FIG. 28 LA ROUTINE, FIG. 29 LB ROUTINE
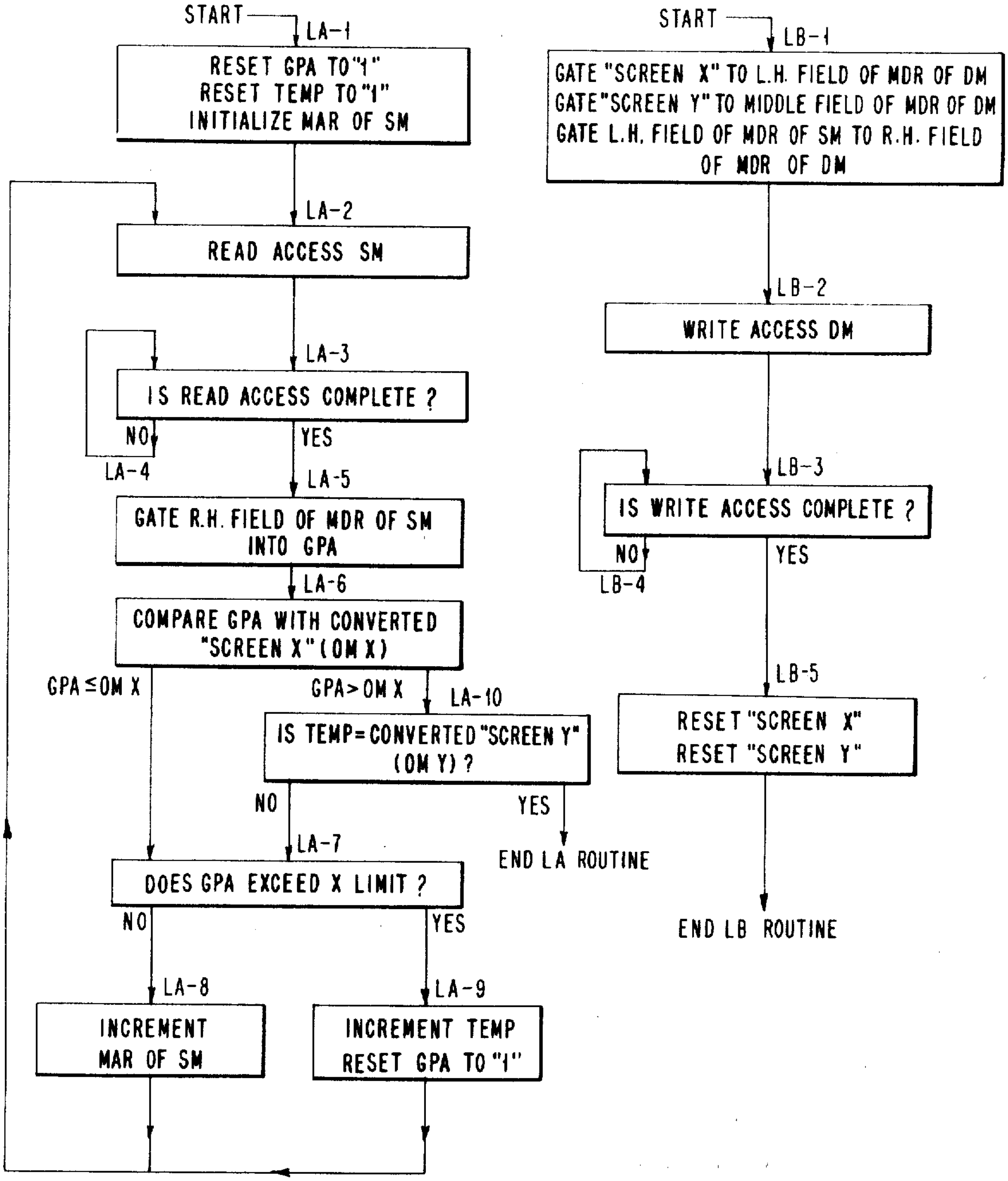

FIG. 30
WEAVE PATTERN NO. 52
| | | | | |
|---|---|---|---|---|
| ROW 4 - | 1 | 0 | 0 | 1 |
| ROW 3 - | 0 | 0 | 1 | 1 |
| ROW 2 - | 0 | 1 | 1 | 0 |
| ROW 1 - | 1 | 1 | 0 | 0 |
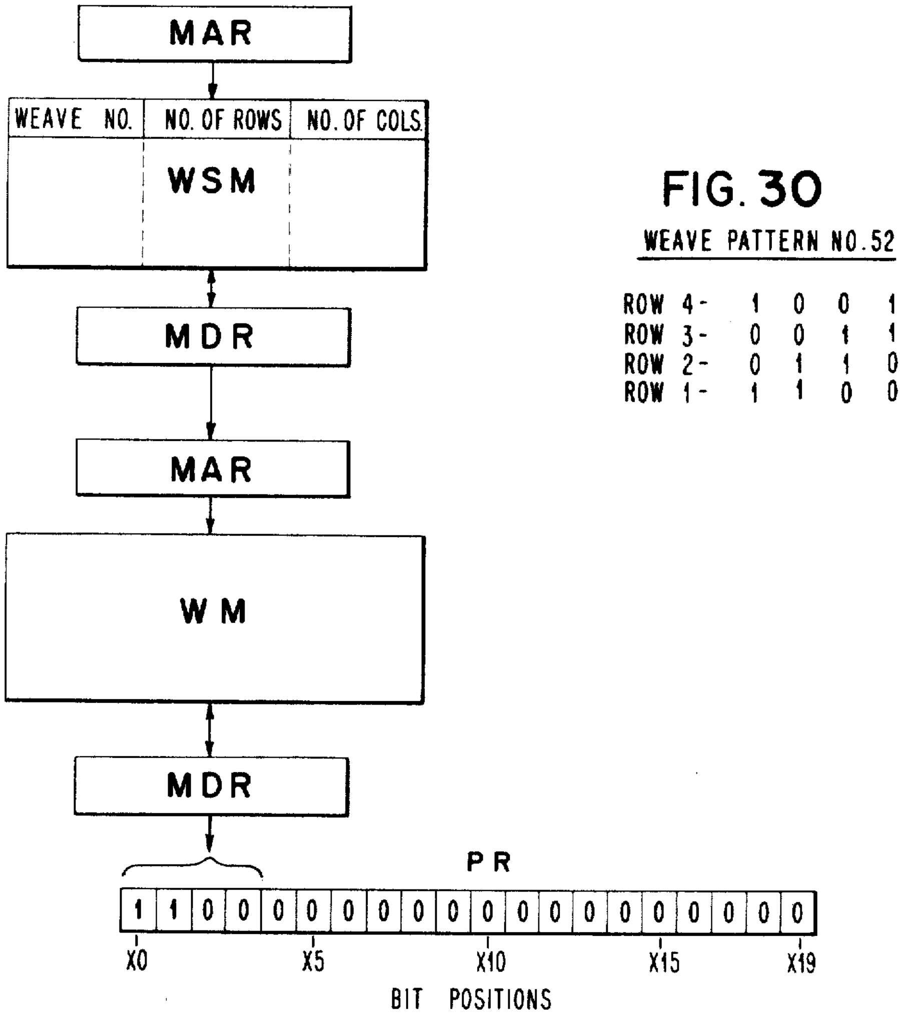
FIG. 31
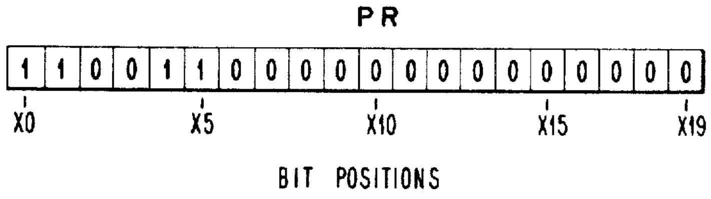
FIG. 32
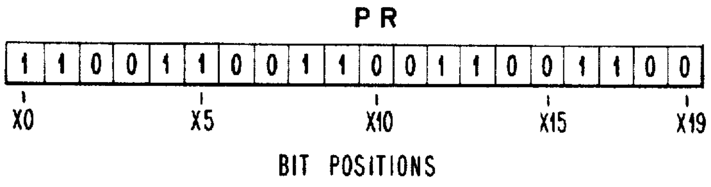
FIG. 33

Sept. 15, 1970 J. R. LOURIE 3,529,298

GRAPHICAL DESIGN OF TEXTILES

Filed Aug. 23, 1967 52 Sheets-Sheet 30

Sept. 15, 1970 J. R. LOURIE 3,529,298

GRAPHICAL DESIGN OF TEXTILES

Filed Aug. 23, 1967 52 Sheets-Sheet 31

Sept. 15, 1970 J. R. LOURIE 3,529,298
GRAPHICAL DESIGN OF TEXTILES
Filed Aug. 23, 1967 52 Sheets-Sheet 32
"I" ROUTINE INSERT WEAVE FIG. 36A
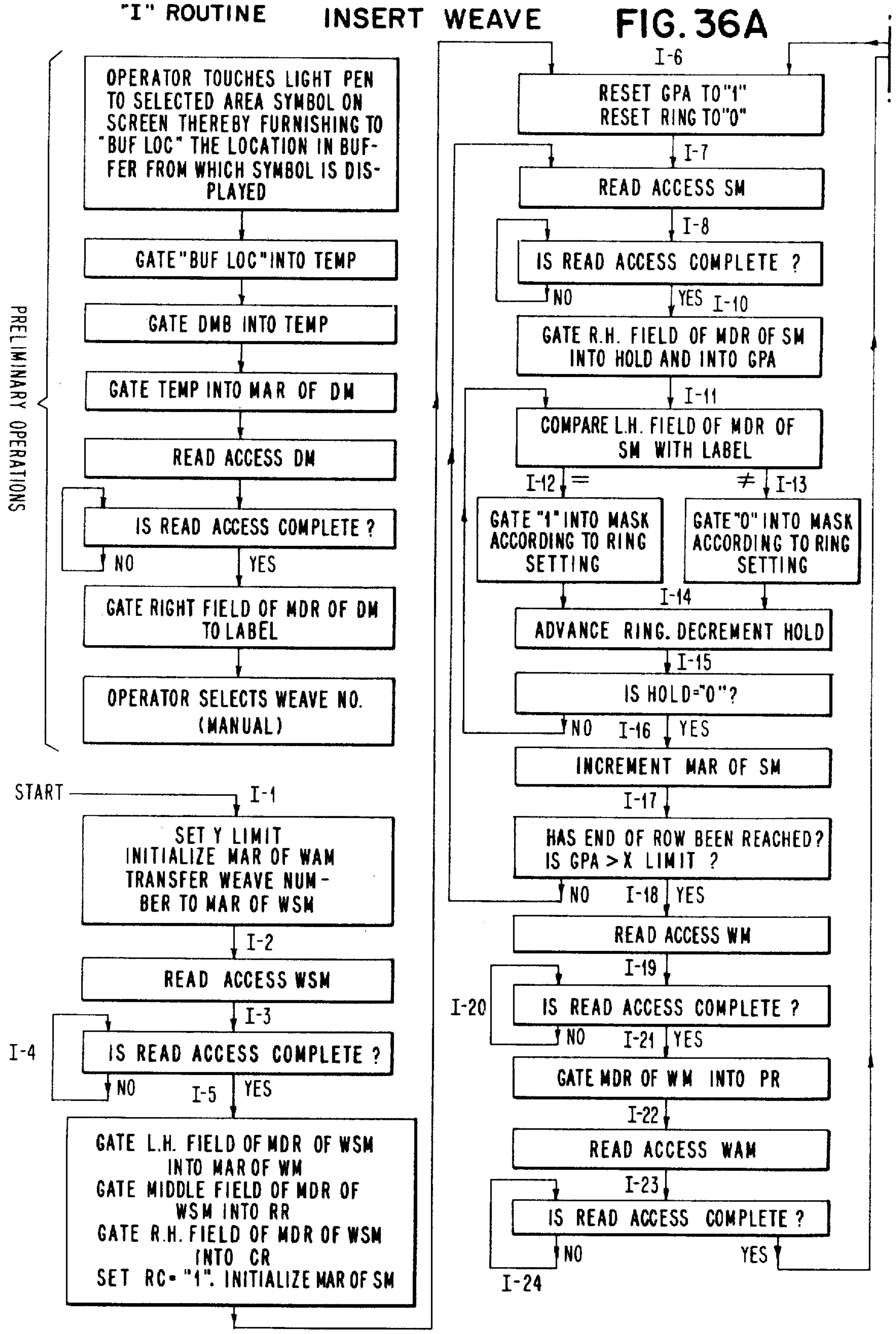

"I" ROUTINE

Sept. 15, 1970 J. R. LOURIE 3,529,298

GRAPHICAL DESIGN OF TEXTILES

Filed Aug. 23, 1967 52 Sheets-Sheet 35

DISPLAY (D)

DISPLAY
(D)

Sept. 15, 1970 J. R. LOURIE 3,529,298

GRAPHICAL DESIGN OF TEXTILES

Filed Aug. 23, 1967 52 Sheets-Sheet 37

DISPLAY LINES & DASHES (D L)

Sept. 15, 1970 J. R. LOURIE 3,529,298

GRAPHICAL DESIGN OF TEXTILES

Filed Aug. 23, 1967 52 Sheets-Sheet 39

ERASE WEAVE
"E" ROUTINE

ALTERATION

"A" ROUTINE

OUTPUT

SC REGISTER
(ROW REGISTER)

SEGMENT REGISTER
(SR)

FIG. 47 MASK

Sept. 15, 1970 J. R. LOURIE 3,529,298
GRAPHICAL DESIGN OF TEXTILES
Filed Aug. 23, 1967 52 Sheets-Sheet 48
FIG. 50A INSERT HORIZONTAL LINING INTO AREA ("HL" ROUTINE)
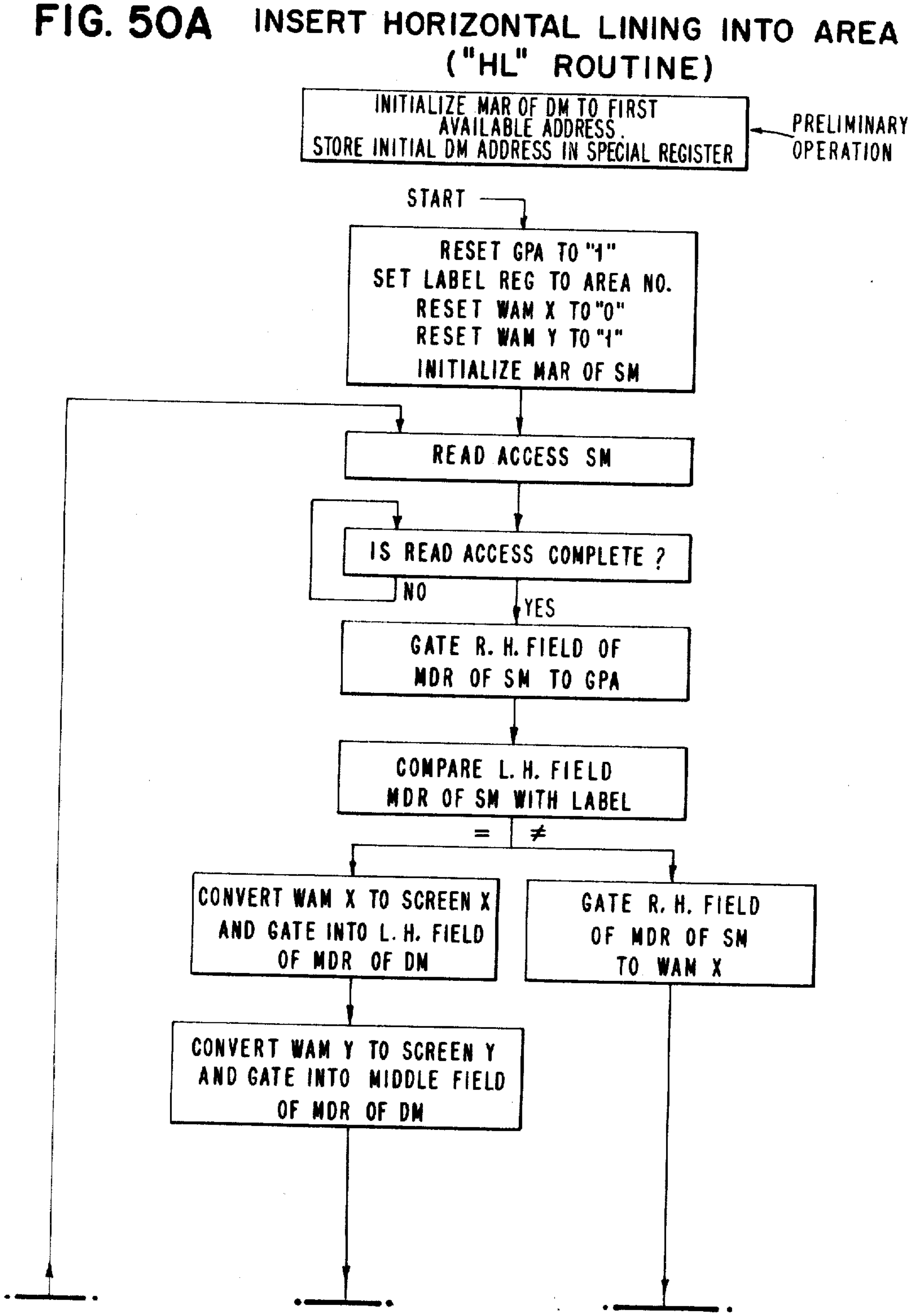

INSERT HORIZONTAL LINING INTO AREA ("HL" ROUTINE)

ERASE HORIZONTAL LINING FROM AREA
("EHL" ROUTINE)

PLACE LABEL IN AREA ("PL" ROUTINE)

United States Patent Office 3,529,298
Patented Sept. 15, 1970

3,529,298

GRAPHICAL DESIGN OF TEXTILES

Janice Richmond Lourie, New York, N.Y., assignor to International Business Machines Corporation, Armonk, N.Y., a corporation of New York Filed Aug. 23, 1967, Ser. No. 662,621
Int. Cl. D03d *49/00;* G06d *7/00*
U.S. Cl. 340—172.5 36 Claims

ABSTRACT OF THE DISCLOSURE

The disclosed textile designing method, called "textile graphics" for convenience, enables a human designer-operator to control an electronic data processing system equipped with a graphical display unit for causing desired weave patterns (each having a distinctive arrangement of warp and weft interlacings) to be manifested in selected pattern areas of arbitrary configurations which are displayed on an electronic viewing screen, and it furthermore enables the weave pattern displayed in any selected pattern area or portion thereof to be altered or replaced at the option of the operator, all of these design choices being manifested on the viewing screen immediately in response to the operator's selections as the same are communicated to the system through light pen, pushbuttons or other appropriate instrumentalities.

BACKGROUND OF THE INVENTION

This invention is concerned with the designing of woven fabrics to meet aesthetic and structural requirements by the use of electronic data processing techniques.

The design of so-called "high-fashion" textiles (i.e., textiles having intricate or finely detailed weave designs) customarily involves a laborious manual process of drawing or painting all of the individual warp and weft thread crossings upon special graph paper, known in the trade as "point paper." This procedure may entail the marking or coloring of hundreds or perhaps thousands of tiny squares or rectangles on point paper in order to develop the patterns of warp-over-weft and weft-over-warp crossings that are needed to depict the final weave design. If the resulting point paper design does not fulfill aesthetic and structural requirements, then the work must be repeated until the desired effects are achieved. Because this point paper method is so time-consuming and requires the services of such highly skilled designers, it is employed only in designing the more expensive textiles. Lower-priced textiles currently are designed by methods which offer a relatively limited choice of standard weave patterns.

Previous efforts have been made to automate the designing of textiles in order to eliminate the tedious point paper work described above. Such automated methods have had the serious disadvantage of reducing, or virtually eliminating, the design flexibility which a point paper designer usually enjoys. Hence, completely automated textile design techniques can fill only limited or very special needs, such as the direct reproduction of specimen weave patterns without any substantial variation thereof.

SUMMARY OF THE INVENTION

A general object of the present invention is to provide a novel textile design method, known as "textile graphics," which utilizes data processing techniques to achieve great speed in the design of woven fabrics, without sacrificing the flexibility of the older point paper method.

Another object of textile graphics is to enable a human designer-operator to interact with an "on-line" data processing and graphical display system for providing immediate visual manifestations of selected weave patterns in selected pattern areas while insuring that the designer will have complete freedom in choosing and modifying these weave patterns.

The disclosed textile design method involves operating an electronic data processing and graphical display system to store in row-by-row fashion within the system memory the coordinate boundary points of each enclosed pattern area lying within the field of the total weave design, such area boundary points being regeneratively displayed on the viewing screen as guides for the placement of selected weave patterns within the respectively bounded areas. Such weave patterns, each consisting of a unique coordinate array of warp and weft thread crossing representations, are stored in a "library" portion of the system, from which they can be retrieved at will and inserted selectively in row-by-row fashion into the desired pattern areas defined on the viewing screen, all of these actions occurring in response to the operator's manipulations of pushbuttons, light pen or other appropriate instrumentalities. The stored boundary point representations of each row in the selected pattern area cause the related display of thread crossing representations for that row to occur only between the stored boundary points, whereby the selected weave pattern is able to fill the chosen area without exceeding the boundaries thereof. Once displayed, the initially chosen weave pattern in any area can be erased, replaced or altered at the option of the operator, such actions occurring immediately in response to the operator's manipulation of the instrumentalities mentioned above. Thus, the entire textile design can be built up visually in a small fraction of the time required by the point paper method and without any sacrifice of design flexibility.

The word "row" is employed herein to denote a horizontal row when one is operating in a horizontal raster scan mode, as assumed in the present description. However, it could apply equally well to a vertical column if one were operating in a vertical raster scan mode. The words "row" and "column" should be interpreted accordingly. The word "operator" should be understood to mean a designer-operator, that is, a designer who is capable of operating the disclosed system.

Viewed in a somewhat broader sense, the invention provides a novel, computerized method of displaying graphical information which comprises: (a) forming arrays of stored data bits to represent the outline configurations of arbitrarily bounded areas on a viewing screen, each such array including for each area a representation of a distinctive symbolic label identifying that area; (b) forming other stored data bit arrays each representing the graphical characteristics of a repetitive data bit pattern that can be displayed arbitrarily in any of said areas, each such pattern having associated therewith an identifying designation; and (c) causing the two types of data bit arrays (a and b) to interact with each other in a manner arbitrarily selected by an operator for providing a visual display wherein each of said areas contains the graphical representation of a chosen data bit pattern, as determined by selectively interrelating the bit pattern designations with the area labels.

The foregoing and other objects, features and advantages of the invention will be apparent from the following more particular description of a preferred embodiment of the invention, as illustrated in the accompanying drawings.

DESCRIPTION OF DRAWINGS

FIGS. 27, 28 and 29 are flow diagrams illustrating various aspects of an area labeling procedure.

FIG. 30 is a representation of a twill weave pattern in binary "1's and 0's" form.

FIGS. 31 to 35 are diagrams schematically representing steps in the process of inserting a selected weave pattern (such as the one illustrated by FIG. 30) into a selected area of an outline design.

FIGS. 36A and 36B, when arranged as shown in FIG. 36, constitute a flow chart of the "Insert weave" operation.

FIGS. 50A, 50B, 51, 52A and 52B constitute flow charts of the various operations involved in the alternative labeling procedure.

GENERAL DESCRIPTION OF TEXTILE GRAPHICS

Figure 1:
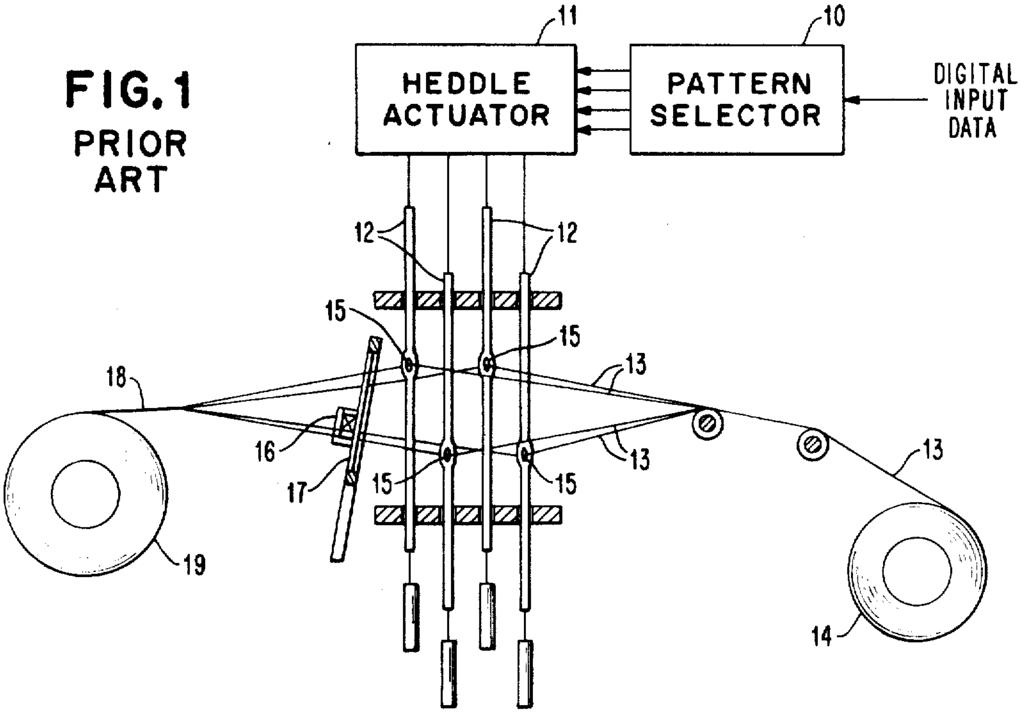
FIG. 1 PRIOR ART
FIG. 1 is a schematic showing of a conventional loom of the Jacquard type.

Textile graphics, as herein disclosed, is a unique method or technique whereby a data processing and graphical display system is enabled to serve as an interactive means for developing the designs of woven fabric structures, particularly those of the more complex or intricate varieties. By an "interactive means" is meant an apparatus or system that is capable of responding immediately to a designer's decisions, some of which may involve nullifying or modifying the effects of previous decisions that already have been executed by the system. By its nature, an interactive system must have highly flexible controls, and in order to fulfill the purpose of the present invention, the system must be so constituted or programmed as to have extremely high flexibility and speed or response.

The value of any textile designing technique depends upon the extent to which it can meet the following requirements:

(1) The woven design should be aesthetically pleasing, which means that one should not be unduly limited in the choice of weave patterns.

(2) The fabric should conform to established structural rules. For example, it should not contain excessive "floats," which is to say that the number of unsecured warp threads crossed by any weft thread (or vice versa) between a related pair of secured interlacing points must not be so great as to reduce unduly the strength of the woven fabric structure in that area of the cloth. Still other structural rules may be applicable.

(3) The design should be developed in such a form that it can readily be converted into control signals for causing a loom to reproduce the chosen weave patterns in the desired areas of the cloth.

(4) The designer should be able to change the design quickly and easily as it is being developed.

The type of operation contemplated by the present invention enables one to meet all of these requirements quite readily. A designer places upon a viewing screen the outlines or boundaries of various pattern areas in which there are to be evolved the ultimate weave patterns. Into these respective pattern areas there are inserted graphical displays of selected weave patterns. In those instances where the weave patterns do not conform with aesthetic or structural requirements, the operator can readily erase the unwanted pattern or patterns and immediately replace them with other weave patterns as desired. He also can modify individual portions of the displayed weave patterns in any desired way to meet design requirements. All of these functions are performed in an "on-line" and/or "real-time" fashion that is made possible by a unique conditioning or preparation of the data processing and display instrumentalities as taught herein. The graphically displayed weave information is developed in a form where it is either usable directly to control textile weaving operations (as performed by a Jacquard loom or the like), or it can readily be stored in conventional data storage devices. The speed and flexibility of the disclosed process will enable textile designers to utilize intricate and complex weave designs that formerly were rejected in many instances as being too expensive or impractical to implement. One of the objectives achieved by the present approach to textile design is to make high-fashion textiles commercially available on a much larger scale than was previously thought practicable.

Before giving detailed attention to a preferred embodiment of the invention, it will be helpful to consider in a general way the problems involved in textile designing and the present graphical approach to their solution. Simply stated, the purpose of any textile designing procedure is to evolve, in some form or other, a digital information pattern that represents the exact manner in which the threads of a fabric must be interwoven in order to express the originally chosen design or else a compromise design that has been worked out in the designing process. The extent to which the final design fulfills the original aesthetic objectives will depend upon both the sophistication of the instruments available to the designer and the ingenuity with which these instruments are utilized.

By way of background information, FIG. 1 represents in simple form a conventional loom mechanism which is adapted to perform weaving operations in response to digital input data in the form of punched Jacquard cards or the equivalent electrical signals. A pattern selector 10 decodes or converts the input data to appropriate signals for selectively setting a heddle actuator 11 during each step of the weaving process. In response to each setting of the heddle actuator 11, certain of the heddles 12 are elevated or lowered with respect to the other heddles 12, as indicated, for example, in FIG. 1. (It will be understood, of course, that this figure shows only a small number of the many heddles that normally would be utilized in an actual weaving operation.)

The warp threads 13 (i.e., those threads which run lengthwise of the woven fabric) are withdrawn from a warp beam 14 and are passed respectively through the eyes 15 of the various heddles 12. As the heddles are selectively raised or lowered with respect to each other, certain of the warp threads 13 are caused to diverge momentarily from the other warp threads 13. The angular space between the separated warp threads commonly is referred to as a "shed," and the process of selectively separating the warp threads is called "shedding."

The weft thread, also referred to as the "woof" or "filling" (not shown in FIG. 1), is inserted into the fabric by a shuttle 16 that travels back and forth across the path of the warp threads 13 within the space lying between the converging portions of these threads. Each time the shuttle 16 lays down a weft thread, an oscillatory reed 17 moves the shuttle in a direction such as to push the weft thread against the woven fabric 18, which is being wound onto a cloth beam 19. The heddles 12 then are restored to their normal aligned positions, causing the warp threads to interlace firmly with the weft thread.

The pattern woven into the fabric 18 is determined by the manner in which the heddles 12 are selectively raised and lowered in each step of the weaving operation. In the case of those warp threads 13 which were positioned above the shuttle 16, certain portions of these warp threads will remain exposed to view on the obverse or visible side of the woven fabric 18. In the case of those warp threads which were positioned beneath the shuttle 16, certain portions of these warp threads will be hidden from view by corresponding portions of the weft thread. The various interlacings of the warp and weft threads define the textures and visual effects of the patterns exhibited by the woven fabric 18. (In the present description no account will be taken of color variations in the woven fabric design, attention being given only to the structural characteristics of the weave patterns.)

Figure 2:
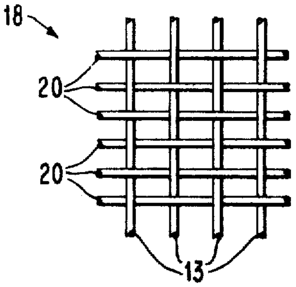
FIG. 2 is a partially exploded view showing the manner in which the warp and weft threads of a fabric are interlaced to form a plain weave.
Figure 3:
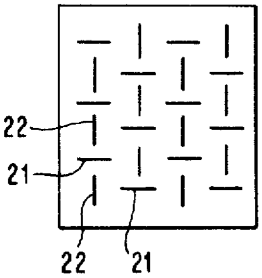
FIGS. 3, 4 and 5 are symbolic representations of a plain weave pattern, as expressed in various forms.

As an elementary example of a weave pattern, FIG. 2 depicts, in an enlarged and partly exploded manner, the way in which the warp threads 13 are interwoven with the weft threads 20 in a "plain-woven" fabric 18. In a plain weave, each weft thread 20 passes alternately over and under the successive warp threads 13, and vice versa. This type of weave pattern can be represented diagrammatically as an array of short vertical and horizontal lines alternately arranged, as shown in FIG. 3. Each horizontal line such as 21 represents a portion of a weft thread crossing over a portion of a warp thread, while each vertical line such as 22 represents a portion of a warp thread crossing over a portion of a weft thread. In a plain weave pattern the weft lines 21 and warp lines 22 alternate with each other in every row and column of the array. (Other weave patterns will be considered presently.)

Figure 4:
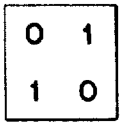
Figure 5:
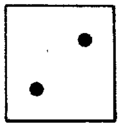

Instead of being represented as an array of horizontal and vertical lines 21 and 22, FIG. 3 (or "dashes" and "lines" as they sometimes are called), the weave pattern may be represented by a corresponding array of binary "zeroes" and "ones," as in FIG. 4, or "blanks" and "dots," as in FIG. 5. FIGS. 4 and 5 each depict a two-by-two matrix of crossing points, which is the minimum array needed to define a plain weave pattern. Attention will be given hereinafter to other weave patterns which require a larger matrix in order to define the minimum repetitive array of crossing points.

The foregoing description has dealt by way of introduction with a few general aspects of the weaving art. The following description will be concerned with some broad functional aspects of the "textile graphics" technique which distinctively characterize the present invention.

Figure 6:
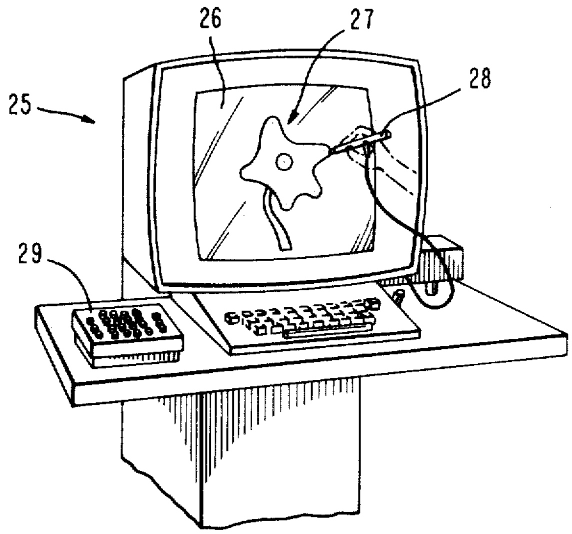
FIG. 6 is a perspective view of a display unit showing an outline design traced upon its viewing screen.

Referring to FIG. 6, let it be assumed that an electronic display apparatus 25 of a suitable type (such as an "IBM 2250" display unit, for example) is operated to display upon its viewing screen 26 the outline of a design or pattern 27 that is to be woven into a textile. (A very simple design has been chosen for illustration. Normally the design would be of a more intricate nature.) The method by which this pattern outline 27 is placed upon the screen 26 is not important. The design image 27 could be drawn or traced manually upon the screen 26 with the aid of a light pen 28 of known construction, for instance. Selected warp and weft thread crossing patterns are to be visually "woven" into the respective closed areas of the design outlined on the screen.

Figure 7:
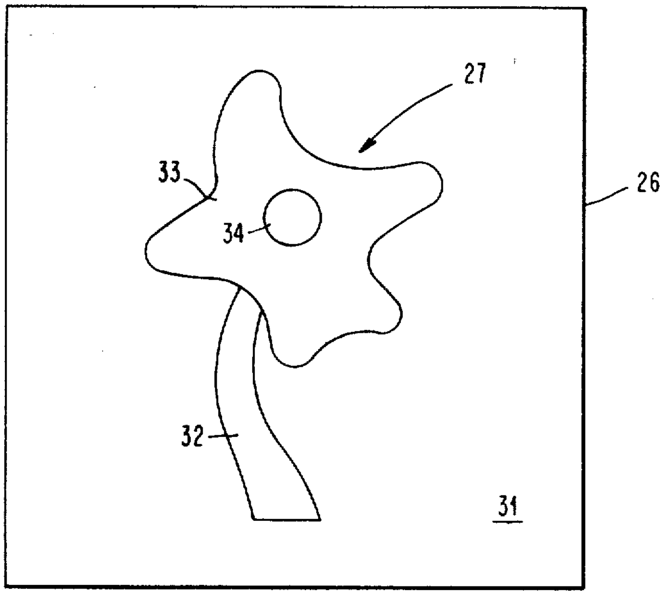
FIG. 7 is a representation of the outline design displayed on the screen of the aforesaid unit, indicating the disjoint areas of such design.
Figure 8:
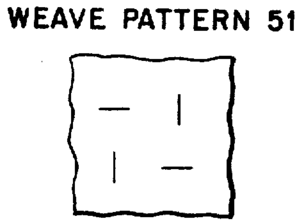
FIGS. 8 to 11 are representations of typical weave patterns in "lines and dashes" form.

In the present case the chosen design 27 is a simplified representation of a flower having a stem portion which occupies an enclosed pattern area 32, FIG. 7, a petal portion occupying an enclosed pattern area 33, and a central reproductive portion represented by the circle 34, which is surrounded by the outer boundary of the area 33. The remaining background area is designated 31. It is assumed that the textile designer wishes to fill the respective areas 31, 32, 33 and 34 with various weave patterns in an experimental "cut and try" fashion, until a combination of weave patterns having the requisite aesthetic and structural characteristics is arrived at. Some typical weave patterns that one conceivably may want to insert in the various pattern areas are represented in FIGS. 8 to 11, respectively, in "lines and dashes" form. When displayed on the screen, the weave patterns may be in "lines and dashes" form or "dots and blanks" form.

As will be explained more fully hereinafter, the display unit 25, FIG. 5, is adapted to be associated with a suitable data processor (such as an "IBM System/360," for example), which contains facilities for storing the data bits that are to control the display and regeneration of the selected image 27 upon the viewing screen 26. This is not meant to imply, however, that a general-purpose computer necessarily must be employed for performing the described functions. In a particular situation it may be more economical to design a data processor especially for that purpose.

The screen 26 is the visible face of a cathode ray tube, and the image 27 is displayed thereon by selectively switching on and off (i.e., blanking and unblanking) an electron beam as it is being deflected within the tube, thereby causing this beam to impinge upon only selected points of the screen for exciting these points to luminosity.

The illuminated points are continually regenerated under the control of stored image data until the apparatus is instructed to alter or erase the displayed image. Erasure of an image or any portion thereof is accomplished simply by discontinuing its regeneration, and alteration of the image is accomplished by modifying the stored regeneration pattern, both of these functions being controlled by the operator.

As a preliminary step in graphically developing a textile design by the present method, the distinctive pattern areas of the design must be analyzed and individually identified in a manner which is intelligible to both the machine and the operator. This part of the designing process is referred to herein as "design cognition." There are several ways in which design cognition can be performed. One such method will be described hereinafter.

Each of the enclosed areas 32, 33 and 34, FIG. 7, may be referred to as a "disjoint" area. A disjoint area is a completely bounded area wherein it would be possible for a microscopic traveler to pass through all of the points in that area without crossing any boundary line. The background area 31 can be regarded as a disjoint area if it is assumed to be bounded by the rectangular border of the viewing screen 26. It should be noted that one disjoint area may be surrounded by another disjoint area. For example, in FIG. 7 the disjoint area 34 is surrounded by the disjoint area 33, these two areas 33 and 34 being mutually exclusive of each other. Each of areas 32 and 33 is almost completely surrounded by the background area 31, and the two areas 32 and 33 together are completely surrounded by area 31. Two disjoint areas such as 32 and 33 may have boundaries containing one or more points in common. By convention, as explained hereinafter, a disjoint area may be assumed to contain all of the points in its boundary or in any desired portion of its boundary. For instance, all points lying on the left-hand portion of a disjoint area boundary may be assumed to be part of that area. This convention facilitates the design cognition process, in a manner which will become apparent as the description proceeds.

The type of design cognition procedure disclosed herein has been worked out with particular reference to a textile weaving operation, in which the design is fabricated in a row-by-row fashion as successive weft threads are interlaced with the warp threads. By analogy to a weaving operation, the cognition process utilizes a row-by-row, horizontal raster scan of the design image. (As explained hereinabove, the expression "row-by-row" is to be understood in a generic sense. A column-by-column, vertical raster scan could be employed within the purview of the invention.)

To explain the design cognition algorithm herein employed, reference will be made to a very simple outline design, illustrated by FIG. 12, in which there are only two disjoint areas. One such area is enclosed by a curved line 36 in conjunction with the lowermost edge of the rectangular border 37, and for convenience, this area is labeled 2 in FIG. 12. The remaining disjoint area, also bounded by the curve 36 and border 37 but lying completely outside of the area 2, is labeled 1 in FIG. 12. For the purpose of the present invention it is desirable to form a machine-recognizable, logical relationship between each of the area symbols (such as 1 and 2) and the geometric characteristics of the respective disjoint area to which it is applied. To accomplish this, there is provided herein a method of graphically analyzing the displayed outlines of a design in order to identify each disjoint area of the design with an individual labeling symbol, which symbol thereafter will represent the essential geometric properties of that specific area—to wit, the locus of all coordinate points within said area.

Figure 12:
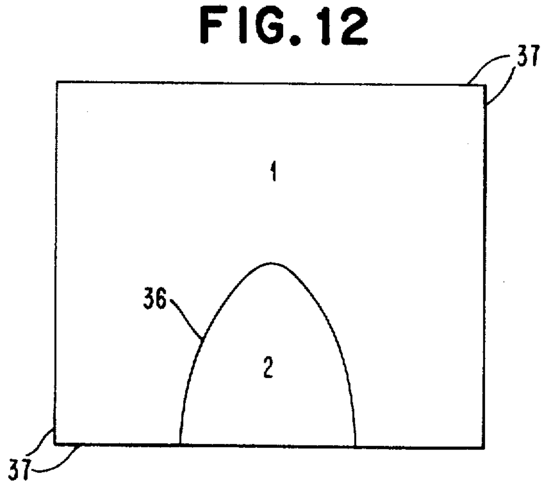
FIG. 12 is a representation of a relatively simple design displayed on a viewing screen.
Figure 13:
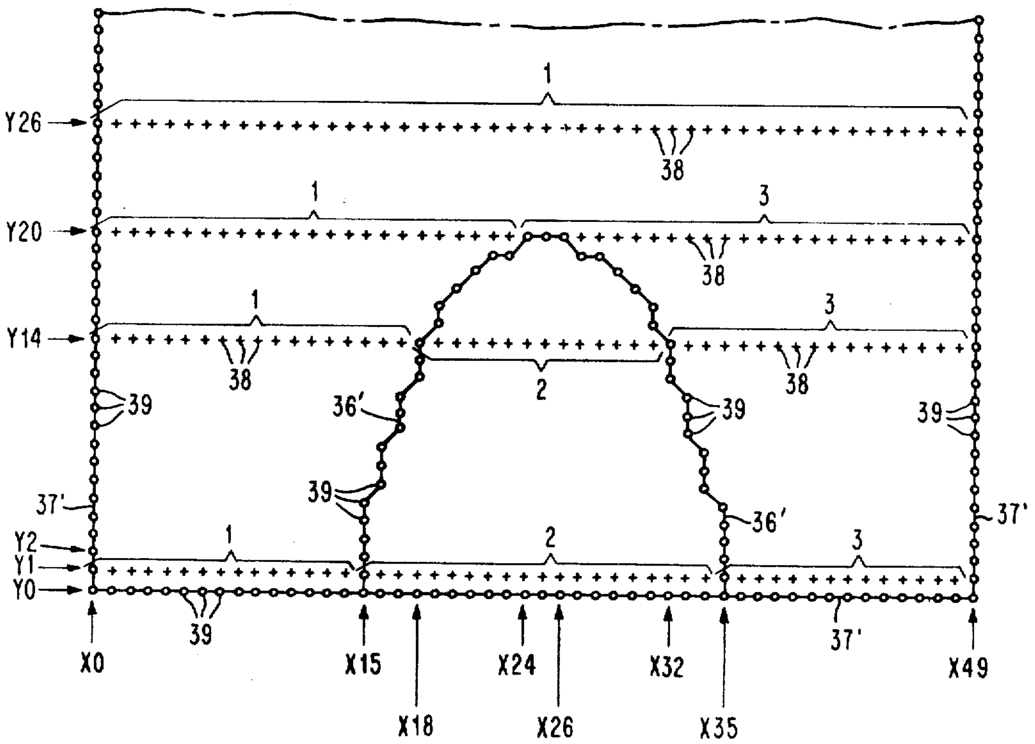
FIG. 13 is a diagram showing one way in which a pattern of binary data bits may be stored in a memory matrix for providing the display shown in FIG. 12.

FIG. 13 represents in a diagrammatic form a matrix of storage cells arranged along rectangular X and Y coordinates. The size of this matrix (50 x 50) has been chosen for illustrative purposes only. The cells themselves are represented in FIG. 13 by either small crosses 38 or solid circles 39. The crosses 38 (which merely are position markers), or else the complete absence of any symbols, will denote "empty" cells (i.e., cell storing ZEROS) while the circles 39 denote "full" cells (i.e., cells storing ONES). The full cells store the coordinate positions of those matrix points which are arranged on boundary lines 36′ and 37′, these lines corresponding as closely as possible to the boundary lines 36 and 37, respectively, in FIG. 12. It also can be said that the full cells 39 store a pattern of regenerative bits for enabling the outline design of FIG. 12 (or a reasonably close copy thereof) to be displayed electronically on a viewing screen. This "cross and circle" method of representing data bit positions will be used only in connection with FIG. 13. Subsequently herein a different type of notation will be employed for the representation of bit positions, the method of such representation being optional.

In the present instance, design cognition entails scanning the stored regenerative pattern of information (FIG. 13) in a row-by-row fashion to analyze changes in the lengths of the various "zones" or segments into which each row is divided by the lines 36′ and 37′. Each zone is given an identifying label. Ignoring the lowermost boundary row Y0 (which is a special case handled in a different way, as explained hereinafter), let us analyze the data bit pattern in the first row Y1 above the lower boundary. Scanning will proceed in this row from position X0 to the right, as viewed in FIG. 13. The data bits in positions X0 through X14 consist of an initial "1" (circle) followed by a string of fourteen "0's" (crosses). When the boundary bit at X15, Y1 is encountered during this scan, this signals that the first row segment or "zone" in row Y1 has been traversed. This zone, consisting of the bit positions X0 through X14 in row Y1, is designated zone 1. Now, as it crosses the boundary 36′, the scan proceeds from X15 to the right. When the boundary 36′ again is encountered, at X35, this signifies the end of the second zone, and to this zone (from X15 through X34) is applied the numeral 2. The zone numbering is carried in a row zone counter (described hereinafter) which is incremented each time a new zone in the row is encountered. The last zone in row Y1, extending from X35 to X48 (or X49, if the right-hand boundary of the matrix is to be included in the last zone), is numbered 3.

At the end of each row scan, a scan of the next succeeding row is now initiated, and the numbering of the zones begins anew. This is not meant to imply, however, that zone numbers in any given row are assigned invariably in a consecutive order. They may or may not be, depending upon circumstances. As a general rule, the identifying number assigned to the respective zones in any given row will depend at least to some extent upon the numbers assigned to the zones in the immediately preceding row. In some cases the zone numberings in two successive rows may be completely identical .For instance, referring to FIG. 13, the zone numbers in row Y2 (not shown) will be identical with those of row Y1. That is to say, the zone or row segment from X0 to X14 in row Y2 will be numbered 1, the same as the corresponding zone of row Y1. Right above zone 2 of row Y1 there is a correspondingly numbered zone 2 in row Y2, and above zone 3 of row Y1 there is a corresponding zone 3 in row Y2. In certain other cases (to be described hereinafter) there will be only partial correspondence between the numbers of the zones in successive rows.

A part of the scanning and zone labeling algorithm which is employed in the present textile designing process involves checking the value of the bit stored in a preceding row directly beneath each 0 bit stored in the row zone that currently is being scanned. Thus, in row Y2, for example, a 0 is stored in position X1 (as indicated by a blank at that point). Directly beneath this (in position X1 of row Y1) a 0 is also stored (as indicated by a cross). If any of the 0 bits stored in a zone currently being scanned is directly above a 0 bit stored in the immediately preceding row, then the algorithm specifies that, as a general rule, the zone currently scanned shall be numbered the same as the zone beneath it which contains the matching 0 bit. If none of the 0 bits in a zone is positioned above a 0 bit in the previous row, then a new zone number is assigned. The algorithm also takes care of any apparent inconsistencies that may arise from this general rule. A situation of this latter kind will be dealt with presently.

Going up to row Y14, FIG. 13, it will be noted that, following the general rule just stated, there are three zones 1, 2 and 3 in row Y14 which correspond approximately, but not exactly, to the three zones 1, 2 and 3 in row Y1, the lengths of the corresponding zones in these two rows not being the same due to the fact that the boundary line 36′ extends in a generally diagonal direction at that point. Thus, in row Y14 the zone 1 contains positions X0 through X17 (instead of positions X0 through X14 as in row Y1). Zone 2 in row Y14 contains positions X18 through X31, and zone 3 in row Y14 contains positions X32 through X48. Note that in each of these three zones of row Y14 there is at least one 0 bit which is positioned directly above a 0 bit in the correspondingly numbered zone of row Y13 immediately preceding it.

Coming up to row Y20, we encounter a situation somewhat different than any of those just described. Zone 1 in row Y20 extends from X0 through X23; then there commences a new zone at position X24. In the initial portion of this new zone there are three consecutive border bits in positions X24 through X26, respectively (row Y20). By convention, these points are assumed to be in the zone extending to the right thereof, the first 0 of which occurs in position X27 of row Y20. Following is a string of 0's extending to position X48 in this row. Thus, it can be seen that row Y20 (in contradistinction to each of the preceding rows Y1 through Y19) contains only two zones. One of these zones obviously will be numbered 1, because it has at least one 0 bit therein which is positioned directly above a 0 bit in zone 1 of row Y19. It is impossible, however, to find in row Y20 a 0 bit which is positioned directly above a 0 bit in zone 2 of row Y19. Hence, there can be no zone numbered 2 in row Y20. There can, however, be a zone in row Y20 numbered 3, which contains at least one 0 bit positioned directly above a 0 bit stored in zone 3 of Y19. Hence, there results a situation in which row Y20 contains two adjacent zones 1 and 3 which are not consecutive numbered.

Let us now proceed to the scanning of row Y21, immediately above Y20. Obviously row Y21 contains only one zone, because there is an unbroken string of 0's stored therein from positions X1 through X48 in this row. The question now arises whether this single zone in row Y21 should be given the zone number 1 or 3. It is possible to find in this zone a 0 bit which is positioned directly above a 0 bit stored in zone 1 of row Y20, and it is also possible to find in this zone a 0 bit which is stored directly above a 0 bit stored in zone 3 of row Y20. The algorithm provides a decision whereby in any situation of the kind where a zone can be given more than one number according to the zone numbering rule stated previously, the zone in question will take only one of these available zone numbers; for instance, the lower number. Accordingly, the single zone in row Y21 will be numbered 1. For clarity of illustration, no attempt has been made to show this zone numbering in row Y21 of FIG. 13. However, row Y26 bears a zone number 1 which will have been carried up row-by-row to Y26 from the preceding rows Y21 through Y25.

As a further aspect of the scanning and zone labeling algorithm, provisions are made therein for recognizing the equivalency of two merging zones such as 1 and 3, FIG. 13. By "zone equivalency" it is meant that two or more zones which have been separately numbered will thenceforth be considered as parts of a single zone for area labeling purposes. As proposed herein, such zone equivalency is manifested by going back into a table of zone numbers that has been built up during the scanning process and applying uniform designations to all of the zones in a particular group of "equivalent" zones. Assume that the left-most zone number prevails. If the present case (FIG. 13) this will involve effectively changing all of the zone labels 3 to zone labels 1 in the rows from Y1 through Y20. As the result of renumbering the equivalent zones of FIG. 13 in this fashion, there will remain only two zone numbers, 1 and 2, the zone numbers 3 all having been converted to zone numbers 1.

The zone number conversion just described is useful when the time comes to apply labels or identifying symbols such as 1 and 2, FIG. 12, to the disjoint areas defined by the boundary lines 36 and 37 in the figure shown. Referring to the storage matrix shown in FIG. 13, one can discern a portion of this matrix bounded by the lines 36′ and 37′ which has a configuration approximating that of the disjoint area 2 in FIG. 12. One also can discern an area in the storage area of FIG. 13 having a configuration approximating that of the background area 1 in FIG. 12. Obviously all of the row zones designated "2" in FIG. 13 define an area of this matrix corresponding approximately in shape to the disjoint area labeled "2" in FIG. 12. Similarly, the row zones designated "1" and "3" in FIG. 13 (the latter of which are to be renumbered "1") define an area of the matrix corresponding approximately in shape to the background area 1 in FIG. 12. These relationships facilitate the labeling of disjoint areas, as will become evident from the subsequent detailed description of a preferred embodiment.

To recapitulate the scanning and zone labeling procedure as applied to the example given in FIG. 13, a row-by-row raster scan of the memory elements storing the outline representation (FIG. 13) is performed. Starting the scanning process at the lower left-hand corner of the storage matrix, the scan proceeds from an assumed boundary at the left-hand edge and goes element by element and row by row. A zone number is assigned whenever there is encountered one or more 0's followed by a 1 which represents a boundary line. All of the elements thus encompassed are in one row zone. In order to deduce the number of this row zone, each of the elements occupying corresponding positions in the row directly beneath it is checked. If any of these previous row elements yields a 0, then the entire zone currently under consideration is assigned the same zone number as that of the zone containing the elements which was 0. This occasionally may lead to a situation in which a zone that already had taken a zone number from a previous row now is being asked to take a second and different zone number from said previous row. If this is the case, the zones having these two numbers are considered "equivalent" (i.e., included in the same disjoint area), and an entry is made in a zone equivalence table to this effect. When all of the rows have been scanned, we then assign a disjoint area label to each collection of equivalent zones. For example, we may choose to apply the label 1 (FIG. 12) to the area consisting of the elements in zones 1 and 3 (FIG. 13), and the label 2 (FIG. 12) to the area which consists of the elements in zone 2 (FIG. 13). Note that the patterns of 1's and 0's appearing in the outline storage matrix have no meaning other than denoting the locations of area boundary points.

Another situation that may arise in practice, but which does not occur in the case of the design shown in FIGS. 12 and 13 (except during the scan of the row Y1), is the case where none of the zeros in a given zone is positioned above a zero bit in the row beneath. This signals the fact that an entirely new zone has been encountered and to such a zone must be given the next available zone number as registered in a zone counter. This case will be considered further in the subsequent description. Still another situation that may arise in practice is where the row currently being scanned is interrupted by a boundary bit, and the previous row has no corresponding or related boundary bit, so that the previous row zone extends uninterruptedly beneath and beyond the boundary bit that divides the current row. In this case, provisions are made whereby the new zone in the current row is given the same zone number as the preceding zone in the current row, both of these current row zones having obtained their numbers from the underlying continuous zone in the previout row. An example of this kind will be described hereinafter.

After distinctive labels such as 1 and 2, FIG. 12, have been assigned to the respective disjoint areas, representations of these area labels are stored for future reference, and whenever a particular area label (such as 2, for example) is referred to by the operator, this calls forth all of the stored information concerning the locations of the boundary points for that particular area. In other words, by calling for something to be done in the area labeled 2, FIG. 12 (if this were the displayed design), the operator automatically conditions those storage cells 39 which lie on the line 36' in the outline storage matrix, FIG. 13, to establish the geometric limits for any action that may occur within area 2 on the screen, FIG. 12. It should be explained in this connection that insofar as the present invention is concerned, any displayed boundary line such as 36, FIG. 12 actually may be viewed as a series of logically related but graphically unconnected points or dots. The display unit need not be operated in a manner such that it actually traces a line upon the screen through all of the points located on a given boundary, although, of course, such operation can be performed by the unit if desired. To simplify the present description as much as possible, it will be assumed herein that a boundary line displayed upon the viewing screen will be handled internally by the data processing system as though it were an assemblage of individual points respectively located at various X and Y intersections of an imaginary coordinate grid laid out upon the screen of the display unit, such grid being sufficiently fine so that a series of displayed boundary points can closely simulate a continuous line extending through them.

As mentioned above, design cognition does not necessarily have to be performed by a raster-scan method as just described. Apparatus of the type contemplated herein for carrying out the textile graphics process can be operated in such a manner that the disjoint area boundaries are located by a curve-following technique, which is quite different from a raster scan technique. However, the raster scan method lends itself well to the needs of textile weave designing, since the row-by-row scanning procedure is analogous to the row-by-row sequence of weaving operations.

To present a functional picture of the activities involved in a graphical textile designing operation as contemplated herein, let us start with an assumed design outline of the kind shown in FIG. 7, consisting of the four disjoint areas 31, 32, 33 and 34. Area 31 constitutes the background. The scan algorithm now is initiated. It is assumed that the cognition will proceed in a certain sequence, say from left to right and bottom to top. This sequence, of course, is entirely optional. The various rows and segments of rows are scanned, and each row segment is given an internal label or designation (herein assumed to be a number) which is not visible to the operator. When a row segment has been internally numbered by the system, it is thereafter referred to as a "zone." (This "zone number" is not to be confused with what will be referred to occasionally hereinafter as a "segment number," which is not necessarily the same in all instances. The distinction will be pointed out wherever necessary.) As a concluding step in this cognition routine, the system places upon the viewing screen 26, in each of the disjoint areas displayed thereon, a visible area identification label, such as "1," "2," etc., that is derived from the appropriate bone number. For instance, in the area which contains nothing but "zone 1's" (either as originally numbered or as renumbered to denote equivalency), the system will cause a bone label "1" to appear. This does not necessarily mean that the label has to be a numeral, however. The choice of identifying symbol is arbitrary.

Figure 14:
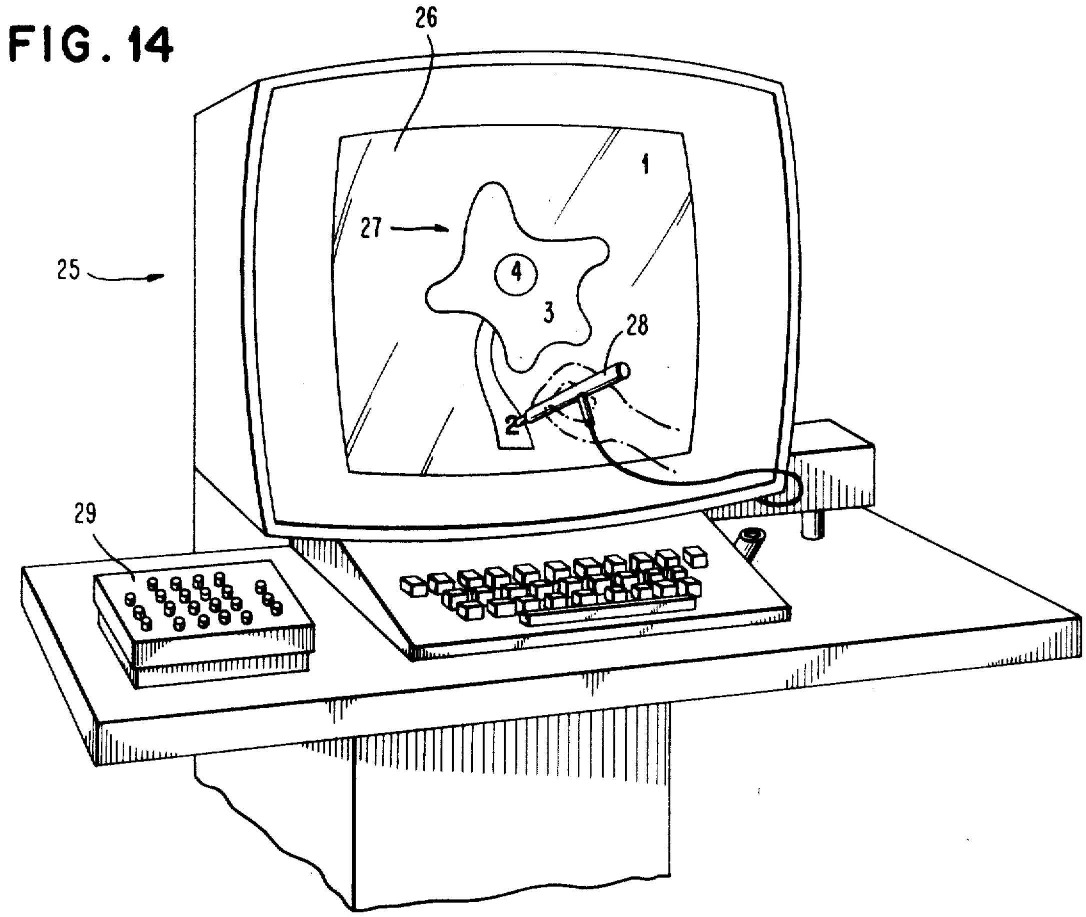
FIG. 14 is a perspective view of a display unit on which there is displayed an outline design having labeled areas, in accordance with the teachings of the present invention.

Cognition automatically proceeds in a manner as just described until finally all of the areas 31 to 34 have been labeled with identifying symbols such as the numerals 1, 2, 3 and 4, respectively, as shown in FIG. 14. The area cognition phase of the design process now is completed, leaving all of the areas labeled with indicia that can be recognized by the system as defining area boundaries whenever this is required in the course of operations. The next phase is the weave designing operation proper.

The operator is provided with a library of weave patterns (such as those shown in FIGS. 8–11, for example) to which he can add still other weave patterns of his own choice. In the present system the choice is virtually unlimited. Weave patterns may be selected from catalogs and other standard collections, or they may be composed specially by the operator, or they can be generated by mathematical processes (e.g., patterns of a random character). Facilities are provided for storing all weave patterns that may possibly be desired in the present system. For the operator's convenience the system is arranged so that the design image can be temporarily erased from the screen, and any number of weave patterns can be displayed in sequence on the screen until a suitable one is found. All of these actions are accomplished through the medium of a program function keyboard 29, FIG. 6, which a component of the display unit 25.

Figure 15:
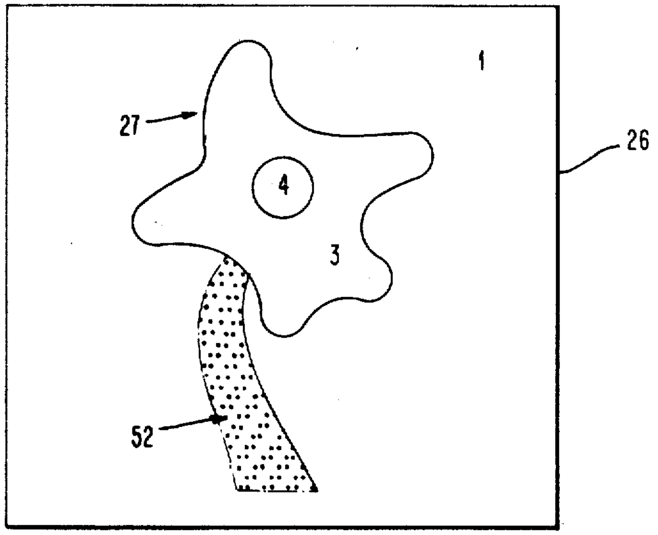
FIG. 15 is a representation of a displayed design with a selected weave pattern inserted into one area thereof (in "dots and blanks" form) according to the principles of the invention.

When the operator sees the design he wants, he brings the design image back onto the screen 26, presses the appropriate function keys 29 for selecting the desired weave pattern, and touches the light pen 28 onto the displayed symbolic label of that area. For example, let us say that the first area, labeled 2, FIG. 14, is to be "woven." As indicated in FIG. 14, the operator places the tip of the light pen against the part of the screen 26 which is displaying the symbol "2." This signals the machine to insert into area 2 a displayed representation of the chosen weave pattern. In the present instance it is assumed that "Weave Pattern 52," FIG. 9, which is a twill weave, has been picked for area 2. The displayed image of area label "2" now disappears, and this area becomes filled with a representation of Weave Pattern 52. In FIG. 15 this display 52 is assumed to be in "dots and blanks" form, rather than in the "lines and dashes" form shown in FIG. 9.

As will be explained more fully hereinafter, the system is adapted to display weave patterns optionally in "dots and blanks" or "lines and dashes" mode, as determined by the operator. The "dots and blanks" mode is preferred while the weave patterns are being inserted into the areas of the outline design. When all of the areas are filled with weave patterns, the display then may be changed to a "lines and dashes" form, as fragmentarily illustrated in FIG. 16. When lines and dashes are employed, the points on the boundary lines become "woven out," i.e., replaced by the superimposed thread crossing symbols of the weave patterns. In dots and blanks mode, however, the display of the boundary line points can be preserved while the weave patterns are being inserted into the areas.

It should be noted that the weave inserting action described above was brought about merely by arbitrarily associating a chosen area symbol (2) with a selected weave pattern number (52). With these two choices having been made, the mode of operation is such that a weave pattern represented by a particular number (52) is caused to appear on the screen 26 within the boundaries of an area represented by a particular alphameric symbol (2). As already indicated, the labeling symbol preferably disappears from that area in the course of this weave-inserting operation.

It is not essential that a light pen be employed as the instrumentality for selecting an area which is to be woven. Since each area is given a distinctive label that is stored in memory, one could recall such area label from memory in any of several suitable ways, not necessarily by the use of a light pen.

Figure 16:
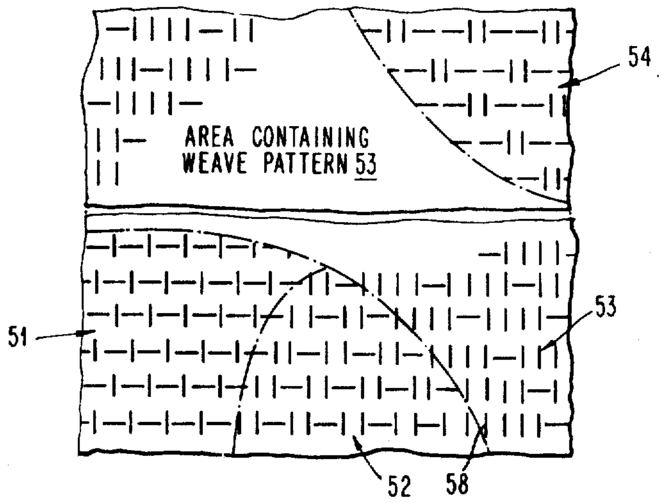
FIG. 16 is an expanded view of the screen showing a portion of the weave design displayed thereon in "lines and dashes" form.

In a fashion similar to that explained above, for FIG. 15, the various other disjoint areas of the design are "woven" on the viewing screen. Let it be assumed that weave patterns 51, 52, 53 and 54, FIGS. 8–11, respectively, are inserted into the areas 1, 2, 3 and 4. FIG. 16 represents as expanded portion of the design shown in FIG. 7 after all areas thereof have been "woven" and the display has been converted to lines-and-dashes form. Since the visible area labels 1, 2, 3 and 4 are assumed to have disappeared, the respective areas are identified in FIG. 16 by the numbers of the weave patterns 51, 52, 53 and 54 which have been inserted therein. The technique for expanding any given portion of the displayed weave design is well known and will not be described herein.

It will be recalled that the accepted rules of woven fabric construction require that there be no more than a certain number of "floats" (i.e., threads of one type uninterruptedly crossing consecutive threads of another type without an intervening anchorage point) in order to maintain minimal strength for that type of fabric. Let us assume, in the example shown in FIG. 16, that the maximum number of permissible floats is five. (This is not intended to be a practical example.) It will be observed that where the weave pattern 52 adjoins the weave pattern 53, there is a condition in which six consecutive warp threads float over a single weft thread, as indicated by a series of six vertical lines arranged side by side in the lower right corner of FIG. 16. Each time a situation of this kind occurs, it may be desired to change one or more of the thread crossings from a warp-over-weft crossing (vertical line) to a weft-over-warp crossing (horizontal line).

Figure 17:
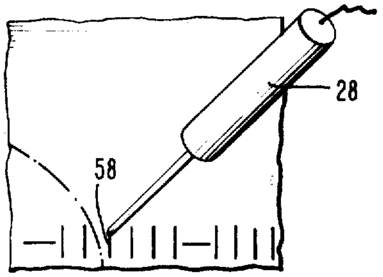
FIGS. 17 and 18 are schematic representations of the manner in which a displayed thread crossing symbol can be altered in accordance with the invention.

Let us say, for example, that the operator desires to change the weft-over-warp crossing indicated at 58, FIG. 16, to a warp-over-weft crossing. To do this, in accordance with the presently contemplated procedure, the operator first ascertains the coordinates of the thread crossing that is to be inverted. This can be done conveniently by placing the tip of the light pen 28 to the crossing representation 58, as shown in FIG. 17 and depressing a foot switch (not shown) to signal attention. One of the functions of a light pen is to establish the coordinates of any point on the screen to which the pen is applied. Having accomplished this, the operator then manipulates a special switch or program function key that calls for an "alter" or "invert" operation (to be described hereinafter), which changes a thread crossing representation of one type to a thread crossing representation of the opposite type, as indicated at 59 in FIG. 18. This enables the selected weave patterns to be altered wherever necessary in order to comply with the structural rules for the fabric under consideration.

There may be occasions when an operator is completely dissatisfied with the aesthetic appearance of a particular combination of weave patterns, and he wishes to delete a chosen weave pattern entirely from a given area of the screen in order that it may be replaced by a different weave pattern, In this situation the operator identifies the area in question (for example, by pointing a light pen at it) and calls for an "erase" operation in dots-and-blanks mode, as described in detail hereinafter. This causes the unwanted bit pattern to be erased from the screen within the geometric limits of that area, as established by the stored boundary bits thereof. Preferably the system is arranged so that the area label reappears in the area from which the weave pattern has been erased.

A system of this kind is capable of many other operations not all of which will be described herein. In the portion of the description that shortly follows, detailed operational examples will be chosen for the purpose of illustration, and the various functions involved in the weave designing procedure will be described as they would be performed either by a general-purpose computer programmed to do this particular job or by a data processing system especially designed for carrying out this type of operation.

Figure 19:
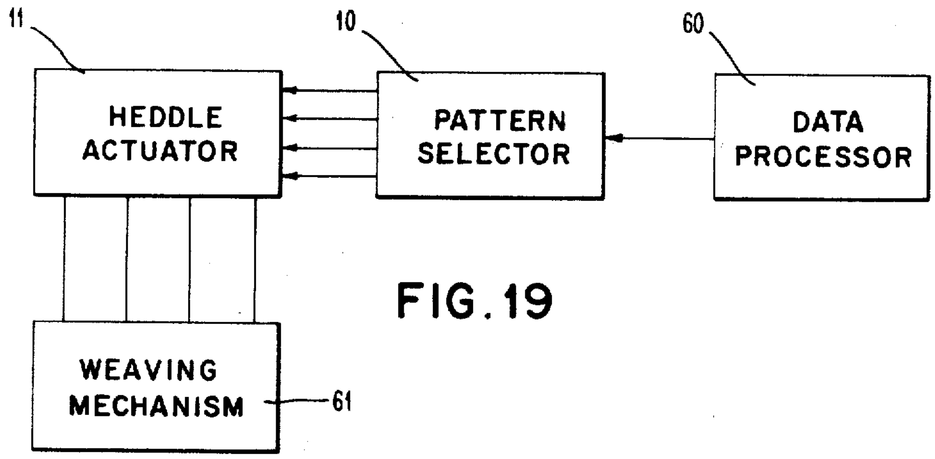
FIG. 19 is a diagrammatic representation of a data processor directly controlling a loom.

When the final weave design has been worked out to the operator's satisfaction on the screen of the display unit, there will have been stored in the memory all of the data bits representing that weave design, arranged in row-by-row fashion. By conventional techniques, such stored data bits can be read out in binary 1's and 0's form to a recording instrumentality, such as a card punch or magnetic tape unit, for recording the stored data bits in a suitable storage medium, e.g., cards or tape, which subsequently can be employed to control the operation of a loom. However, if the operator is interested immediately in seeing how the weave design would appear in cloth, a direct hookup between the data processor and a loom can be provided as indicated in FIG. 19. In this arrangement the data processor 60 feeds its data into a suitable interface, which can be the pattern selector 10 of FIG. 1. The pattern selector 10 applies output signals to the heddle actuator 11 of the weaving mechanism 61. As the stored weave design data is read row-by-row from the memory of the data processor 60, the heddles of the weaving mechanism 61 are automatically set to appropriate positions for weaving each row of fabric in corresponding fashion. It is assumed, of course, that suitable arrangements are incorporated in the system for reproducing the weave design in as many places as desired throughout the length and breadth of the fabric.

DETAILED DESCRIPTION OF A PREFERRED EMBODIMENT

There has been described in a general way hereinabove a textile designing method which is capable of being performed with the aid of a computer having a graphical display unit associated therewith or included therein. An IBM System/360 equipped with an IBM 2250 Display Unit, for example, has been used satisfactorily for this purpose. One could, of course, provide a special-purpose computer which is particularly adapted to do this type of job efficiently. In the portion of the description which follows reference will be made to certain data storing and processing instrumentalities for carrying out the various steps of the procedure, all of which instrumentalities may be viewed optionally as parts of a general-purpose computer programmed to do this type of operation (or the functional equivalents of such parts), or else as parts of an equivalent special-purpose data processing assemblage designed to handle this particular type of operation in the most expeditious manner.

The principal operations to which detailed attention will be given hereinafter are as follows:

(1) Design cognition, i.e., the scanning and labeling of the various disjoint areas of the outline design.

(2) Insertion of a desired weave pattern into a selected area of memory, and displaying the result upon the screen.

(3) Erasure of a displayed weave pattern from a selected area.

(4) The alteration of any selected interlacing or thread crossing symbol in a displayed weave design.

Logical flow charts herein depict the various steps of each algorithm employed in the foregoing operations. Circuitry which can be employed for carrying out most of the functions involved in these operations is disclosed herein to an extent sufficient for teaching a person of average skill in the art how to practice the significant aspects of the invention.

In presenting a detailed description of the foregoing operations, certain assumptions will be made herein. For instance, it will be assumed that the techniques for causing characters or symbols to be generated and displayed on the viewing screen of an electronic display unit are well known and need not be disclosed in detail. Such displayed characters can, at the will of the operator, be "blanked" or removed from the screen and later made to reappear thereon. It is well known also that when a light pen such as 28, FIG. 16, is placed against any point on the viewing screen, and the operator depresses a foot switch (not shown), the system generates an "attention" and automatically furnishes the following information: (1) the X and Y coordinates of the detected point on the screen, and (2) the location in the buffer storage unit (associated with the display unit) from which the detected symbol is being displayed and regenerated. The use of the light pen to draw lines and figures on the screen, or to move displayed symbols from one location to another on the screen, is well known also.

Figure 20:
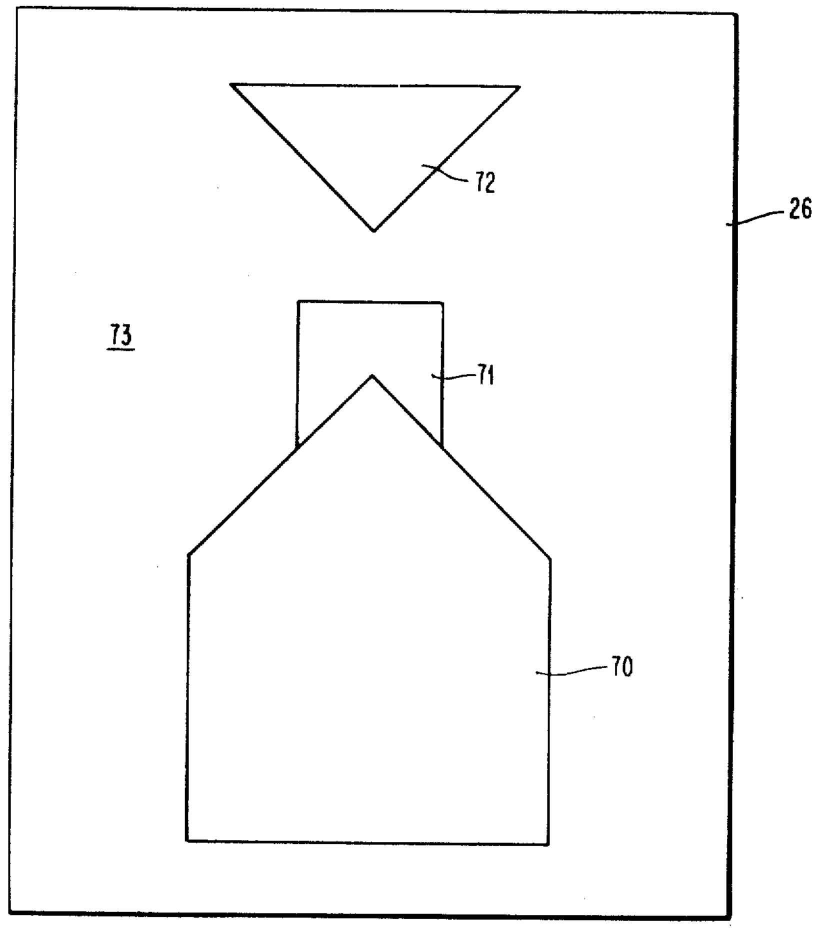
FIG. 20 is a representation of an exemplary outline design to which reference is made in the detailed description of the invention.

To provide an elementary example of a geometric design which can readily be handled by the present weave designing method, there is shown in FIG. 20 a stylized outline drawing of a house 70 having a chimney 71 from which a wisp of smoke 72 is ascending, with the background area being designated 73. Let us assume now that this outline figure is to be stored in a 21 x 26 matrix of memory cells in the manner indicated by FIG. 21, wherein the cross-hatched or shaped squares represent memory cells storing "1" bits, and the blank squares represent cells storing "0" bits. The storing of an outline design in a matrix having such a small number of memory cells would result in a rather distorted representation of the design, due to the coarse grid of the coordinate array. In practice it would not be feasible to use such a grid for storing a design to be woven, since no well-defined weave design of any appreciable size could be woven into a fabric unit comprising only 21 warp threads and 26 weft threads. For present explanatory purposes, however, the use of this particular example will enable us to simplify the description of the scanning and area cognition operation while still taking into account a variety of situations that may occur in practice. To make the problem appear more practical, one could assume that each of the blank squares in FIG. 21 actually represents a large group or set of memory cells storing 0's.

Figure 21:
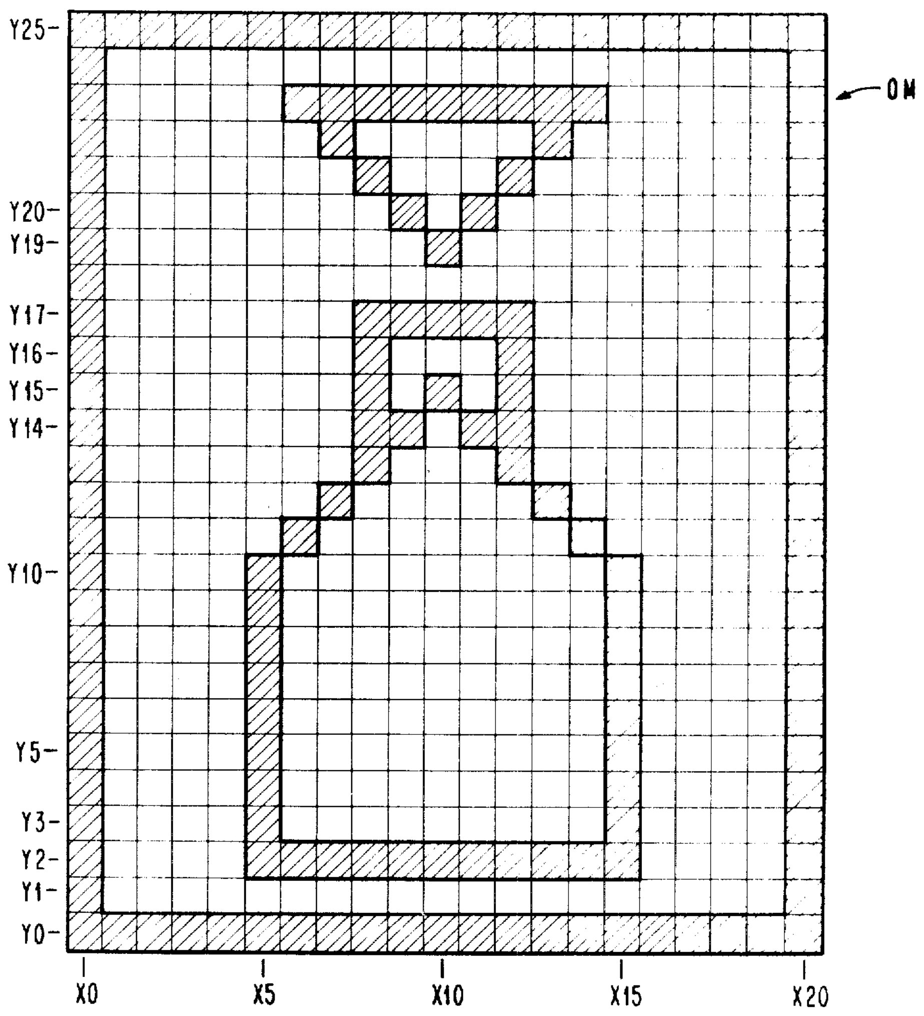
FIG. 21 is a diagrammatic illustration of the design shown in FIG. 20 as it would be stored in an outline memory matrix.
Figure 26:
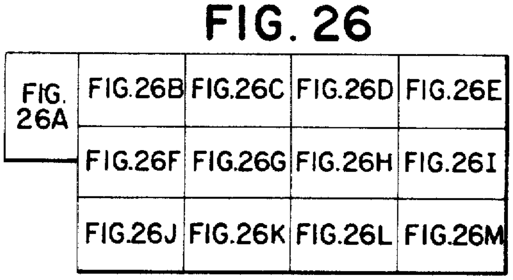
FIGS. 26A to 26M, when arranged in the manner shown by FIG. 26, constitute a circuit diagram of a data processing apparatus in which the principal features of the invention are embodied.
Figure 26A:
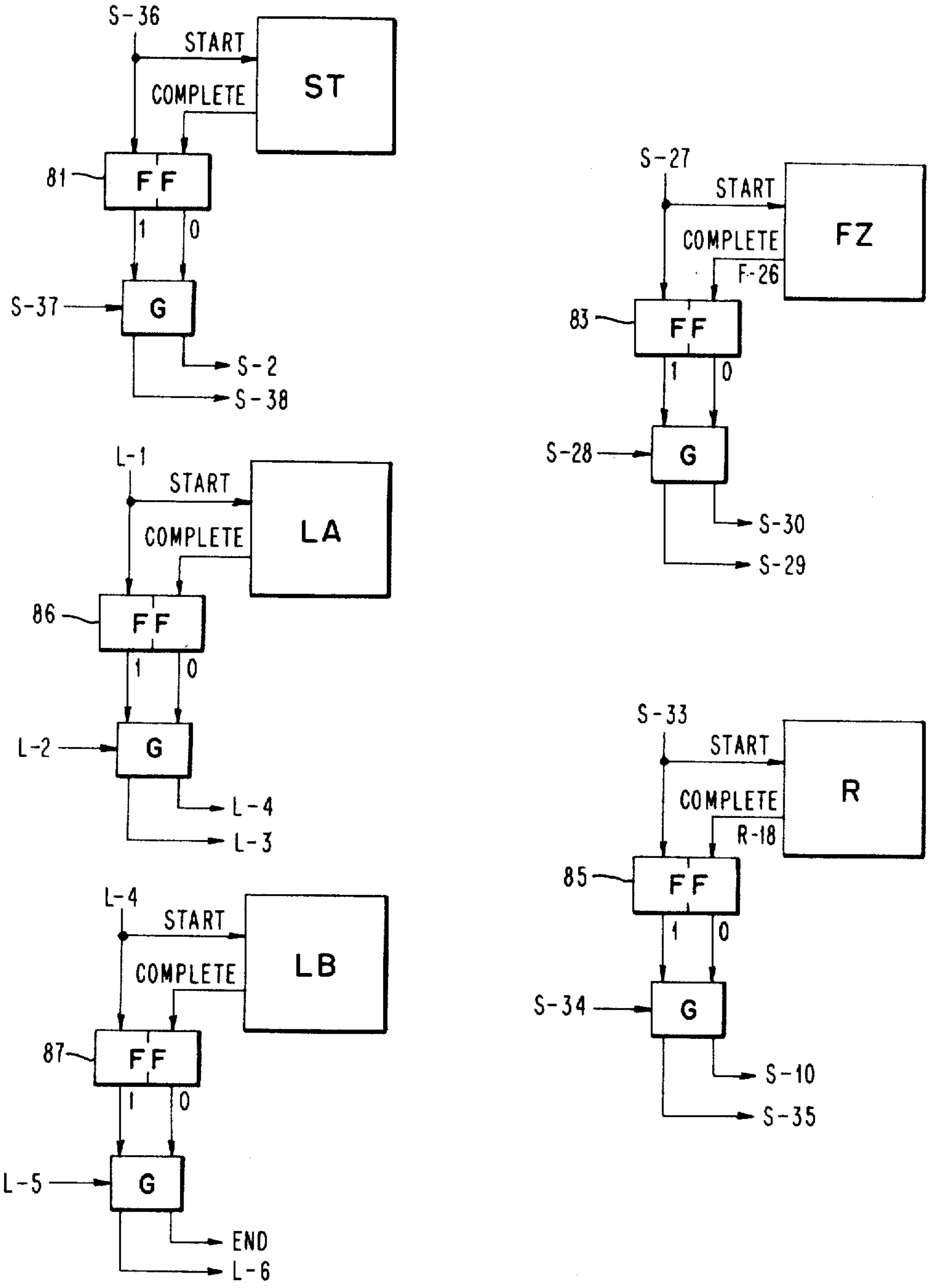
Figure 26B:
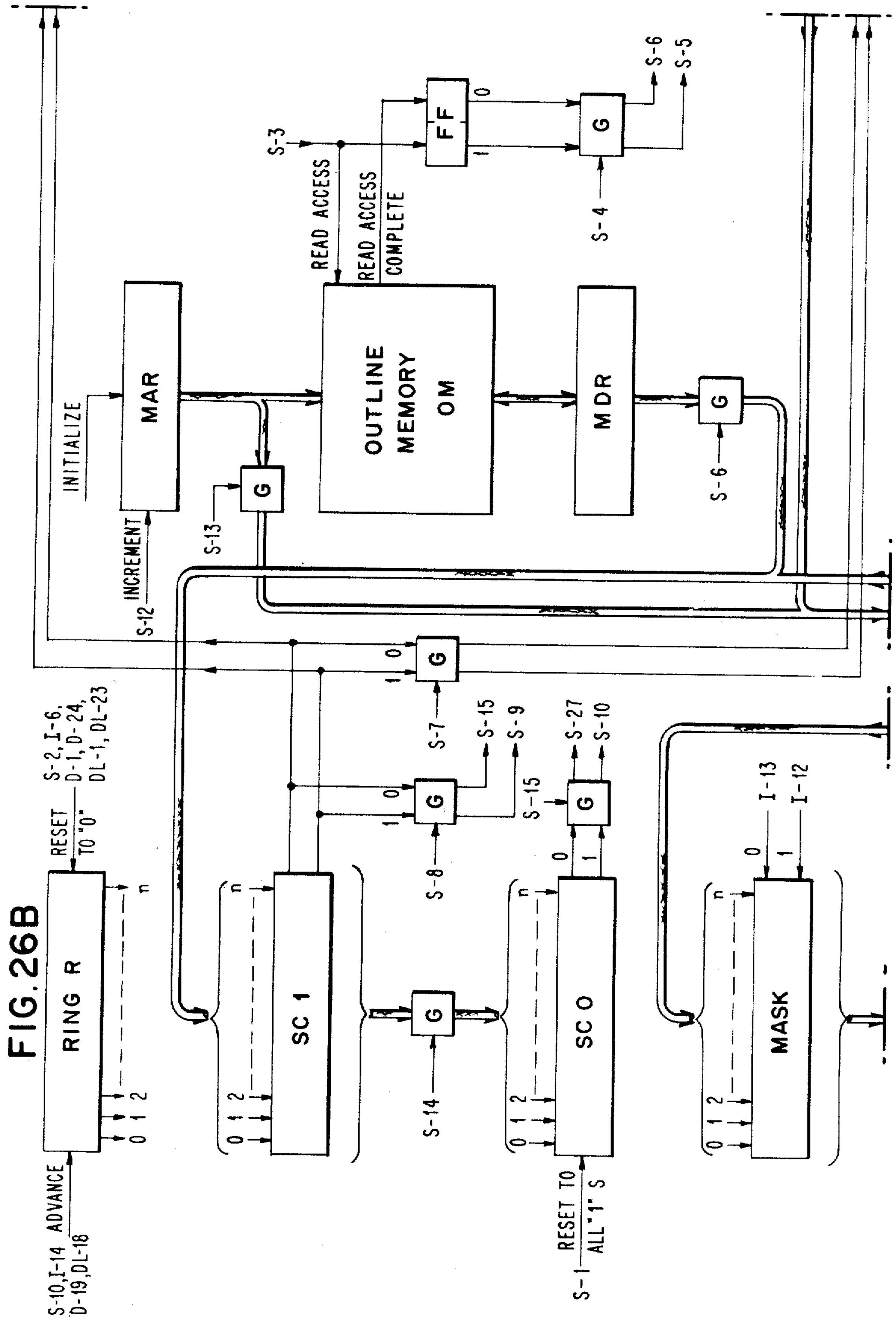
Figure 26C:
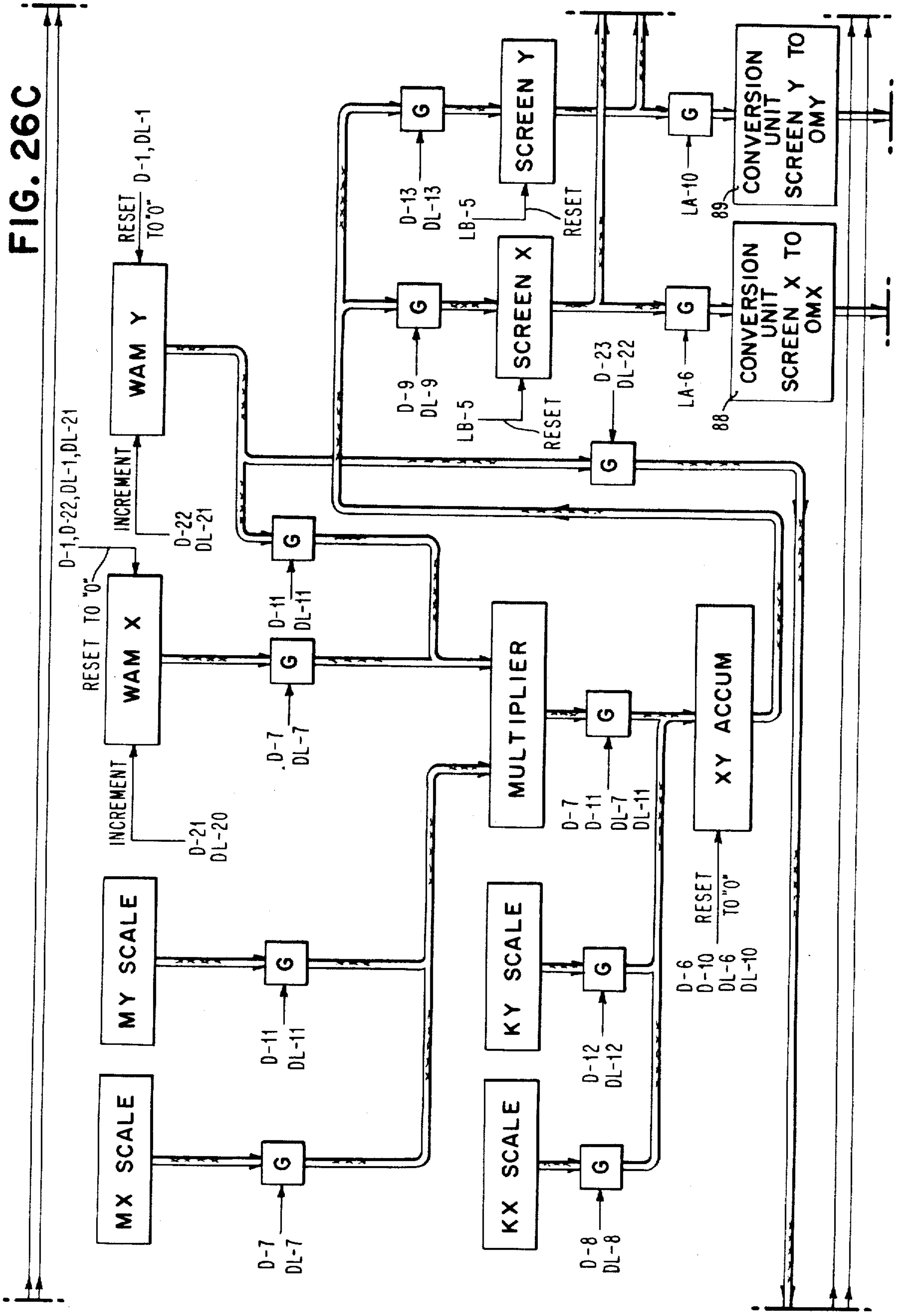

The memory array which stores the outline boundaries of the design under consideration will be referred to hereinafter as the "outline memory" OM (FIGS. 21 and 26B). This memory is a binary matrix and does not store any numerical quantities other than individual 1's and 0's. That is to say, it does not store items of coded information which must be represented by groups of cells, as in certain other memories of this system. As a matter of convenience, however, we shall in this part of the description make a fictionalized assumption that the cells of the matrix OM are capable of registering zone numbers as well as 0's and 1's. Thus, referring to FIG. 23, a white square labeled "3," for instance, is assumed to store a 0 (meaning it is not a boundary bit) and also a zone number 3. A black shaded square labeled "2" is assumed to store a "1" boundary bit and also a zone number 2. Actually, all zone numbers are stored in a separate "scan memory" (SM), FIGS. 26E and 34, to be described hereinafter. By adopting this convention for present purposes, it will be possible to provide a simple introductory explanation of the area scanning and labeling procedure, following which a more factual description of this operation will be given with reference to the memory structures that actually are utilized in practice.

The SCAN algorithm utilized herein may be summarized as follows:

(a) Scan the memory cells of the outline memory OM in row-by-row fashion to detect, in each row, the positions of the 1's or boundary bits and the 0's, if any, between boundary bits. Divide each row into segments according to the boundary bit locations therein. A segment consists of a boundary bit or a succession of boundary bits followed by a zero or a string of zeros extending to the next boundary bit. A row segment is considered to be a "zone" when it has received a zone number.

(b) If all of the zeros in a segment are positioned directly above boundary bits (i.e., 1 bits) in the next preceding row, the segment then is given a new zone number in the series of zone numbers.

(c) If any zero in a segment is positioned above a zero in the next preceding row, then as a rule the current row segment takes the same zone number as the previous row segment containing the aligned zero. This is known as "floating" or "carrying" the zone number upward.

(d) An exception to rule (c) occurs whenever a current row segment already has received a zone number which was carried up from a certain zone in the previous row, and this current row segment now is found to contain a zero aligned with a zero in a differently numbered zone of the previous row. In this case the current-row zone number takes precedence over and supersedes the inconsistent zone number wherever the latter may exist in all preceding rows, or else the system makes some alternative adjustment to recognize the fact that the zones bearing these two numbers are equivalent, since they are parts of the same disjoint area.

(e) If a zero in the current row segment is positioned above a boundary bit in the previous row, this is a tentative indication that zone equivalency may exist, but succeeding bits in the current row segment will have to be checked in accordance with rule (d) before that fact can be determined.

(f) If a boundary bit in the current row is positioned above a zero in a previous row zone, this is a tentative indication that the previous row zone can be carried up at two different places in the current row, but succeeding bits in the current row will have to be checked in accordance with rule (c) before that fact can be determined.

Proceeding now with the above example in mind, the scanning of the stored image represented in FIG. 21 commences in row Y1 (the lower boundary row Y0 being ignored for the time being, since it is handled in a special way). During the scan of row Y1 there will be encountered a boundary bit (at X0, Y1) followed by a string of zero bits in the remaining positions of the row through position X19. This causes the first zone number "1" to be assigned to the entire row Y1. Scanning and zone identification proceeds in the manner described hereinabove with reference to FIGS. 12 and 13, causing successive row segments to be assigned appropriate zone numbers which, as just mentioned, are stored in a scan memory SM.

Figure 22:
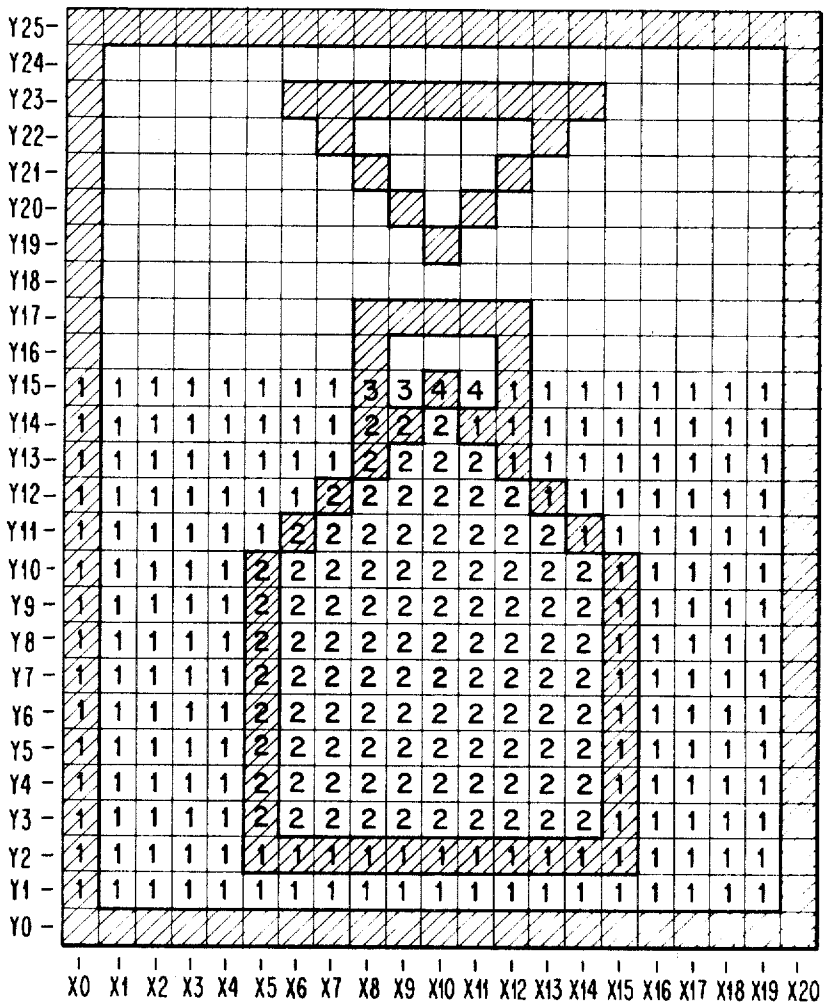
FIGS. 22 and 23 are diagrams showing different phases of the design cognition procedure described herein.
Figure 23:
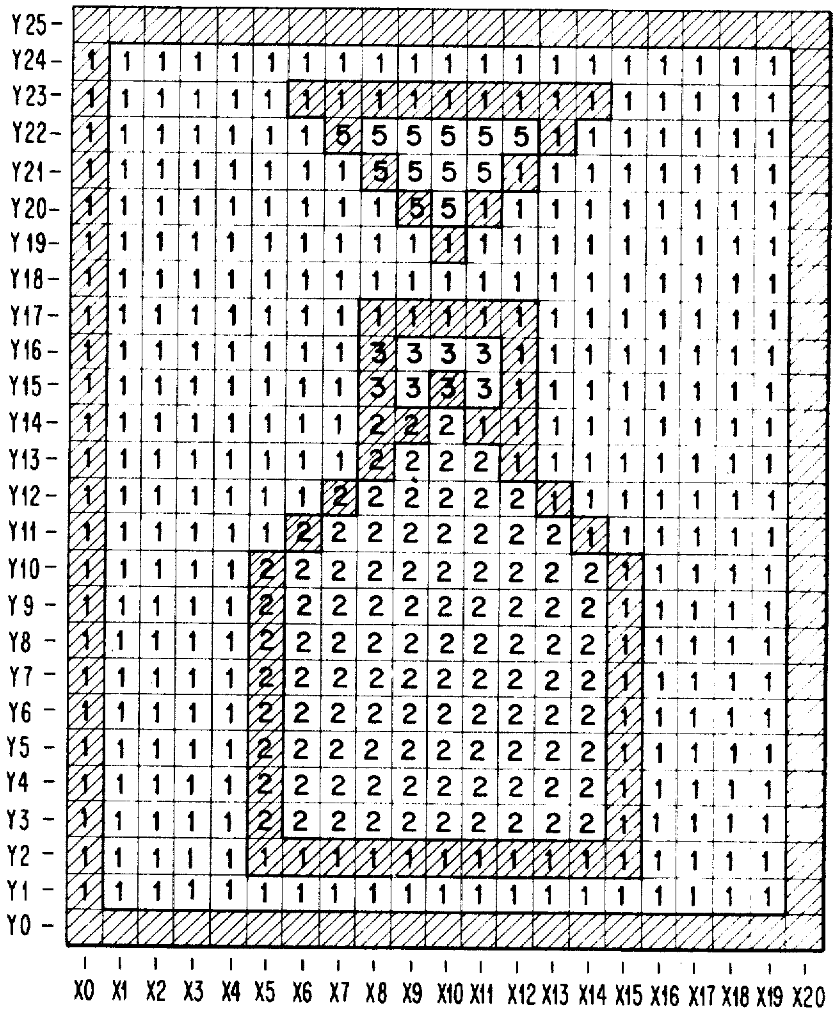

FIG. 22 depicts the condition of the system when it has completed the scanning of row Y15 and is about to start the scanning of row Y16. The portion of the outline design comprising the house proper (70 in FIG. 20) has been assigned zone number 2, while the portion of the chimney area (71 in FIG. 20) which lies on row Y15 contains (at this time) two adjacent zones numbered 3 and 4, respectively. Let us now see what occurs when the next row (Y16) is scanned:

Referring to FIG. 23 (which represents the final zone numbering of the array for the chosen design), the bit positions from X0 through X7 in row Y16, constituting the first segment of this row, will be numbered "1" inasmuch as the zero bits in this segment are positioned directly above zero bits in the segment bearing zone number 1 in row Y15. The segment of row Y16 which contains bit position X9 in row Y16 is storing a zero (as indicated by the unshaded square), and this zero bit is positioned directly above a zero bit in position X9 of row Y15 (also an unshaded square). Hence the entire zone from position X8 through position X11 is given in row Y16 is given zone number 3, as shown in FIG. 23. It now is necessary to establish the equivalency of zone 3 and zone 4 (the latter comprising the positions X10 and X11 in row Y15, FIG. 22), since these zones obviously are parts of the same area. A portion of the scan algorithm, to be described presently, requires that when a row zone already has taken a number from a preceding row zone, it cannot thereafter be assigned a different zone number. Hence, if any zero bit in such a row zone is positioned above a zero bit having a different zone number in the previous row (as would be true in the case of the bit position X11 in row Y16, FIG. 23, and the bit position X11 in row Y15, FIG. 22), it is necessary under these circumstances that the previous row zone number be converted to the current row zone number. This conversion has been shown symbolically in FIG. 23, where the bit positions X10 and X11 of row Y15 now are numbered 3, indicating that they truly are part of zone 3. This conversion actually takes place in the zone number tables which are stored in the scan memory SM, as will be described.

In the scan of row Y19, a boundary bit is encountered at position X10, and this boundary bit is followed by a string of zeroes stored in the succeeding bit positions of that row. The question now arises whether a new zone number should be assigned to the bit positions from X10 through X19. This question cannot be answered entirely from an analysis of the bits stored in row X19. The system also must determine whether any one of the zero bits following the boundary bit stored in position X10 of row Y19 is positioned above a zero bit in row Y18. This is presently the case, since all of the zero bits stored in positions X11 through X19 of row Y19 are positioned above zero bits in a zone that is numbered "1" in row Y18. Hence, the segment of row Y19 from X10 through X19 is given the zone number "1," thereby placing it in the same zone as that containing the bit positions X0 through X9 of row Y19.

During the scan of row Y20 a situation is encountered where the segment comprising bit positions X9 and X10 does not contain any zero bit positioned directly above a zero bit in the preceding row. Thus, position X9 in row Y20 stores a 1 (indicated by the shaded square); hence the fact that it is positioned above a zero in row Y19, position X9, is insignificant. Position X10 of row Y20 stores a zero (unshaded square), but it is positioned above a 1 bit stored in row Y19. Thus far, no decision can be made as to the zone numbering of the segment comprising X9 and X10. Now, when the scan moves to the next bit position, X11, it encounters a boundary bit, indicating the possible start of a new zone. At this point it becomes clear that a new zone number must be assigned to the segment of row Y20 containing bits X9 and X10. Accordingly, a zone number "5" is assigned thereto.

FIG. 23 represents the final and complete assignment of zone numbers to the various segments of the outline design. Zone numbers are not assigned to the lower and upper boundary rows Y0 and Y25, nor to the right-hand boundary column X20. The sensing of the boundary bit stored in the X20 position of each row merely signifies that one row scan has been completed and another row scan should commence. For present purposes, it is assumed that all outline designs will be spaced from the right border of the scanned area. If it is desired that the system also handle cases where a boundary line of the design joins the right border of the scanned area, suitable modifications of the scan algorithm can be made to insure proper zone numbering under these circumstances.

Typical operations that can be performed by the disclosed system will be described in conjunction with the circuit diagram shown in FIGS. 26A to 26M. Some of the component parts of this system now will be described.

A representation of the design outline shown in FIG. 20 is stored in the outline memory OM, FIGS. 21 and 26B, which includes a conventional memory address register (MAR) and a memory data register (MDR), the latter serving as an input-output unit for OM. The memory address register MAR calls a row of data at a time from the outline memory OM, and the data bits in this row (1's and 0's) are temporarily stored in MDR until the latter is instructed to transfer its contents to some other register in the system or back into OM.

Figure 26D:
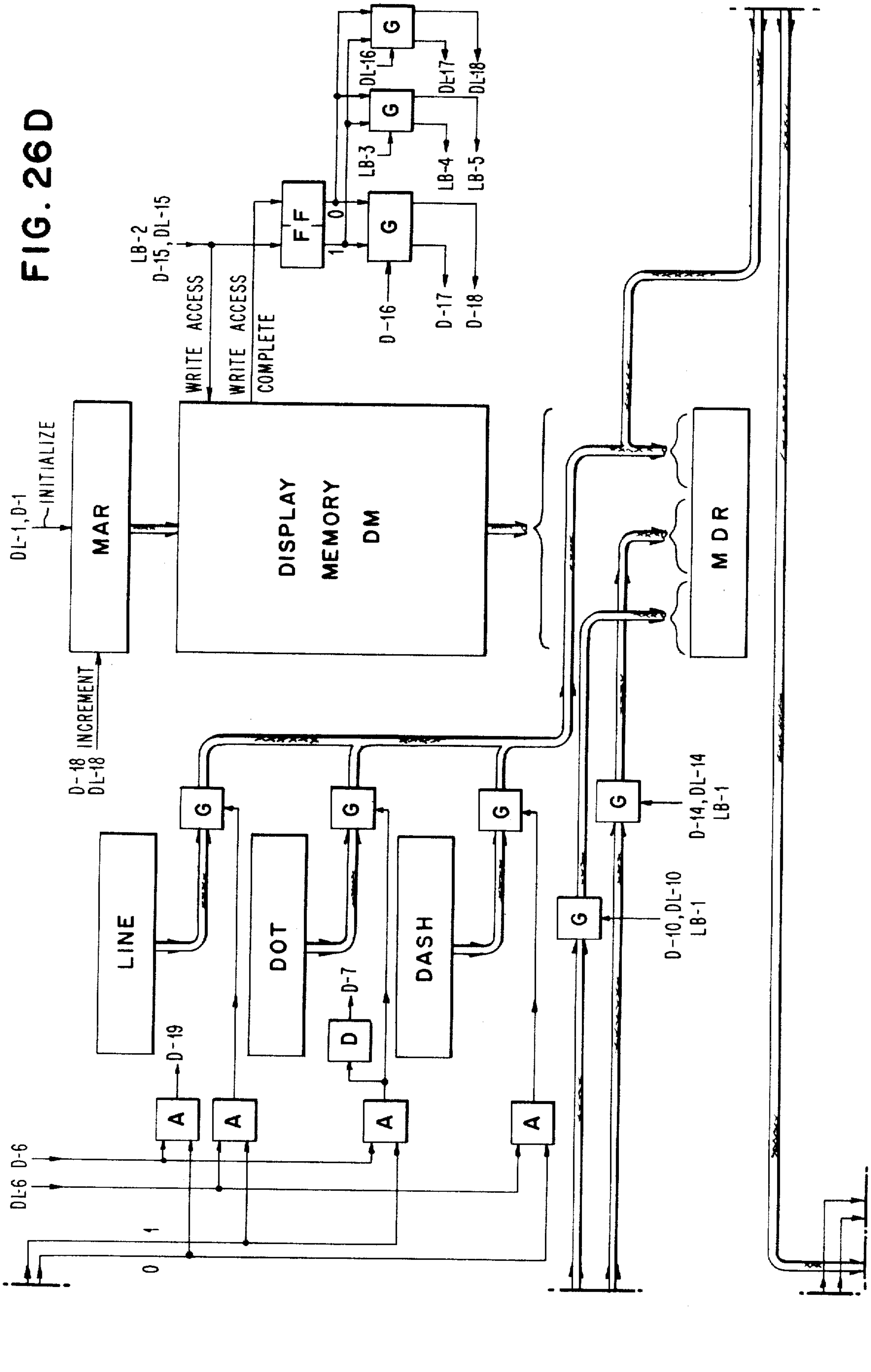
Figure 37:
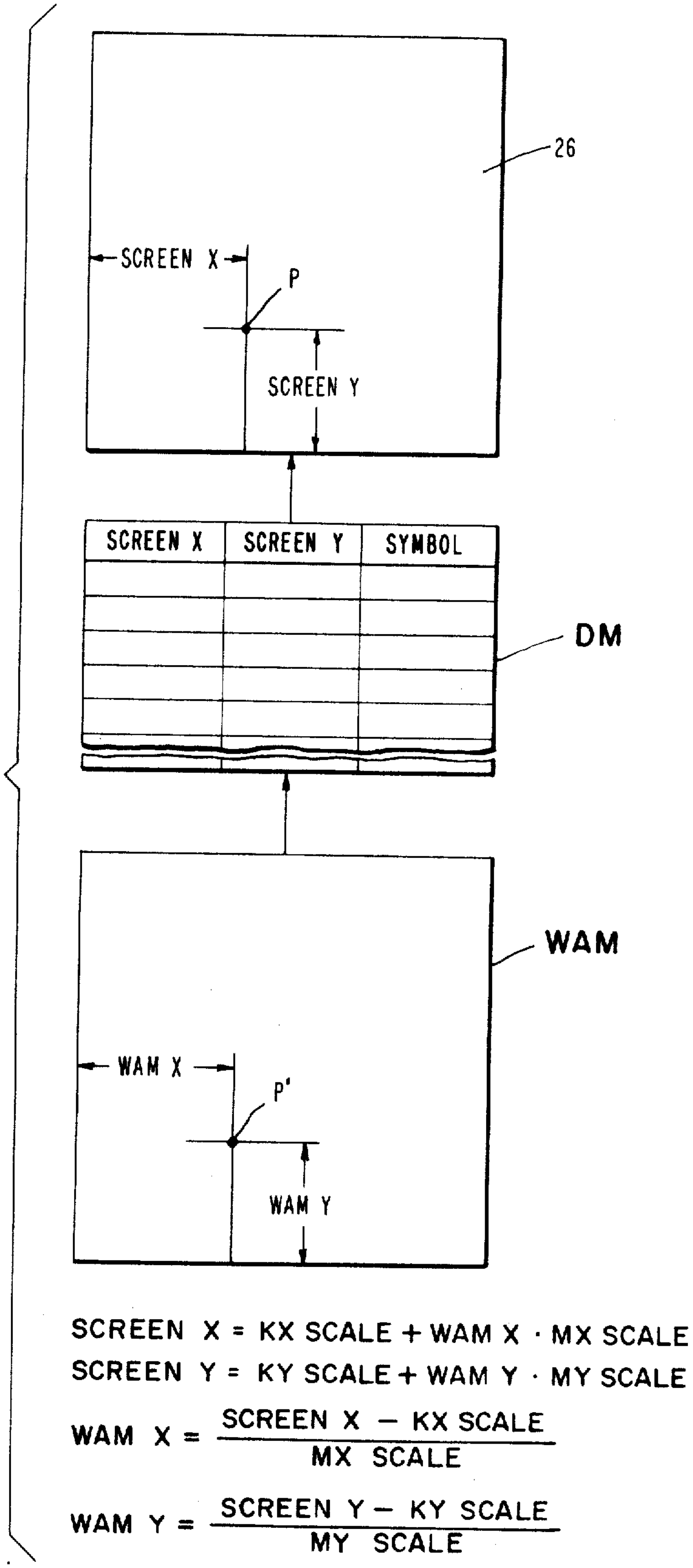
FIG. 37 is a diagram showing the mathematical relationship between coordinates on the viewing screen and corresponding coordinates in the binary data matrix storing the displayed information.

To store graphical information, such as a stored outline design, in a form whereby it can readily be displayed on the viewing screen of the display unit, there is provided a display memory DM, FIGS. 37 and 26D. This memory is adapated to store items of information in at least three fields, namely, an X coordinate field, a Y coordinate field and a "symbol" field. (Additional fields may be required under some circumstances, as pointed out elsewhere herein.) The X and Y coordinates stored in display memory DM are actual screen coordinates; that is, they indicate the position that a displayed symbol would occupy with reference to an assumed coordinate grid of approximately 1000 x 1000 index points, if such a grid were laid out on the screen. These X and Y screen coordinates also may be stored separately from the display memory DM in SCREEN X and SCREEN Y registers, respectively, FIG. 26C.

The right-hand or "symbol" field of DM stores a representation of the alphanumeric or other symbol (if any) which is to be displayed at the point on the screen designated by the coordinates stored in the X and Y fields. Representations of individual "line," "dash" and "dot" symbols, can be stored in the display memory DM, and they can be stored also in LINE, DASH, and DOT registers, FIG. 26D. The display memory DM furthermore can store representations of points or dots that are to be interconnected by lines or vectors generated upon the screen, such as points in the boundary lines of the outline design stored in the outline memory OM, although for the purposes of the present disclosure it can be assumed that each boundary is defined by a series of points rather than a continuous line.

The stored contents of the display memory DM are continuously fed to the buffer storage section of the display unit, hereinafter referred to simply as the "buffer" (not shown). The manner in which symbols, characters, connected lines, and so forth are generated and displayed terms "segment" and "zone" as a rule are used intermation stored in its buffer is well known and will not be described in detail herein.

The display memory DM may receive entries from several sources. One such source is the previously mentioned outline memory OM, FIG. 26B. Another memory that may supply data to DM is a "woven area memory" WAM, FIGS. 26F and 35, which is utilized in a subsequent portion of the operation, hereinafter described, to store representations of weave designs that have been developed in binary matrix form. In going from a memory such as OM or WAM into the memory DM, it usually is necessary to translate the X and Y coordinates of the source memory into the corresponding X and Y coordinates of the display memory DM. This process will be discussed at length hereinafter.

In the present instance it will be assumed that a suitable operation already has been performed for entering the boundary-defining information from OM into DM, so that the screen now displays the desired outline figure. Data subsequently entered into DM can under some conditions, partially or wholly supersede the outline data or other symbolic data already stored therein, but the latter can be reinstated when desired merely by retrieving it from the appropriate source memory and entering it again into DM.

Figure 26E:
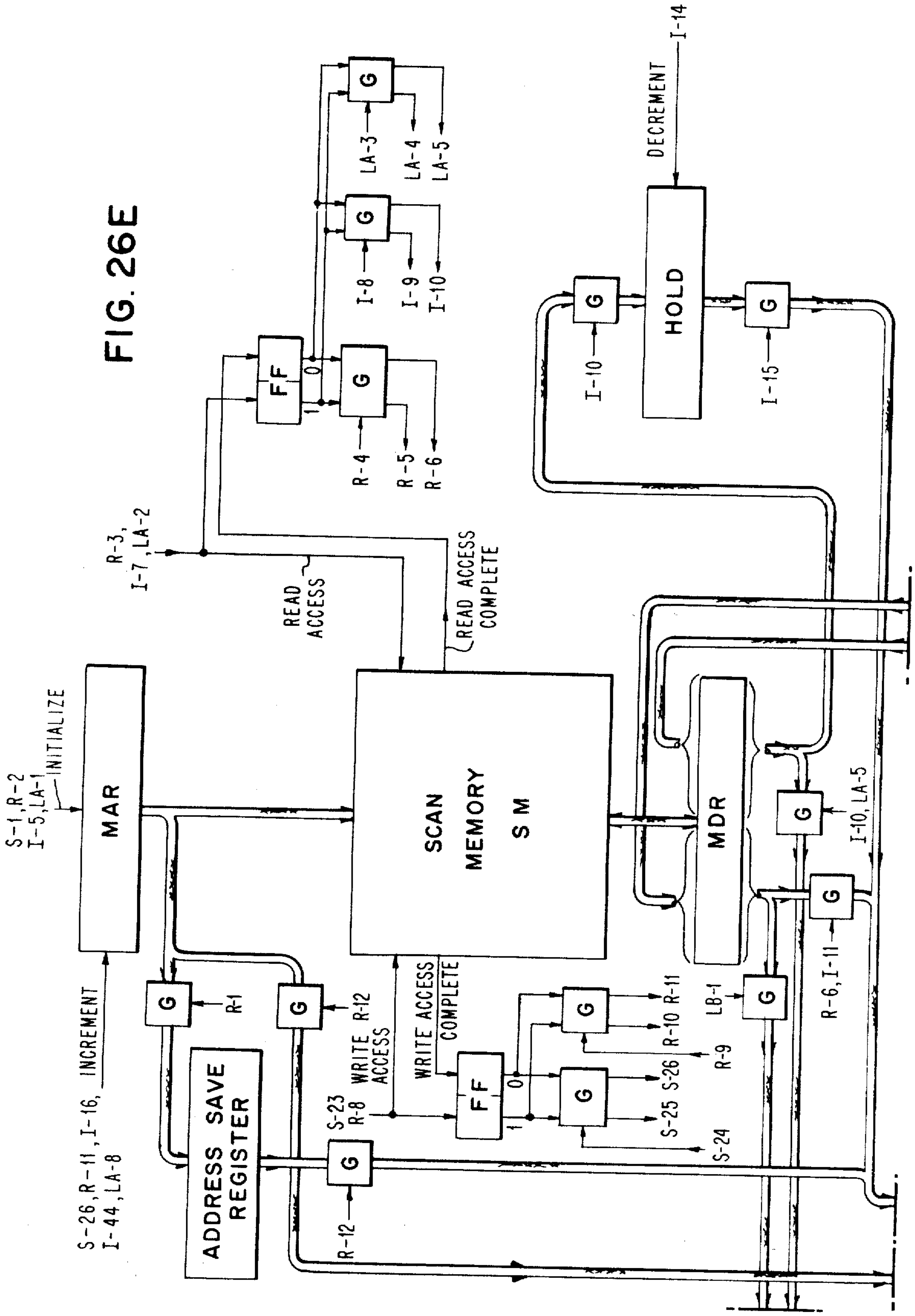
Figure 26F:
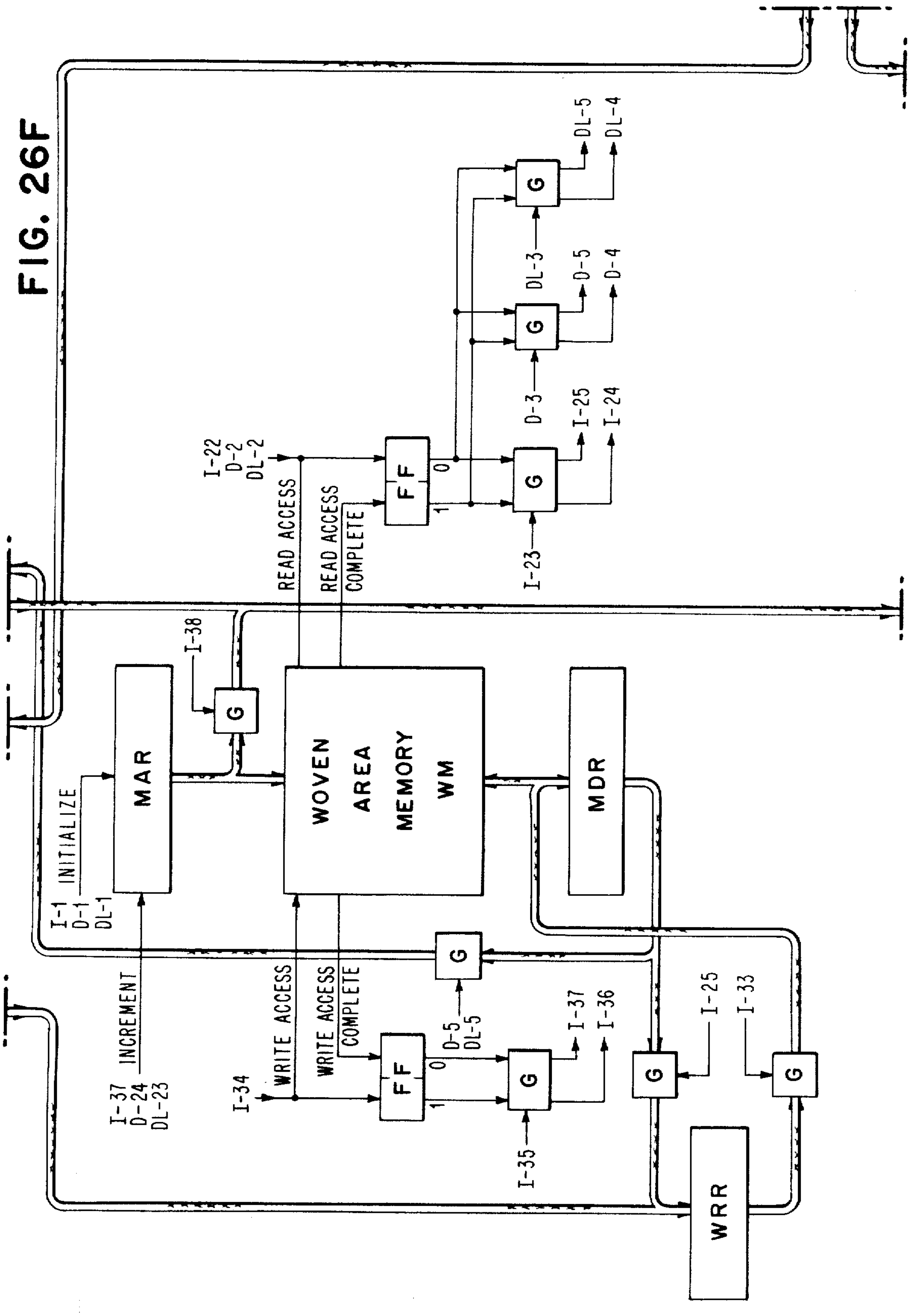
Figure 34:
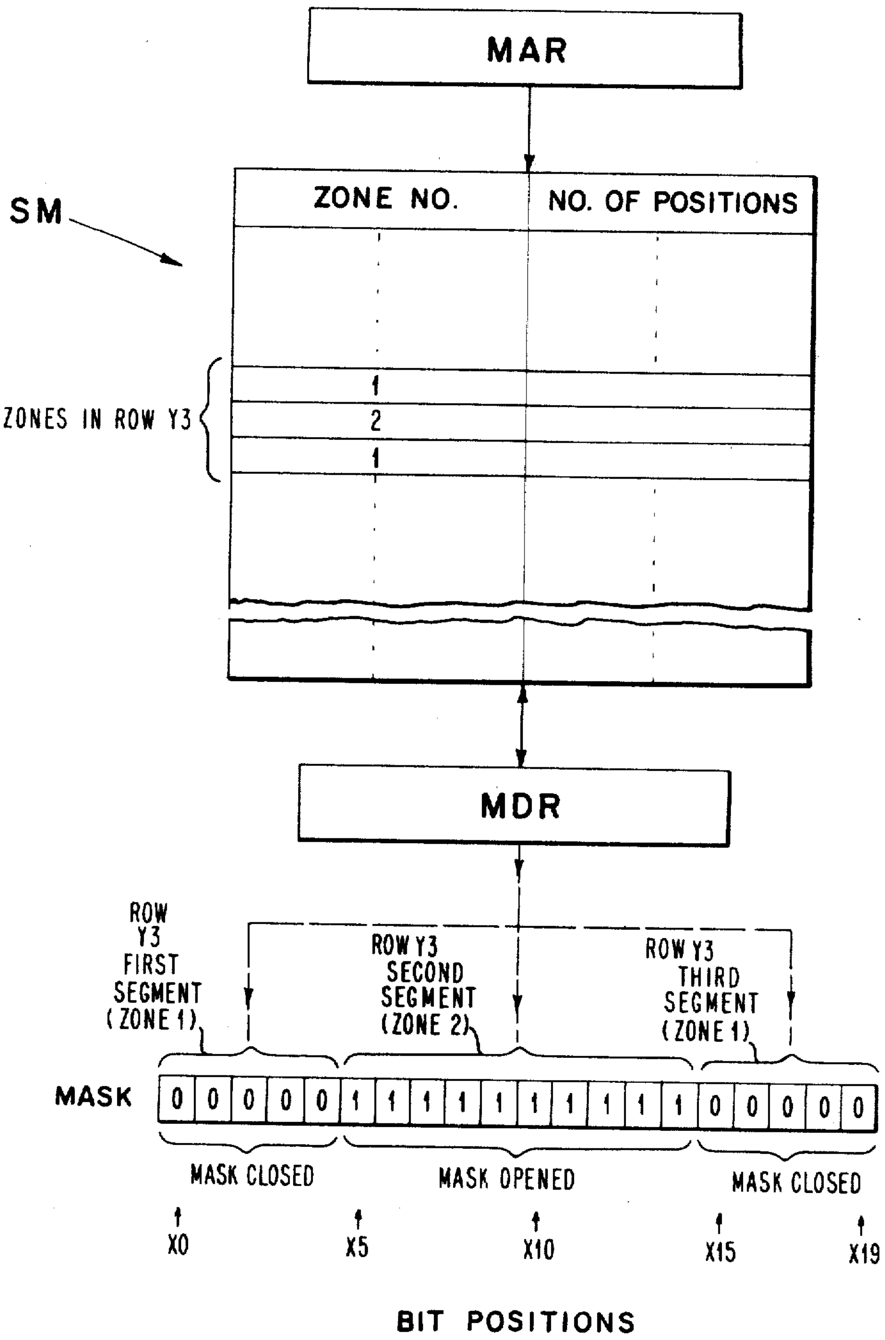

The illustrated system includes a scan memory, SM, FIGS. 26E and 34, which is provided with a memory address register (MAR) and a memory data register (MDR). In this scan memory SM there is progressively stored (as the operation proceeds) a table of row segments respectively identified by their zone numbers, along with the number of bit positions occupied by each segment. This information constitutes the "scan table." Information is entered into and withdrawn from this scan table one row segment or one row zone at a time.

Figure 26G:
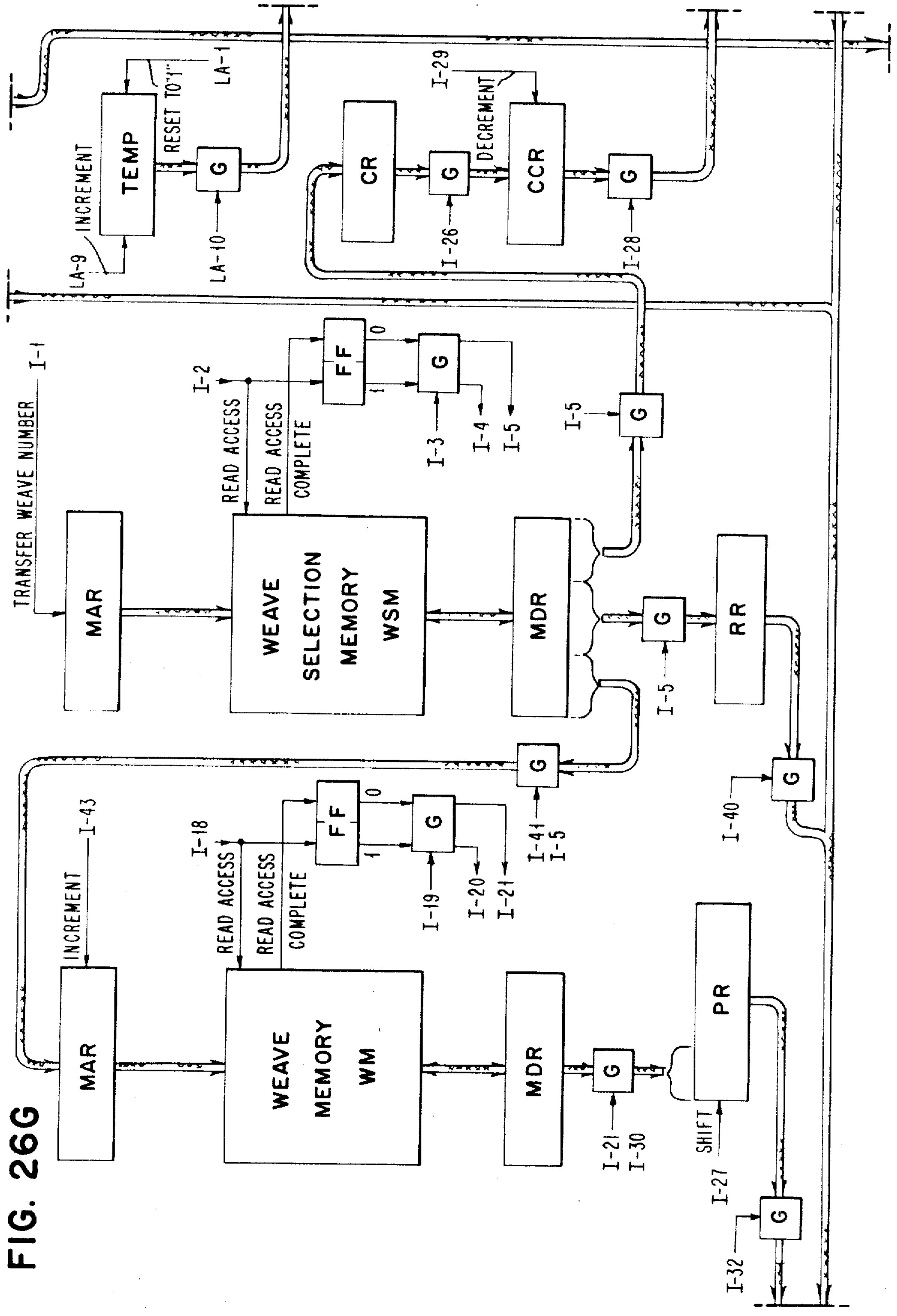
Figure 26H:
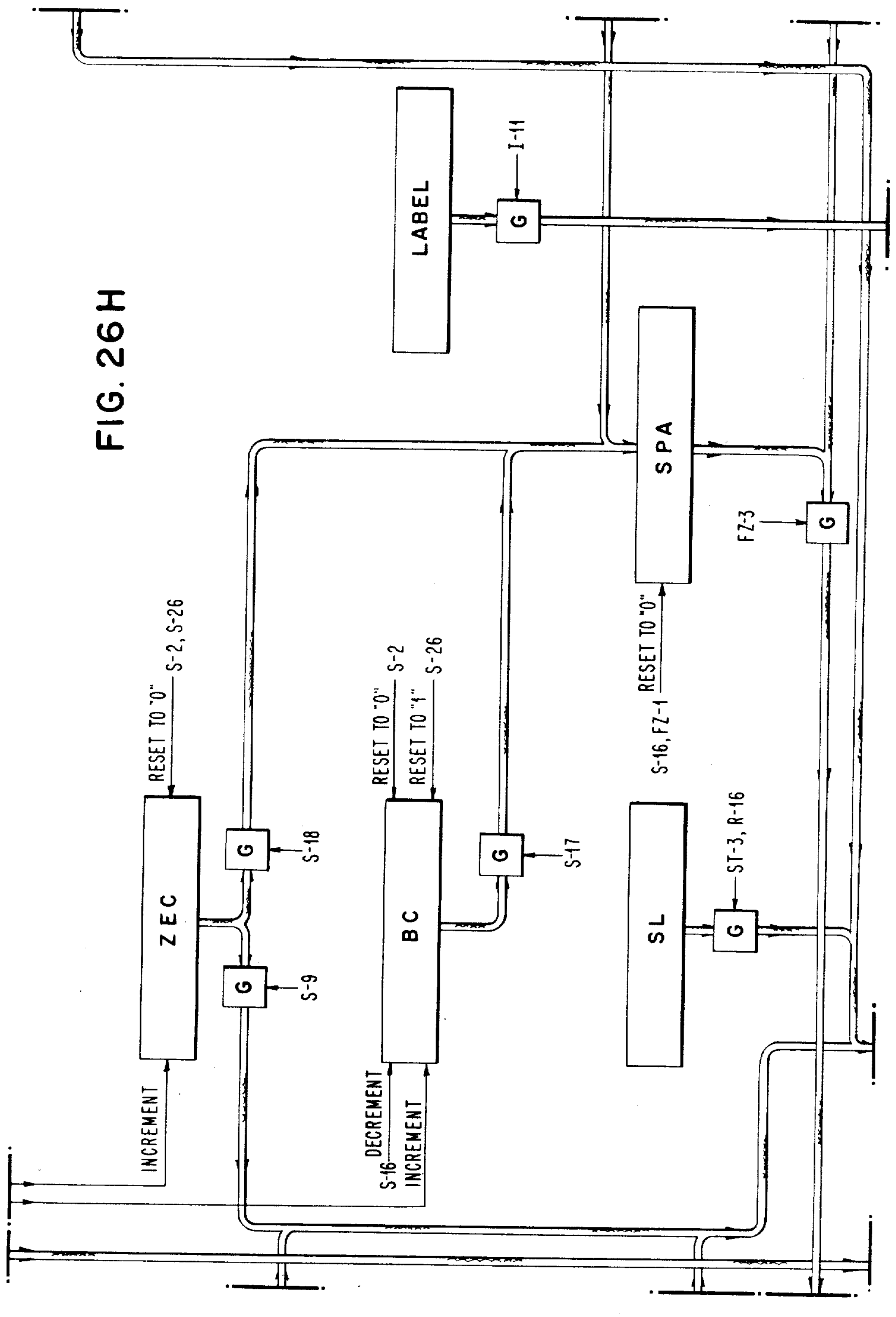
Figure 26I:
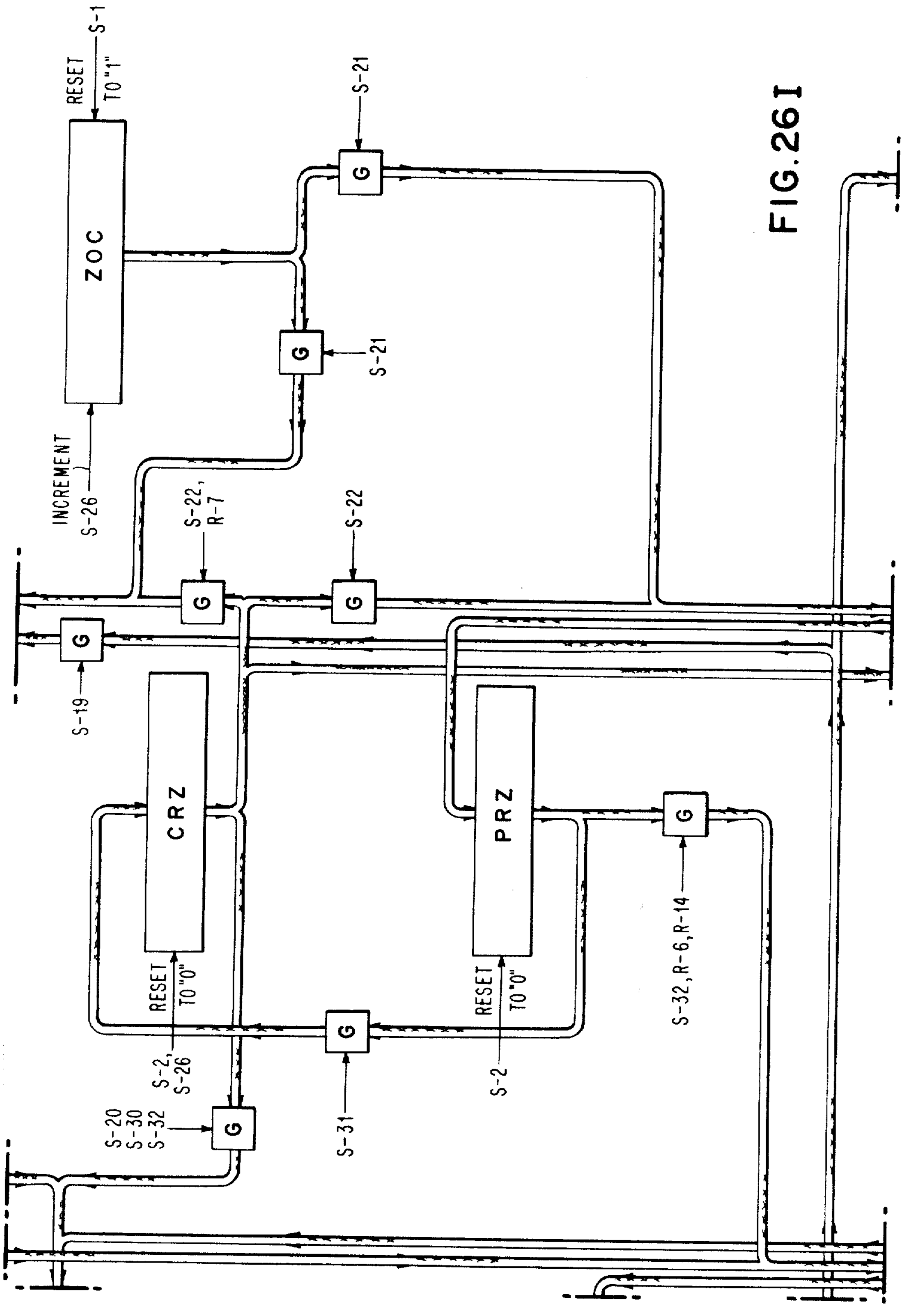
Figure 26J:
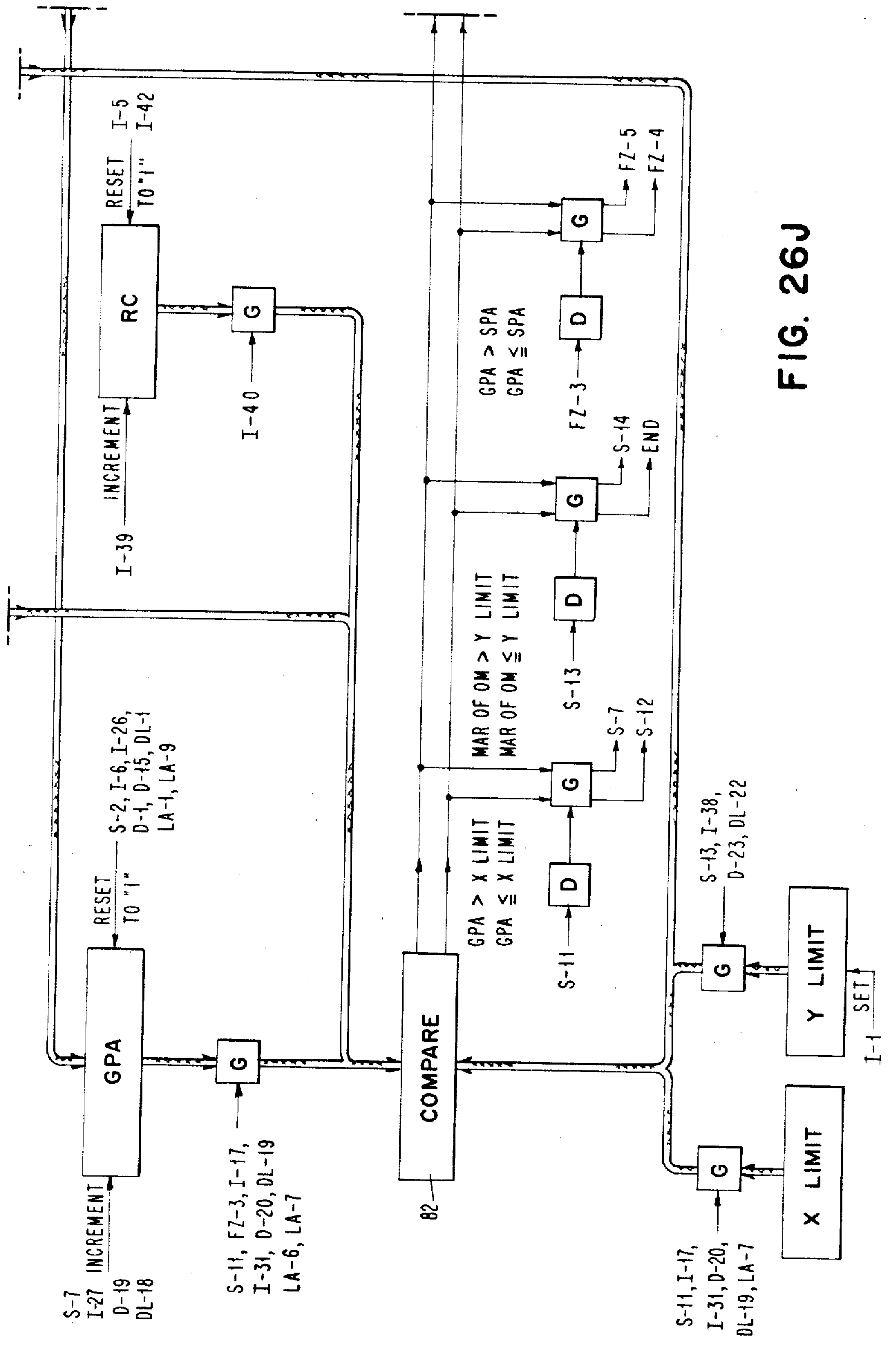
Figure 26K:
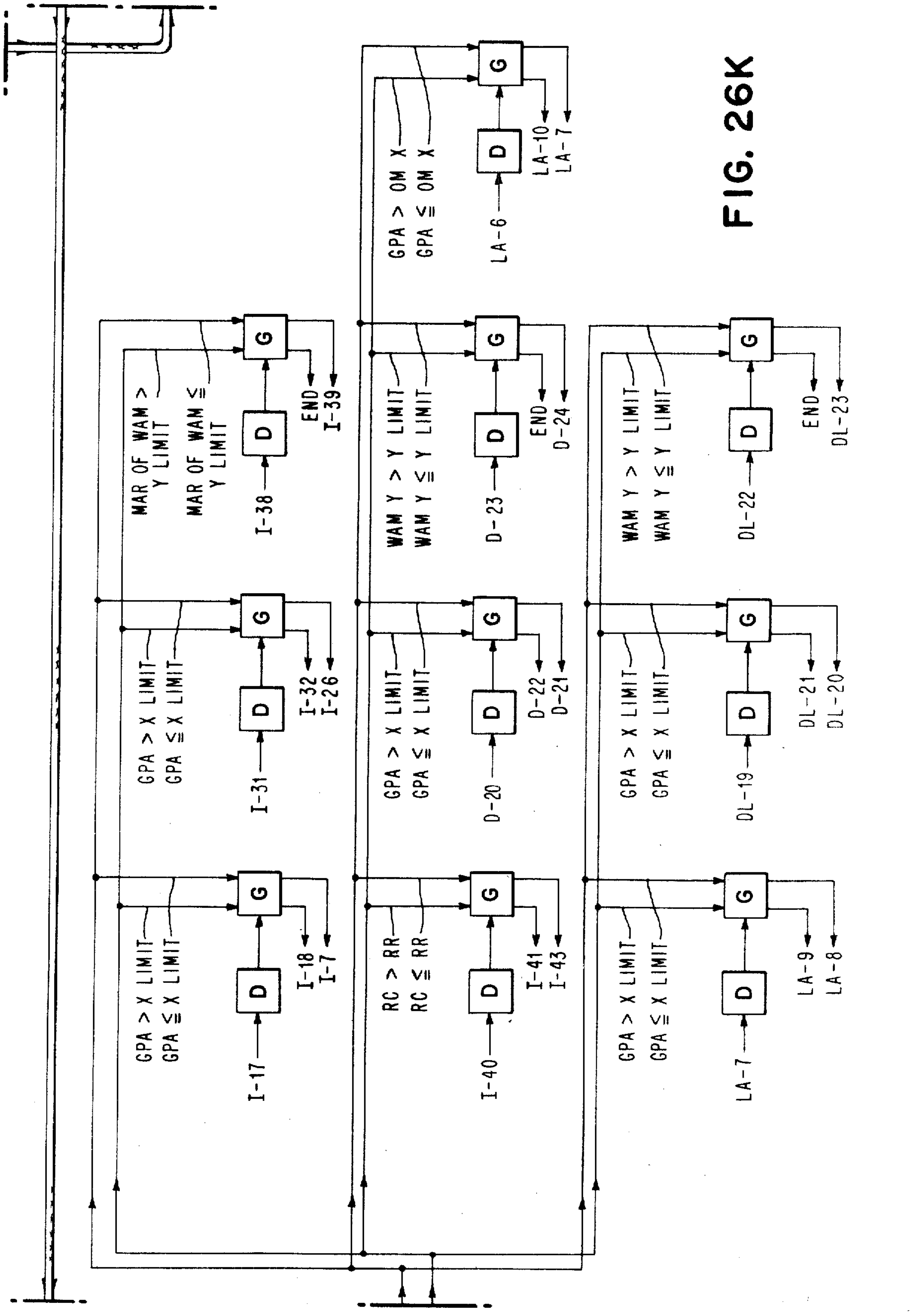
Figure 26L:
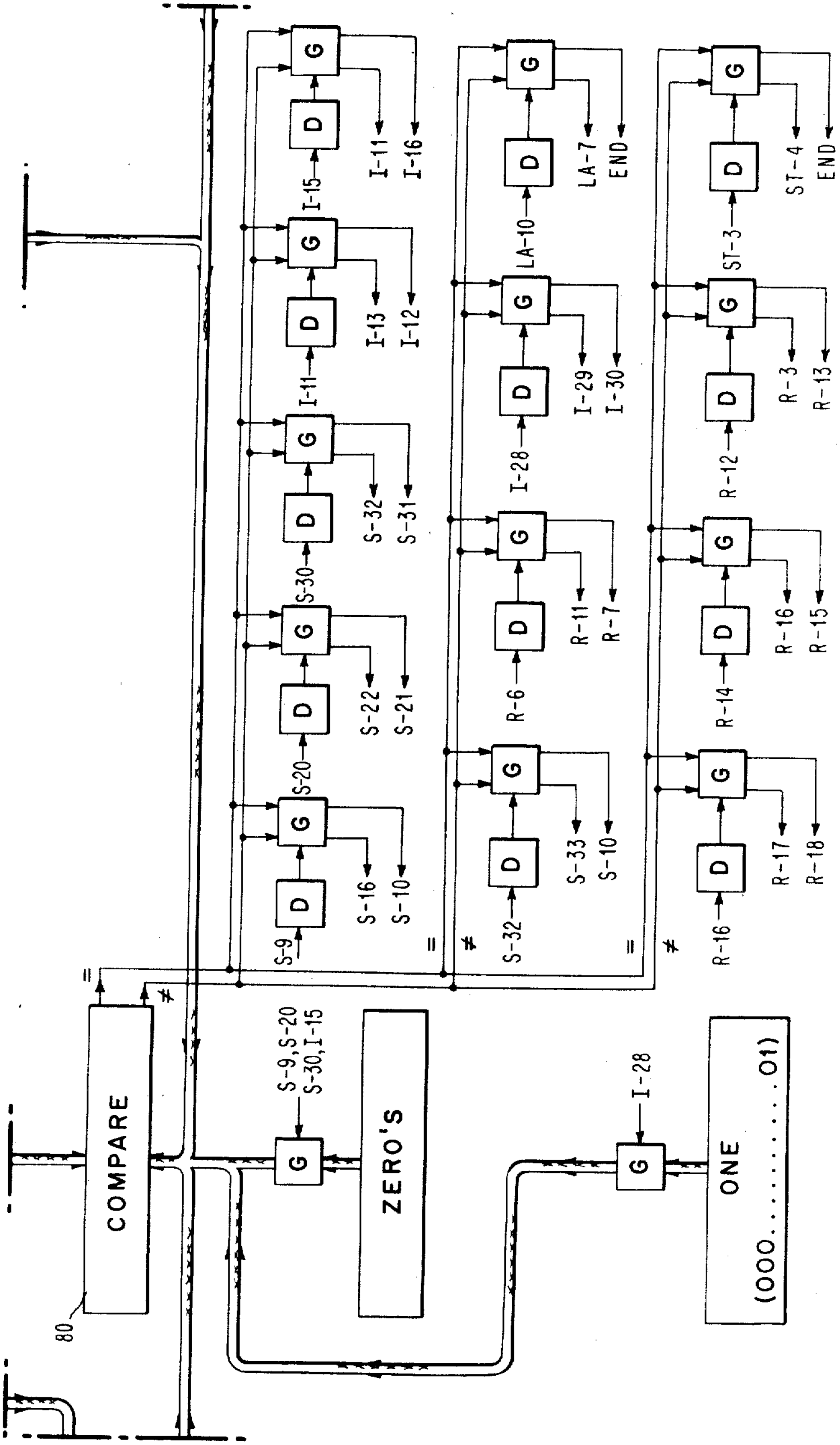
Figure 26M:
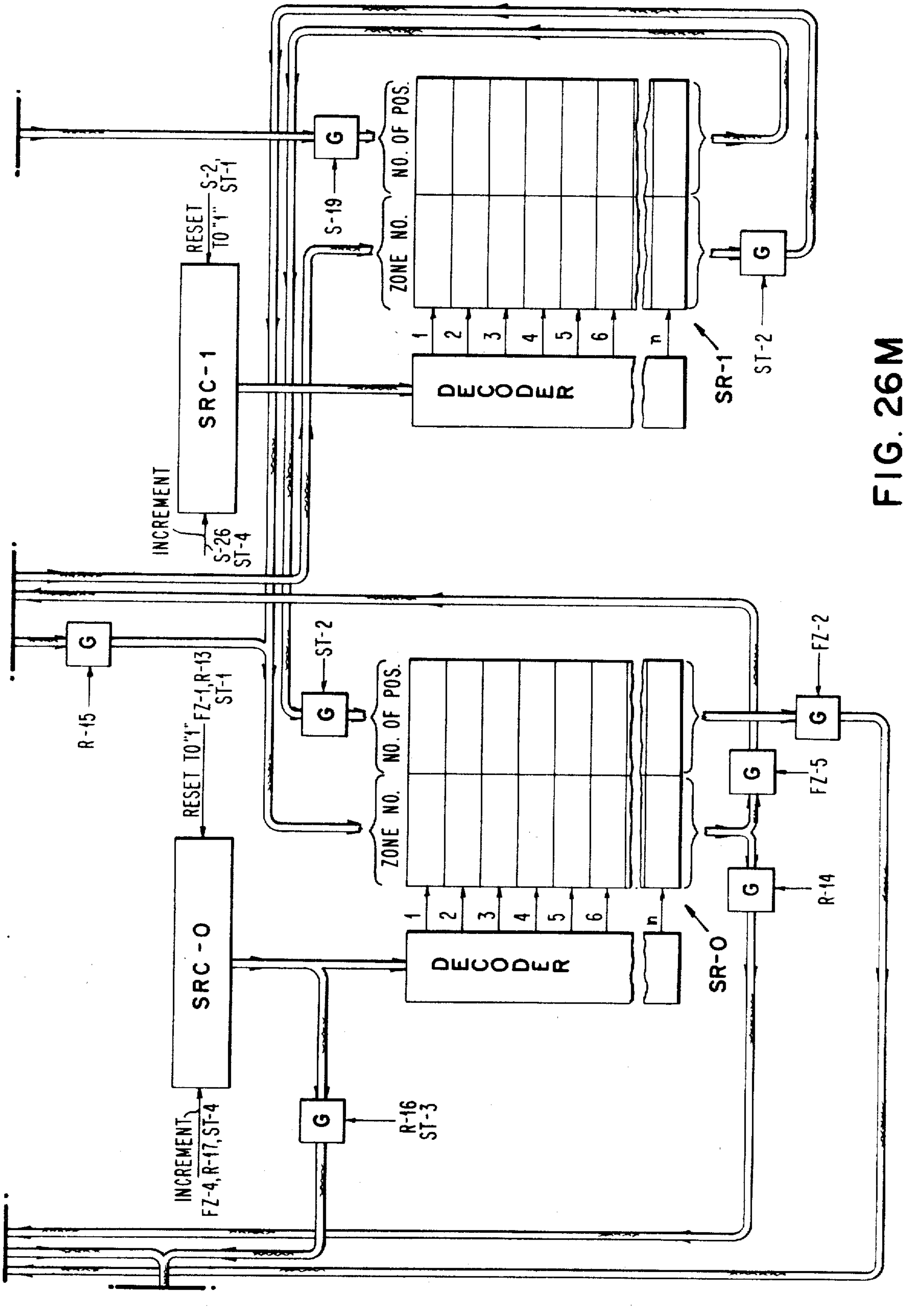
Figure 46:
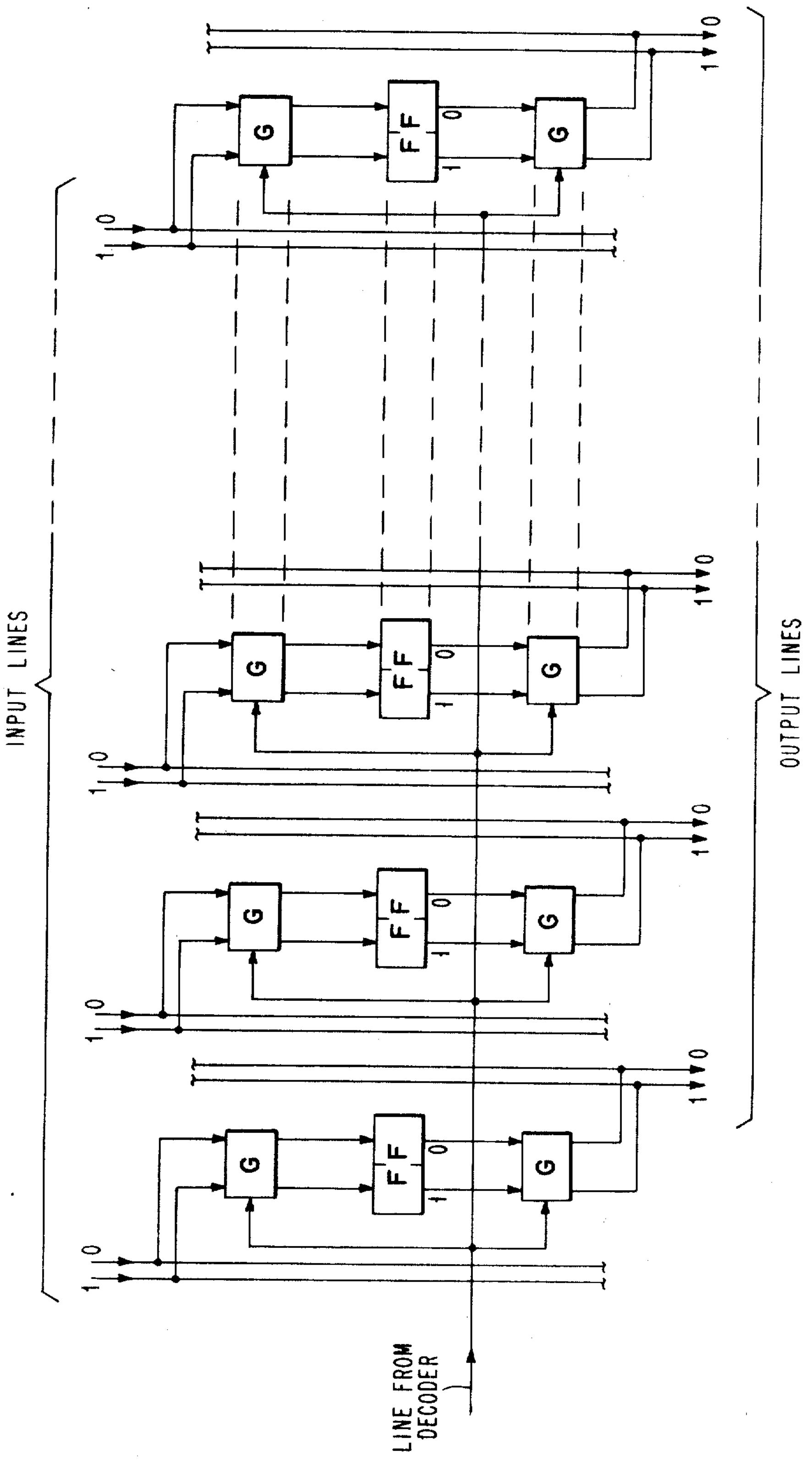
Figure 47:
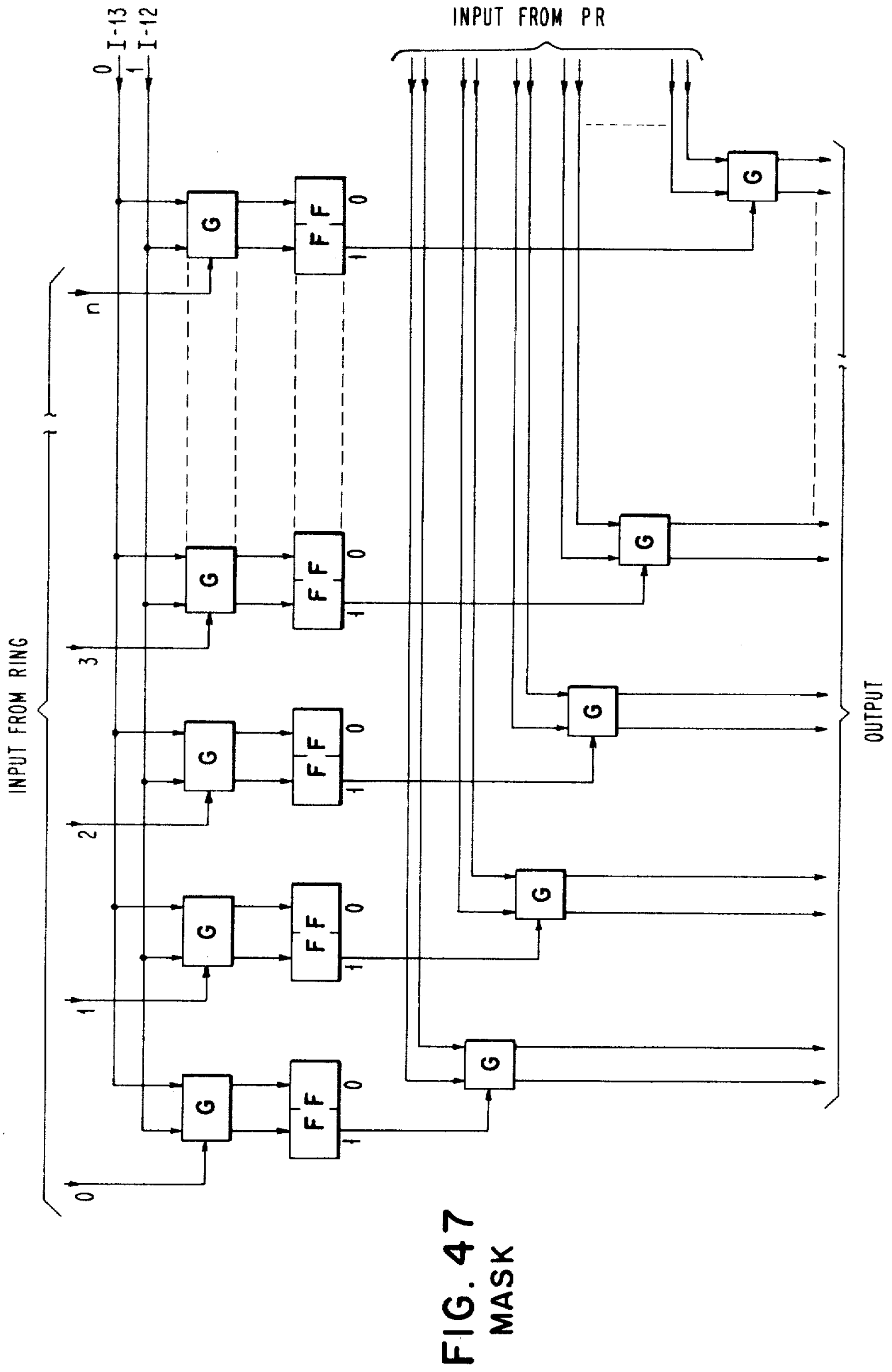

The system also is provided with two segment registers respectively identified as a "current row" segment register SR1 and a "previous row" segment register SR0 FIG. 26M, which temporarily store information of the type stored in scan memory SM. The construction of an "SR" register is indicated in FIG. 46. Each entry into a segment register consists of the zone number assigned to the row segment under consideration and the number of bit positions in that segment. Also associated with the segment registers SR1 and SR0 are segment register counters SRC1 and SRC0, respectively, FIG. 26M, each of which maintains a count of the segments that have been entered into the respective segment register during its present setting, thereby keeping the segment address updated according to this count. A decoder associated with each of the segment registers SR1 and SR0 converts the binary-coded numerical count registered by the associated segment register counter into a corresponding "1-out-of-*n* units" count for the purpose of addressing the segment register. Each segment register is adapted to store in its various segment locations the zone data relating to a single row of the outline memory OM (the currently scanned row in one case and the previously scanned row in the other case.) The scan memory SM stores data of this kind for all rows of the outline memory OM.

The segment count number registered by a segment register counter does not necessarily correspond to the zone number of the row segment currently under consideration although there may be instances where such a correspondence does exist. As noted hereinabove, there will be cases where the zone numbers respectively assigned to the successive segments of a row are not themselves in numerical sequence. This can be seen, for example, in row Y16, FIG. 23, where the successive row segments are identified respectively by the zone numbers 1, 3 and 1. The zone data for these segments will be arranged in that same order in the segment register.

As zone numbers successively are assigned to the row segments during the scan operation, a zone number counter ZOC, FIG. 26I, maintains a count of those zone numbers which already have been assigned, so that when a new zone is encountered during the scan, a new zone number can be assigned thereto. In the event that two differently numbered zones are subsequently found to be equivalent (in the sense that they belong in the same disjoint area), and are "merged" to eliminate one of these zone numbers, the setting of the zone number counter ZOC is not disturbed or corrected to correspond with the deleation of a zone number. There simply will be a discontinuity in the series of zone numbers assigned to the several areas as the result of the scanning and labeling operation. If it is deemed desirable that continuity of zone numbering be preserved, suitable modifications of the algorithm can be made.

Figure 45:
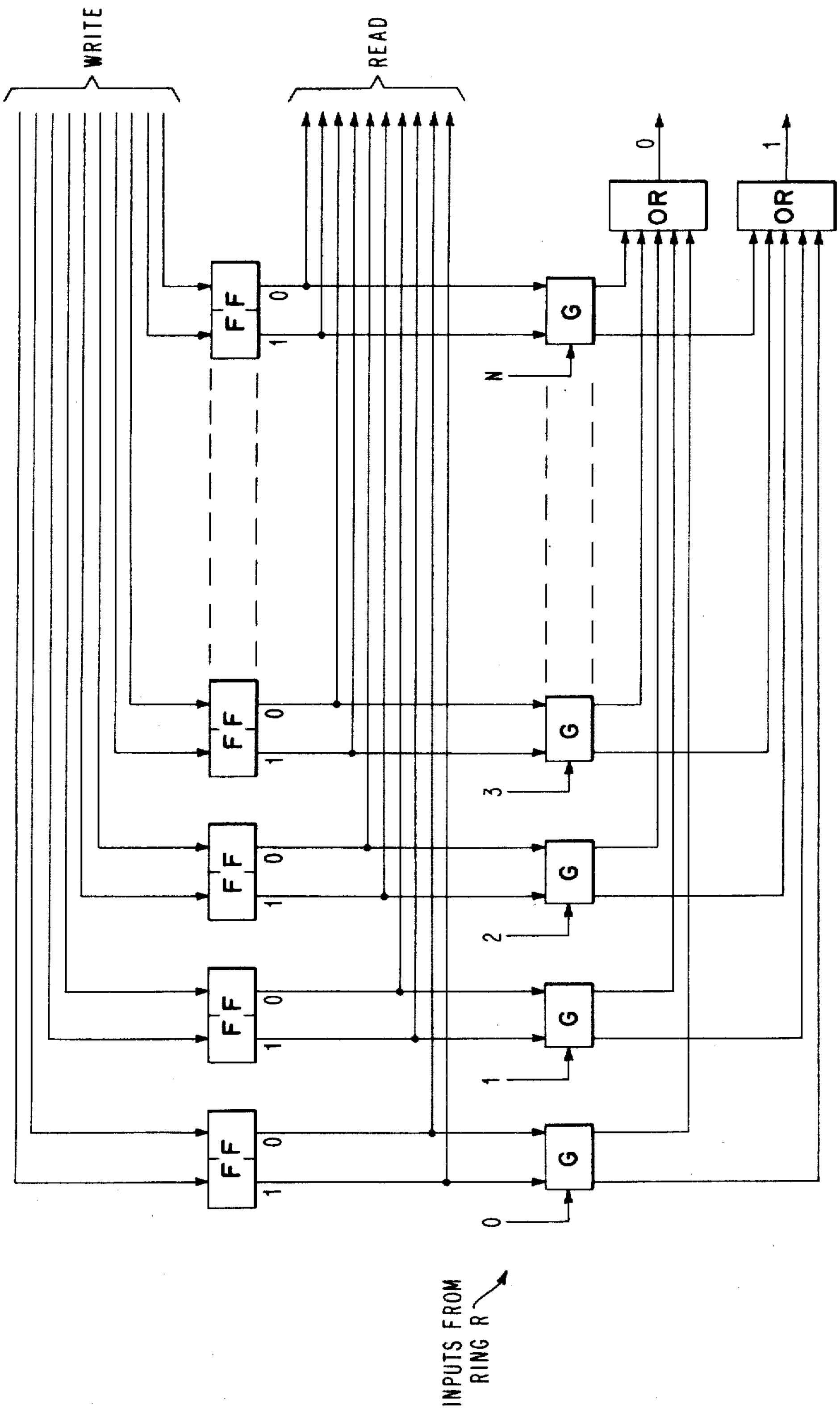
FIGS. 45, 46 and 47 are partial circuit diagrams of various registers employed in the circuitry of FIGS. 26A to 26M.

Various other registers and control units are included in the disclosed system. These include a "current row" register SC1 and a "previous row" register SC0, FIG. 26B. The construction of an "SC" register is indicated in FIG. 45. Each of the registers SC1 and SC0 is adapted to store a row of data bits read out of a binary matrix such as the outline memory OM, mentioned above, or a woven area memory WAM, described hereinafter. The register SC1 is used for storing the data bits of that row which most recently has been read out of the source memory i.e., the row that currently is being scanned or examined. The "previous row" register SC0 stores the data bits of the row that previously was read out of the source memory, i.e., the row immediately preceding the current row in order of readout.

Information can be read from each, or either, of the registers SC1 and SC0 one bit at a time under the control of an indexing ring R, FIG. 26B, having stages 0, 1, 2, 3 and so forth that correspond respectively to the various bit positions X0, X1 and so forth in the "SC" registers. In the present case it is assumed that the ring has a relatively small number of stages, but in practice the number of ring stages would be much higher.

Other registers utilized in conjunction with the outline memory OM comprise the current row zone register CRZ, FIG. 26I, which is adapted to be set, in due course, to the number of the row zone currently being scanned in the outline memory OM, and a previous row zone register PRZ, FIG. 26I, which (for comparison purposes) is adapted to be set to the number of a correspondingly positioned zone in the OM row that previously was scanned. In certain operations the current row zone number (CRZ) is compared with a previous row zone number (PRZ) in order to determine whether one such number should be converted into the other. The circumstances under which such conversion of zone numbers is desirable have been indicated above and will be explained more fully as the present description proceeds.

Still other devices used in conjunction with the outline memory OM include a ZEROS counter ZEC, FIG. 26H, for counting the number of 0's thus far scanned in the current row zone, and a boundary counter BC, FIG. 26H, for counting the number of boundary bits or 1's scanned in the current row zone. These counters are reset to predetermined values as the scan of each OM row segment is started.

During a row scanning or row reading operation it is necessary to know what point in the row has been reached at any given time, i.e., how many bit positions have been counted since the start of the row. This function is performed by a general position accumulator GPA, FIG. 26J. If we assume that the scanning or reading of a row starts at bit position X0 and that the initial count registered by the GPA will be "1," then when bit position X20 is reached, the GPA setting will be "21." There also will be occasions when the GPA is incremented by quantities greater than 1, as will be explained hereinafter.

A segment position accumulator SPA, FIG. 26H, which is similar to the general position accumulator GPA, is used in certain operations described hereinafter that relate to identifying a row segment with its zone number. (The terms "segment" and "zone" as a rule are used interchangeably herein, except in those instances where it may be necessary to make a distinction between them.)

"X LIMIT" and "Y LIMIT" regsiters, FIG. 26J, are set respectively to denote the maximum number of bit positions to be scanned per row and the maximum number of rows to be scanned. The "X LIMIT" setting is compared at intervals with the GPA setting, and the "Y LIMIT" setting is compared at intervals with the setting of one or more memory address registers (MAR's) or similar row counting devices. These X LIMIT and Y LIMIT registers are involved in other operations beside the scanning operation, as will be explained subsequently herein.

Other devices not specifically mentioned hereinabove will be referred to in the following description and in the circuit diagram, FIGS. 26A to 26M.

Some typical textile designing operations now will be described with reference to the assumed outline design (FIG. 20), which is stored in the cells of the outline memory OM in the manner indicated by FIG. 21. In FIG. 23 there are marked in the various squares of the coordinate array the numbers of the zones in which the various bits of the outline memory OM are located for the case under consideration. The purpose of the scanning operation presently to be described is to identify these zones and label the disjoint areas accordingly. As explained above, FIG. 23 is only a symbolic representation and does not depict the true manner in which zone data are stored in memory, such data actually being stored in separate tables maintained by the scan memory SM and its asosciated segment registers SR1 and SR0, wherein are listed the various zone numbers of the row segments and the number of positions occupied by each segment. The practice of identifying each individual bit position by the number of its zone, as is done in FIG. 23, is a convenient fiction to aid explanation.

It is assumed that suitable clocking circuitry is provided for generating the various clocking or timing pulses that control the operations performed by the circuitry shown in FIGS. 26A to 26M. The details of such clocking circuitry will not be disclosed herein inasmuch as the design thereof is considered obvious from the relative timing of the various functions shown in the flow charts, to which reference will be made hereinafter.

Scan and label

Referring now to the flow diagram of the SCAN algorithm, FIGS. 25A and 25B, in conjunction with the circuit diagram, FIGS. 26A to 26M, typical scanning operations will be described with reference to the stored outline design represented in FIGS. 21 and 23. At the start of the scan operation, certain initializing steps are performed, as indicated in the box labeled S–1, FIG. 25A. Thus, the zone counter ZOC is reset to 1. The previous row register SC0, in the initial phase of the operation, is reset to all 1's in order to represent the simulated scanning of the lower boundary row Y0, which contains nothing but boundary bits or 1's. This bottom row, therefore, need not be scanned, and the first effective scan will commence with row Y1, which now will be considered the "current" row (the bottom row Y0 being considered the "previous" row). The memory address register MAR of the scan memory SM is set initially to an arbitrary starting address from which the building of the scan table is to commence. The memory address register MAR of the outline memory OM likewise is initialized to a convenient starting value corresponding to the address of row Y1, FIG. 21.

Figures 25, 25A:
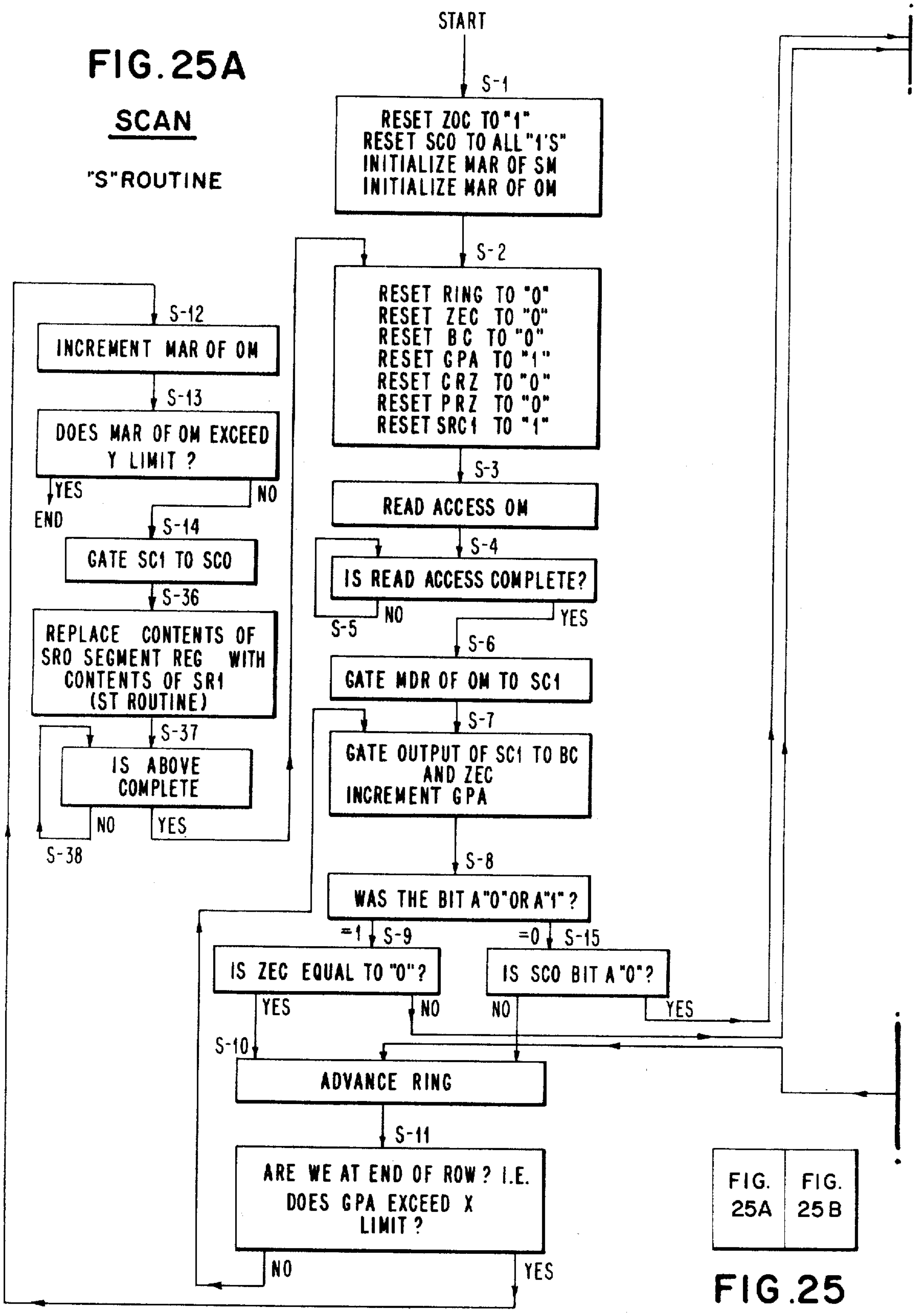
FIGS. 25A and 25B, when connected together as is indicated in FIG. 25, constitute a flow chart of the "Scan" routine included in the design cognition procedure.
Figure 25B:
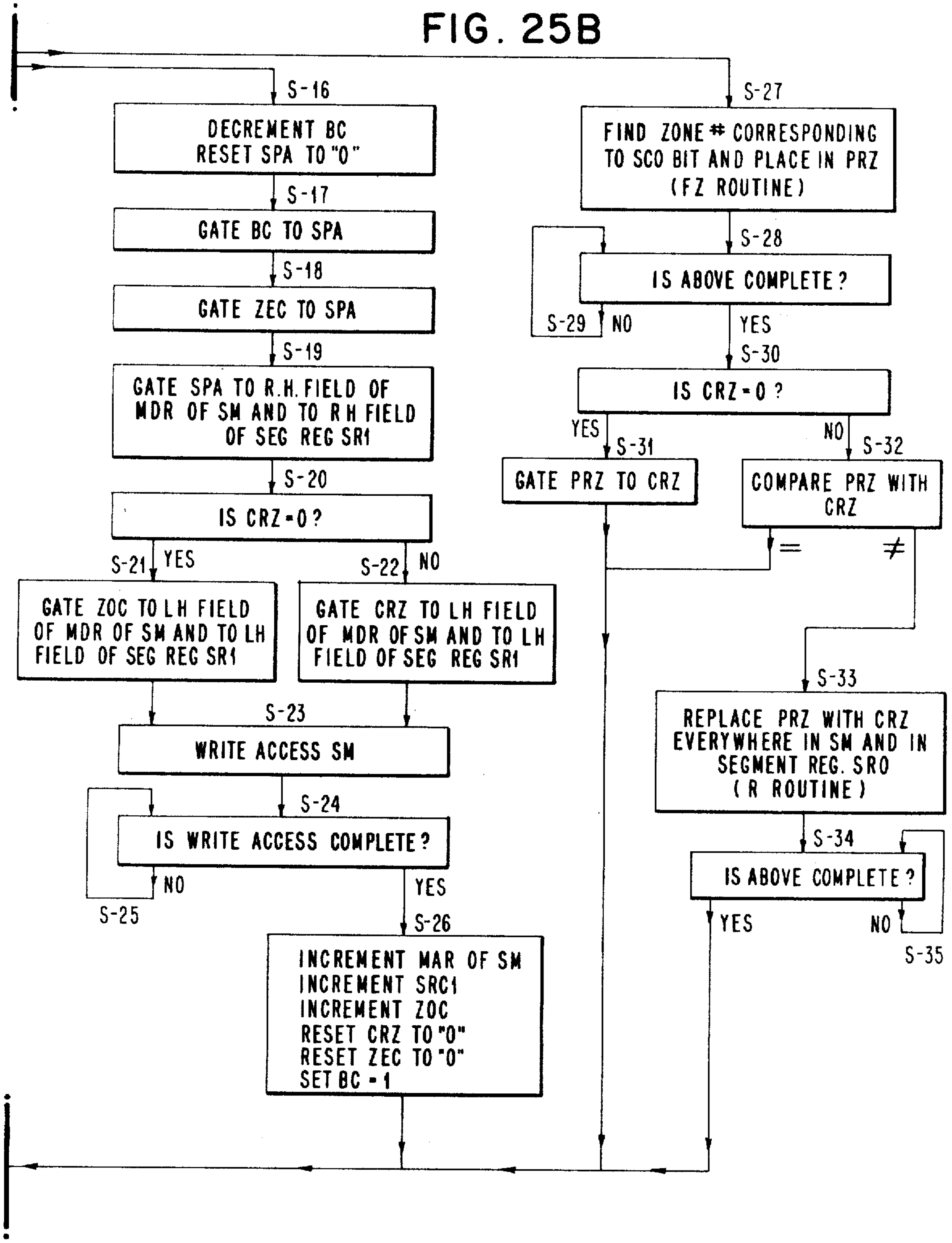

The various boxes numbered S–1, S–2, etc., in the "SCAN" flow chart, FIGS. 25A and 25B, represent steps of the SCAN routine, which in the present showing, are incorporated in the operation of the circuitry shown in FIGS. 26A to 26M. Such steps also could be incorporated in a general-purpose computer program. The step numbers used herein will help to cross-reference the circuit diagram and flow charts to each other.

Further initialization steps now are performed, as indicated in box S–2, FIG. 25A. The ring R, the zeros counter ZEC, the boundary counter BC and the current row zone register CRZ, and the previous row zone register PRZ are all reset to 0. The general position accumulator GPA is reset to 1. The current-row segment register counter SCR1 is reset to 1, since the scan always commences with the first segment or zone of the current row.

Having performed all of the initialization steps as set forth in boxes S–1 and S–2, FIG. 25A, the system then proceeds to "read access" the outline memory OM, as indicated in steps S–3 and S–4, for causing the bits of the row currently being scanned in the outline memory OM to be entered into the MDR (memory data register) of OM, from whence they are transferred or gated to the current row register SC1 (step S–6).

The current row scan commences at position X0 in row Y1 and is performed under the control of the ring R, FIG. 26B. Stage 0 of the ring R now is active for causing the X0 bit stored in SC1 to be sensed. This is a "1" bit denoting a boundary point. Suitable gating operations (step S–7) are performed whereby the setting of the boundary counter BC, is incremented by 1 in view of the fact that a "1" boundary bit has been sensed. Inasmuch as counter BC initially stood at "0," the sensing of this first boundary bit now increases the BC setting to "1." The general position accumulator GPA at this time is incremented by 1, bringing it to the setting "2."

Each time that a bit has been read out of the current row register SC1 under the control of ring R, (at step S–6, FIG. 25A), a test then is made to determine whether the bit just read was a 0 or a 1 (step S–8). If it was a 1 (which is true in the instance just described since we are looking at the boundary bit in position X0), an inquiry then is made as to whether the zeros counter ZEC now stands at a zero setting (step S–9). Such a determination actually is made by comparing the ZEC setting with a "zeros" setting in a compare unit 80, FIG. 26L. Because no zeros (i.e., "space" bits) yet have been counted in the row segment currently being scanned, the algorithm now calls for the ring to be advanced one stage (step S–10), thereby going from 0 to 1 in the present instance.

The significance of the operation just described (steps S–8, S–9 and S–10) is this: If the bit read out of the current row register SC1 is a boundary bit (i.e., 1), then there is no need to check the corresponding bit position in the previous row to see whether it was a 1 or 0, because we do not at any time carry a zone number up into a boundary bit from a previous row. Furthermore, the scan has not as yet detected any zeros (i.e., "space" bits) preceding a boundary bit in the row under consideration; hence we do not know at this point whether a "zone" (i.e., an open row segment) actually exists in this row. Under these conditions, the ring R can be advanced promptly to its next stage.

Having advanced the ring R (step S–10) and incremented the GPA (step S–7), we now ask whether we yet have reached the end of the row. This will not be true until the GPA setting passes the "X LIMIT" value (e.g., 21) previously set up. This test actually is made by gating both the GPA setting and the X LIMIT value into a COMPARE unit 82, FIG. 26J. Since the GPA setting is less than X LIMIT in the present case, the system returns to one of the previous steps in the sequence indicated by the box S–7, FIG. 25A, at which the output of the next bit position (X1) in the current row register SC1 is sensed and an incremental entry is made into the appropriate counter, which in this case is ZEC since the X1 bit is a 0. The accumulator GPA concurrently is incremented, bringing it to the setting "3" corresponding to bit position X2. Since the X1 bit of row Y1 was a 0, we now perform a test (indicated by box S–15, FIG. 25A) to determine whether the bit in the corresponding X1 position of the previous row register is 0. In the present instance the answer to this inquiry is "no"; therefore, the ring is advanced to its next stage.

Since the portion of the row Y1 from position X1 to position X19 is filled with zeros, beneath each of which there is a "1" bit in row Y0, the sequence of steps S–7, S–8, S–15, S–10 and S–11 is performed for each of these positions. When the last bit position X20 is reached, and step S–7 is performed, the boundary counter BC now stands at "2", having registered two incremental counts in response to the sensing of the boundary bits in positions X0 and X20. These test steps S–8 and S–9 now are performed to ascertain the fact that a "1" boundary bit has been encountered at a time when the zero counter ZEC stands at a setting other than zero. This calls for a branch in the routine which causes a zone number to be assigned to the single zone in row Y1. Thus, the "no" output of test step S–9 (which occurs when a boundary bit is sensed while the zeros counter ZEC registers one or more zeros) initiates a sequence of steps depicted by the boxes S–16 through S–25, FIG. 25B, for assigning a number to the zone just detected by the scanning operation.

To consider the zone numbering phase of the operation in detail, the first step (S–16) in this sequence is to decrement the boundary counter BC so as not to include the boundary bit just read as part of the zone that is going to be numbered. The segment position accumulator SPA, FIG. 26H, is reset to 0, and into this accumulator are entered the present settings of the boundary counter BC (now decremented) and the zeros counter ZEC. The total of these two counts equals the number of bit positions in the zone presently under consideration, namely, that zone which occupies bit positions X0 through X19 of row Y1. The setting of SPA representing this total now is gated into the right-hand field of the memory data register MDR of the scan memory SM and also into the right-hand field of the first available segment-storing location in the current-row segment register SR1 (step S–19), as determined by the decoded setting of the segment register counter SRC1.

We now must determine what zone number is to be placed in the left-hand field of the presently addressed segment storage location in SR1. As a first step in this determination (S–20), the setting of the current row zone register CRZ is checked to see whether it is 0. This is accomplished by gating the CRZ setting and an "all-zeros" setting to the COMPARE unit, FIG. 26L. If CRZ had been other than zero, this would have meant that a zone number already had been carried up to the current row zone from a previous row zone, and the CRZ number then would be entered into the left-hand fields of SR1 and the MDR of SM, respectively (step S–22). Since we presently are concerned with the first row Y1, however, it is obvious that the CRZ number must be zero at this time. Under these conditions, a new zone number is assigned to the row segment under consideration in accordance with the setting of the zone counter ZOC, which presently stands at "1." This zone number is gated into the left-hand fields of SR1 and the MDR of SM, respectively (step S–21). A "write access" operation is performed to transfer the MDR setting into the currently addressed location of the scan memory SM (steps S–23 and S–24), following which the MAR of SM, the segment register counter SCR1 and the zone counter ZOC each are incremented by 1 (step S–26). The CRZ (current row zone) register and ZEC (zero counter) are reset to 0, and the boundary counter BC is reset to 1 in this instance (the reason for this becoming apparent at a later point in the description, when we consider a row having more than one segment in it.)

Thus far, a zone number 1 has been applied to the single segment consisting of positions X0 through X19 in row Y1. The ring now is advanced (steps S–10), and the setting of the GPA is checked (step S–11) to see whether it exceeds X LIMIT, (the COMPARE unit 82, FIG. 26J, being utilized for this purpose). Since the scan has indeed reached the end of the row, this condition is fulfilled, and the system now is conditioned for performing the next row scan. This action commences by incrementing the MAR of the outline memory OM (steps S–12). A test is made to see whether the MAR setting exceeds Y LIMIT; or in other words, whether the final row of OM has been scanned. This test is made by the COMPARE unit 82, FIG. 26J. If the Y LIMIT has not ben exceeded, then the setting of the current row register SC1 is transferred to the previous row register SC0, so that the row just scanned (in this instance, row Y1) now becomes the "previous" row for comparison purposes. Moreover, the contents of the current-row segment register SR1, FIG. 26M, are transferred to the previous-row segment register SR2 (step S–36) in accordance with a special "segment transfer" (ST) microprogram which automatically is initiated at this time.

The steps of the segment transfer (ST) microprogram are as follows:

| Step: | Operation |
|---|---|
| ST–**1** | Reset SRC1 and SRC**0** to 1. Go to ST–2. |
| **ST–2** | Gate the L.H field of **SR1** to the **L.H.** field of **SR0**, and gate the R.H. field of **SR1** to the R.H. field of SR**0**. Go to ST–**3**. |
| **ST–3** | Gate setting of SRC**0**, FIG. 26M, and SL (segment limit) register, FIG. 26H, to COMPARE unit 80, FIG. 26L. Through delay, test output of COMPARE unit. If SRC**0**≠SL, go to ST–**4**. If SRC**0**=SL, end operation. (Set flip-flop **81**, FIG. 26A, to 0 for referring operation back to step S–**2**, FIG. 25A.) |
| **ST–4** | Increment SRC**1** and SRC**0**. Go to **ST–2.** |

Upon completion of the ST routine, the SCAN operation is resumed at step S–2, FIG. 25A, initiating a new row scan, i.e., the scanning of row Y2, FIG. 21. During the scan of row Y2, when position X1 therein is reached, a zone number "1" is carried up to the first segment of this row from the previous row Y1 in the following manner: At bit position X1 of row Y2, a 0 is read from the current row register SC1 (step S–8), and the previous row register SC0 informs the system that a 0 also was read at position X1 of the previous row Y1 (step S–15). This causes the sequence of operations to branch to a step S–27, FIG. 25B, which requires that the zone number corresponding to the previous row (SC0) bit be found. A special "Find Zone" (FZ) routine thereupon is initiated. This involves the use of the segment position accumulator SPA, FIG. 26H, the segment register counter SRC0, FIG. 26M, the general position accumulator GPA, FIG. 26H (which presently stands at 2) and the previous-row segment register SR0, FIG. 26M, which now stores the zone number table that was developed during the previous row scan (i.e., the scan of row Y1). The steps of the "Find Zone" sequence are as follows:

| Step: | Operation |
|---|---|
| FZ–**1** | Reset SPA to 0. Reset SRC**0** to **1**. Go to step FZ–**2**. |
| **FZ–2** | Gate the right-hand field of **SR0** to SPA. Go to step FZ–**3**. |
| **FZ–3** | Gate the settings of GPA and SPA to the COMPARE unit **80**. Through a delay, test the output. If the GPA setting exceeds the SPA setting, this indicates that the previous row (SC**0**) bit now indexed by GPA is not positioned in the segment of the previous row now being considered; hence go to step **FZ–4**. If the GPA setting is less than or equal to the SPA setting, this indicates that the **SC0** bit now indexed by GPA is positioned within the segment of the previous row now being considered; hence, go to step FZ–**5**. |
| **FZ–4** | Increment SRC**0** and return to step FZ–**2**. |
| **FZ–5** | Gate the left-hand field of **SR0** (zone number) to the PRZ register. This is the previous-row zone number that was sought. Go to step FZ–**6**. |
| **FZ–6** | End FZ routine. Set flip-flop **83**, FIG. 26A, to 0 for referring operation back to step **S–30** of the "Scan" routine, FIG. 25B. |

At step S–30, the CRZ setting is tested by the COMPARE unit 80, FIG. 26L, to determine whether it is zero. In the present instance it is assumed that we found the PRZ number at a time while the CRZ register remained at its zero setting during the current row segment scan. Hence, the "yes" branch from S–30 causes the CRZ number to change so that it corresponds to the PRZ number (step S–31), thus "carrying up" the previous row zone number (1) to the current row zone. (See FIG. 23 in this connection.)

Having changed the CRZ setting for the bit position X1 of row Y2 to correspond with the PRZ setting for bit position X1 of row Y1, the program now causes the ring to advance (step S–10) for enabling the next bit position (X2) to be checked. For bit position X2, the steps S–7 and S–8, FIG. 25A, are performed as in the case of bit X1. A similar branching operation occurs at step S–15, FIG. 25A, inasmuch as 0's are registered in this bit position in both the SC1 and SC0 registers. The PRZ number is found as before (FZ routine just described). When step S–30, FIG. 25B, is reached, it is found that the CRZ setting now is other than 0, a zone number "1" already having been assigned to the current row zone. This being the case, the "no" branch from S–30 is followed, thereby effecting a "compare" operation (step S–32) in which the PRZ and CRZ numbers are compared by unit 80, FIG. 26L. The two zone numbers being found equal, no change is made in the CRZ setting, and the ring is advanced to the next stage (step S–10, FIG. 25A).

Let us now see what happens when the scan reaches bit position X5 of row Y2, FIGS. 21 and 23. A boundary bit (1) is detected in this position and an incremental entry is made into the boundary counter BC, increasing the BC setting to "2." At program step S–8, FIG. 25A, a test is made to see whether the bit was a 1 or a 0, and since it was a 1, the routine branches to step S–9, where a further test is made to determine whether the 0's counter ZEC is at a setting other than 0. Inasmuch as a total of four 0's have been counted in the current row segment, the program now branches to step S–16, FIG. 25B, and thereupon proceeds through the sequence of steps from S–16 to S–26. The boundary counter BC is decremented by 1, reducing its setting to "1," and the resulting total of one boundary bit and four 0 bits, i.e., five bits, is gated into the segment position accumulator SPA to determine the length of the current row segment that is about to receive a zone number. This five-bit segment extends from position X0 through position X4 of row Y2. The SPA setting of "5" now is transferred to the right-hand field of the MDR of the scan memory SM and also to the right-hand field of the first segment location in the current row segment register SR1.

Inasmuch as the current row zone (CRZ) number now stands at 1, (this being the zone number that was carried up from the previous row), the program branches from step S–20 to step S–22, wherein the zone number "1" presently registered by the CRZ register is gated into the left-hand field of the MDR of SM and also into the left-hand field of the presently indexed segment storage location in the current row segment register SR1. Thus, the first segment encountered during the scan of row Y2 has been identified and numbered to correspond with the numbering of the previous row segment that is in the same zone, this segment comprising the bit positions X0 through X4. The program now proceeds through steps S–23, S–24, S–25 and S–26, FIG. 25B, and then proceeds back to step S–10, in which the ring is advanced one position, advancing the scan point from X5 to X6. Since we are not yet at the end of the current row, the operation returns to step S–7.

From position X6 through X15 of row Y2, the only significant action is the entry of a series of ten boundary bits into the boundary counter BC, which previously was given an initial setting of "1" (step S–26, FIG. 25B) to account for the boundary bit already read at position X5 of row Y2. When the scan reaches position X16 of row Y2, the first 0 bit in the present row segment is encountered. This branches the program into the "Find Zone" (FZ) routine previously described. The FZ routine involves the used of the previous row segment register SR0, which still is storing the scan table entries for row Y1. The current row zone (CRZ) number stands at "0"; hence the previous row zone (PRZ) number "1" now is gated into the current row zone (CRZ) number register, as indicated in step S–31 of the flow diagram, FIG. 25B. The CRZ setting now is "1."

When the last position in row Y2 has been read, the sequence of steps S–16 through S–20 and S–22 through S–26, FIG. 25B, is repeated. This causes the current row zone number 1 to be assigned to that segment of row Y2 extending from position X5 to position X19. The data concerning this segment will be stored in a distinct location of the current row segment register SR1 and in the scan memory SM.

From the foregoing it can be seen that the segment of row Y2 which commences in position X5 has been assigned the zone number 1, which is identical with the zone number that was assigned to the preceding segment comprising positions X0 through X4 of this same row Y2. Even though their zone numbers are identical, however, these two adjoining segments nevertheless will be stored in separate segment-storing locations in the segment registers and in the scan memory SM, and they will be handled internally as two segments although, in effect, they are but a single zone.

During the scan of row Y3, when position X5 is reached, the sequence of steps S–16 to S–26 is repeated for applying the previous row zone (PRZ) number 1 to the segment comprising positions X0 to X4 of row Y3. When position X15 of row Y3 is encountered, the "zero count" ZEC stands at 9 and the boundary count BC stands at 2. Again the sequence of steps S–16 through S–26 is repeated, but this time the zone counter ZOC applies a new zone number "2" to the segment from X5 through X14 of row Y3 (step S–21). As indicated in FIG. 22, this zone number 2 is carried up through the remaining portions of the area corresponding to the "house" outline 70 shown in FIG. 20, which ends in row Y14.

As indicated in FIG. 22, the row segment comprising bits X10 and X11 in row Y15 is assigned the zone number "4" during the scan of this row. In row Y16, however, the bit positions X8 through X11 comprise a single segment which should receive only a single zone number. It will be noted (FIG. 21) that the bit positions X9 and X11 of row Y16 store 0's, and these 0 bits are positioned above 0 bits stored in the corresponding bit positions X9 and X11 of row 15. However, the bit position X9 of row Y15 is in zone 3, whereas the bit position X11 of row Y15 presently is in zone 4, FIG. 22. The current row zone (CRZ) register is set at "3," because this zone number already has been carried up from position X9 of the previous row Y15.

When the scan has reached bit position X11 of row Y16, the presence of two superposed 0 bits in the registers SC1 and SC0 initiates a sequetnce of steps starting with step S–27, FIG. 25B. The previous row zone (PRZ) number is ascertained to be "4" (FZ routine). The current row zone (CRZ) number stands at "3," as just mentioned. The program now branches from steps S–30 to step S–32, wherein the PRZ number (4) is compared with the CRZ number (3). Since the two numbers are not equal, the program now branches to step S–33, which calls for a "Replacement" (R) routine to replace the PRZ numbers with CRZ numbers everywhere in the scan memory SM and in the previous row segment register SR0. The various steps of the "replace" (R) routine are set forth below:

| Step: | Operation |
|---|---|
| R–1 | Gate MAR of SM to "Address Save" register, FIG. 26E. Go to R–2. |
| R–2 | Initialize MAR of SM. Go to R–3. |

R–3 ........ Read access SM. Go to R–4.

R–4 ........ Is read access complete? If not, go to R–5. If so, go to R–6.

R–5 ........ Go back to R–4, after delay.

R–6 ........ Gate both the PRZ number and the zone number in the L.H. field of MDR of SM into COMPARE unit 80, FIG. 26L. Through a delay, test output. If numbers are equal, go to R–7. If unequal, go to R–11.

R–7 ........ Gate CRZ to L.H. field of MDR of SM. Go to R–8.

R–8 ........ Write access SM. Go to R–9.

R–9 ........ Is write access complete? If so, go to R–11. If not, go to R–10.

R–10 ........ Go back to R–9, after delay.

R–11 ........ Increment MAR of SM. Go to R–12.

R–12 ........ Gate settings of Address Save register and MAR of SM to COMPARE unit 80. If addresses are not equal, go back to step R–3 and repeat until addresses are equal; then go to R–13.

R–13 ........ Reset SRC0 to 1. Go to R–14.

R–14 ........ Gate L.H. field of SR0 and PRZ number to COMPARE unit 80. If equal go to R–15. If unequal, go to R–16.

R–15 ........ Gate CRZ to L.H. field of SR0 for thereby replacing the PRZ number with the CRZ number (per step S–33, FIG. 25B). Go to R–16.

R–16 ........ Gate settings of SRC0 and SRC1 to COMPARE unit 80. If not equal, go to R–17. If equal, go to R–18.

R–17 ........ Increment SRC0. Go to R–14.

R–18 ........ End "Replace" operation (Reset flip-flop 85, FIG. 26A to "0" for referring operation back to "Scan" routine step S–10, FIG. 25A).

At the conclusion of this "Replace" sequence, the zone number "3" will have replaced the "equivalent" zone number "4" everywhere in the scan memory SM and in the previous-row segment register SR0. Since the previous-row zone number 4 has not appeared in the current-row segment register SR1 during the current scan of row Y16, no correction of the SR1 register setting in this respect is needed.

When the scanning of the figure stored in the outline memory OM has completed, the scan memory SM will have stored a complete table of all the row segments in this figure, which now are identified by zone numbers in a manner such that all row segments contained within each disjoint area are identified by the same distinctive zone number. This is symbolically represented in FIG. 23. Thus, it is apparent that the respective zone numbers now can be utilized as area labels. The area labeling ("L") procedure will be described with reference to FIGS. 27, 28 and 29. The purpose of executing this "Label" procedure is to cause each zone number to be displayed on the screen as a visible area label positioned at some suitable point within its respective area of the displayed outline design. Area labeling information will be stored in a section of the display memory DM that is separate from the part of DM in which outline and weave pattern information is stored.

There are several feasible ways to accomplish the area labeling function. The method which is about to be described is relatively simple and requires that the operator choose, by means of a light pen 28, the spot on the screen 26 at which each area label is to appear. The system, operating in its "LABEL" mode, then automatically causes the appropriate area labeling symbol (i.e., the respective zone number) to be displayed at the point selected by the operator. It would be feasible also to provide a labeling process whereby the system makes its own determination of the position on the screen at which each area label is to be displayed on the screen. Such a technique will be hereinafter described under the heading, "Alternative Labeling Procedure."

Figure 27:
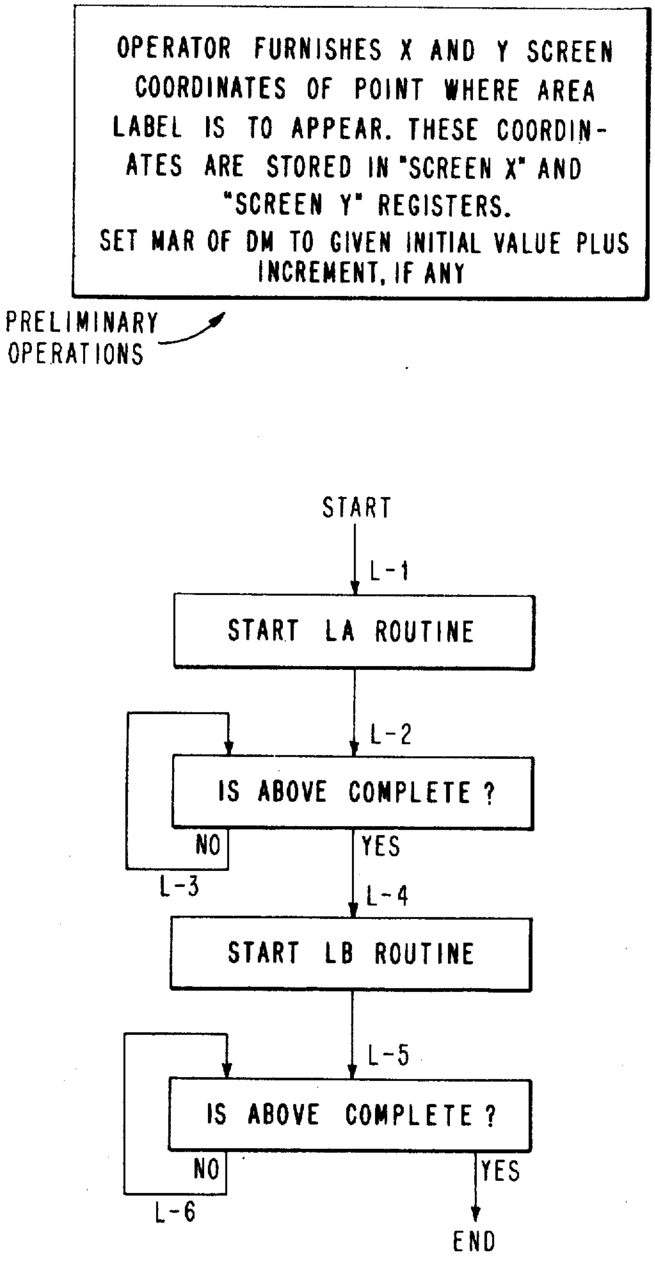

The labeling (L) routine is, for convenience, separated into two consecutive subroutines, LA and LB, as indicated in FIG. 27. The LA routine is utilized both in the present area labeling routine (L) and also in the initial portion of an "Erase Weave" (E) routine to be described hereinafter. The LB routine is used only in the area labeling process. Just prior to starting the L routine, the operator touches the light pen to a convenient illuminated point on the boundary of the selected area (or to an illuminated point elsewhere on the screen, if desired) and then moves the pen across the screen to a desired point within the area that is to be labeled. At this time the display unit preferably is operated in the well-known "tracking cross" mode so that the screen displays the points where the light pen began and completed its travel across the screen, but not the intervening points. Actually however, it is immaterial whether or not a line is traced on the screen, because such a line later would be "woven out," i.e., superseded, in the final display of the weave design, as explained hereinafter.

Operation of the light pen in the tracking cross mode may require memory fields in addition to those DM fields which already have been described herein. It can be assumed that such additional DM storage capacity is available for present purposes.

Having placed the tip of the light pen at the point where it is desired that the area symbol appear on the screen, the operator depresses a foot switch (not shown), thereby generating an appropriate attention signal for furnishing the X and Y screen coordinates of the selected point. These coordinates are stored in the SCREEN X and SCREEN Y registers, respectively, FIG. 26C. As another part of the preliminary operation, the MAR of DM is set to a suitable address, consisting of a given initial value plus any increment that may be added thereto as the labeling operation proceeds, as will be explained.

The operator now starts the automatic labeling ("L") routine, FIG. 27. Since it is assumed herein that the zone number is to be used as the area identification symbol or label, the system must retrieve the applicable zone number and display it on the screen as the area label.

The system initially executes its LA routine, FIG. 28, the purpose of which is to find the zone in which the selected point is located. The first step (LA–1) in this routine is to reset the general position accumulator GPA and a "TEMP" (temporary) register, FIG. 26G, to 1 and initialize the MAR of the scan memory SM. The scan memory SM then is read-accessed for placing in the MDR of SM the "zone number" and "number of positions" of the first segment that was stored in SM. The "number of positions" registered in the right-hand field of the MDR of SM now is gated into the general position accumulator GPA (step LA–5). Then a test is made at step LA–6, FIG. 28, to determine where the point on the screen selected by the operator is situated laterally with respect to the GPA setting, which now denotes a zone boundary point in the row under consideration.

Before a meaningful comparison can be made between a screen coordinate value such as "SCREEN X" and a value such as the GPA setting, which is expressed in terms of a different coordinate array (i.e., the matrix of the outline memory OM in this case), it is necessary that one of these two values (e.g., SCREEN X) be converted into a hypothetical equivalent value which it would have if expressed in the same coordinate system as the other value (GPA setting). Since the GPA setting denotes the number of "X" positions under consideration in a row of the outline memory OM, or a like matrix of coordinate points, it is proposed herein to convert the "SCREEN X" value into a corresponding hypothetical value, termed "OMX," which denotes the lateral position of a hypothetical point in the OM matrix corresponding to the point on the screen designated by the operator. Such conversion is accomplished by a conversion unit 88, FIG. 26C, through which the SCREEN X setting is gated to the COMPARE unit 82, FIG. 26J, in order to be entered into the latter as a corresponding "OMX" value. The GPA setting is gated directly into the COMPARE unit 82, without conversion.

At a subsequent point in the description, under the heading "Alteration of a Thread Crossing" there will be described in connection with FIG. 43 the steps that are involved in making a similar conversion of a screen coordinate, such as SCREEN X, into an equivalent coordinate such as "WAMX" with reference to a coordinate array such as the "woven area memory" WAM, which has a matrix of the same kind as the outline memory OM. As mentioned in that description, the circuitry for accomplishing a conversion of this sort is merely the converse of the circuitry employed for converting WAM coordinates to screen coordinates, as explained hereinafter under the heading "Insert Weave and Display" in connection with FIGS. 38A, 38B and 26C.

If the comparison test performed at step LA-6, FIG. 28, indicates that the GPA setting does not exceed the "OMX" value, this denotes the fact that the point in question cannot possibly be located within the row segment currently under consideration. The program next advances to step LA-7, where a routine "end-of-row" test is made; then it proceeds to step LA-8, where the memory address register of the scan memory SM is incremented to bring the next row segment up for consideration. Steps LA-2 to LA-5 now are repeated, causing the "number of positions" in this next row segment to be entered into the GPA, so that now the GPA setting includes the number of positions in both segments. Again a comparison is made between the GPA setting and OMX to see whether the point in question possibly could be located within the row segment currently under consideration. This process is repeated so long as the GPA setting does not exceed OMX.

Eventually a point will be reached where the GPA setting is greater than OMX. This means that we have found a zone in which the point in question possibly could be located. The operation now branches to another test (LA-10) for determining whether the TEMP register setting is equal to "OMY" (a converted value corresponding to "SCREEN Y"). In other words, is the point in question located in the same row as the segment which now is being examined? This test is performed by COMPARE unit 80, FIG. 26L. If the TEMP setting does not equal OMY, indicating that the point in question is not located in the same row as the segment being considered, the operation then branches back to step LA-7, where an "end-of-row" test is made, and if the GPA setting does not exceed the X LIMIT, the above described steps LA-8, LA-2 through LA-6, LA-10 and LA-7 are repeated. By this time, it has been determined that the point in question cannot possibly be located in the row which we currently are examining, and the GPA setting merely is being incremented one whole segment at a time. Eventually the end of the row will be reached, so that the next segment reading will cause the GPA setting to exceed the X LIMIT. At this time the setting of the TEMP register will be increamented and GPA is reset to 1 (step LA-9). The operation then returns to step LA-2 for causing the segment just read to be read again from the scan memory SM (the MAR setting of SM not having been incremented in this instance).

The segment-by-segment analysis procceds in the manner described above until ultimately both of the segment-locating tests LA-6 and LA-10 are satisfied. That is, the GPA setting now exceeds OMX (the OM equivalent of SCREEN X) and the TEMP setting equals OMY (the OM equivalent of SCREEN Y, as furnished by a conversion unit 89, FIG. 26C). This signifies that the system has found the row segment which contains the point corresponding to the point on the screen selected by the operator. The zone number of this segment is the area label that is being sought, and it is being stored in the left-hand field of the memory data register (MDR) of the scan memory SM.

The ending of the LA routine is signified by resetting a flip-flop 86, FIG. 26A, to 0, and at this stage the system goes into its LB routine, FIG. 29, for displaying the zone number just found as the area label. In the initial step LB-1 of this routine, the SCREEN X setting is gated into the left-hand field of the memory data register MDR of the display memory DM; the SCREEN Y register setting is gated into the middle field of the MDR of DM: and the zone number in the left-hand field of the MDR of the scan memory SM is entered into the right-hand field of the MDR of the display memory DM.

There now is stored in the MDR of DM all of the information needed for enabling the selected zone number to be displayed on the screen as the identifying label of the area in question. At this point a write-across operation (LB-2) is performed for entering the contents of the MDR of DM into the display memory DM, thereby causing the zone number found by the system to be displayed on the screen at the point in the area selected by the operator. As a final step in the LB operation (LB-5), the SCREEN X and SCREEN Y registers are reset. The completion of the LB routine is signified by resetting a flip-flop 87, FIG. 26A, to 0.

Area labeling proceeds in the manner described above for each of the disjoint areas in the outline design displayed on the screen. Briefly, the operator locates the point in each area where an area label is to be displayed, and the system automatically causes the proper area labeling symbol to be displayed at that point. It is assumed for present purposes that once the operator starts to label the areas, he will continue this process until all of the areas have been labeled.

Figure 24:
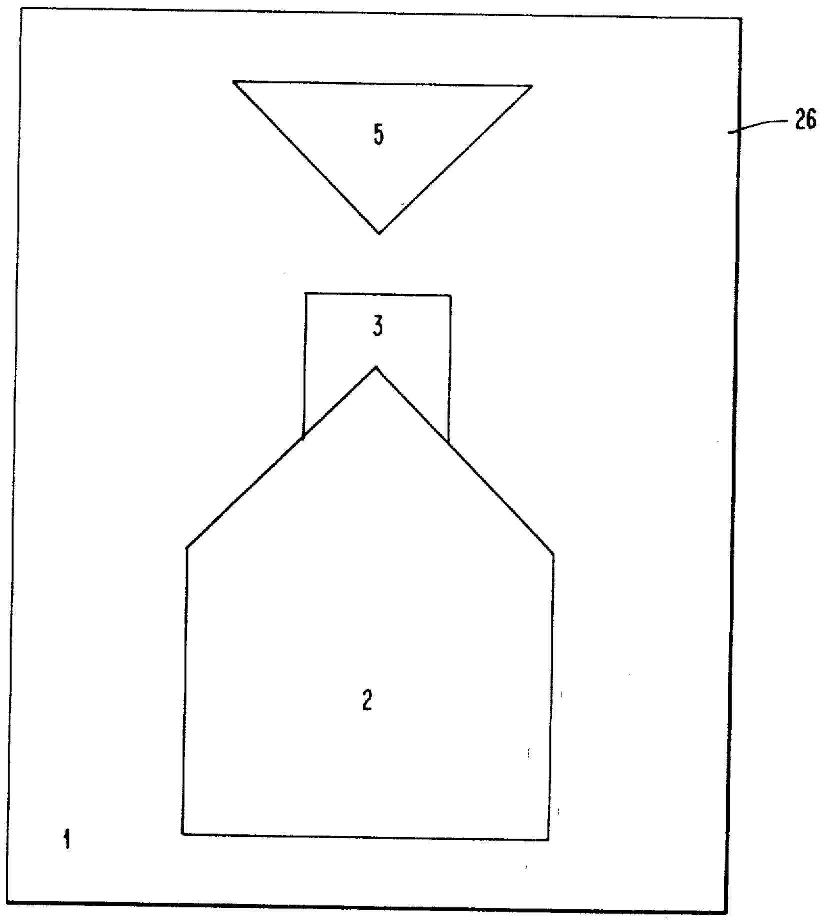
FIG. 24 is an illustration of the outline design with area labels displayed therein.

The aim of the labeling operation, however performed, is to provide a completely labeled outline design such as the one shown in FIG. 24, for example. This does not mean necessarily that all area numbers will be consecutive. Zone 4 having been eliminated as explained above, there is no area label "4" in the present instance.

Insert weave and display

Figures 36, 36B:
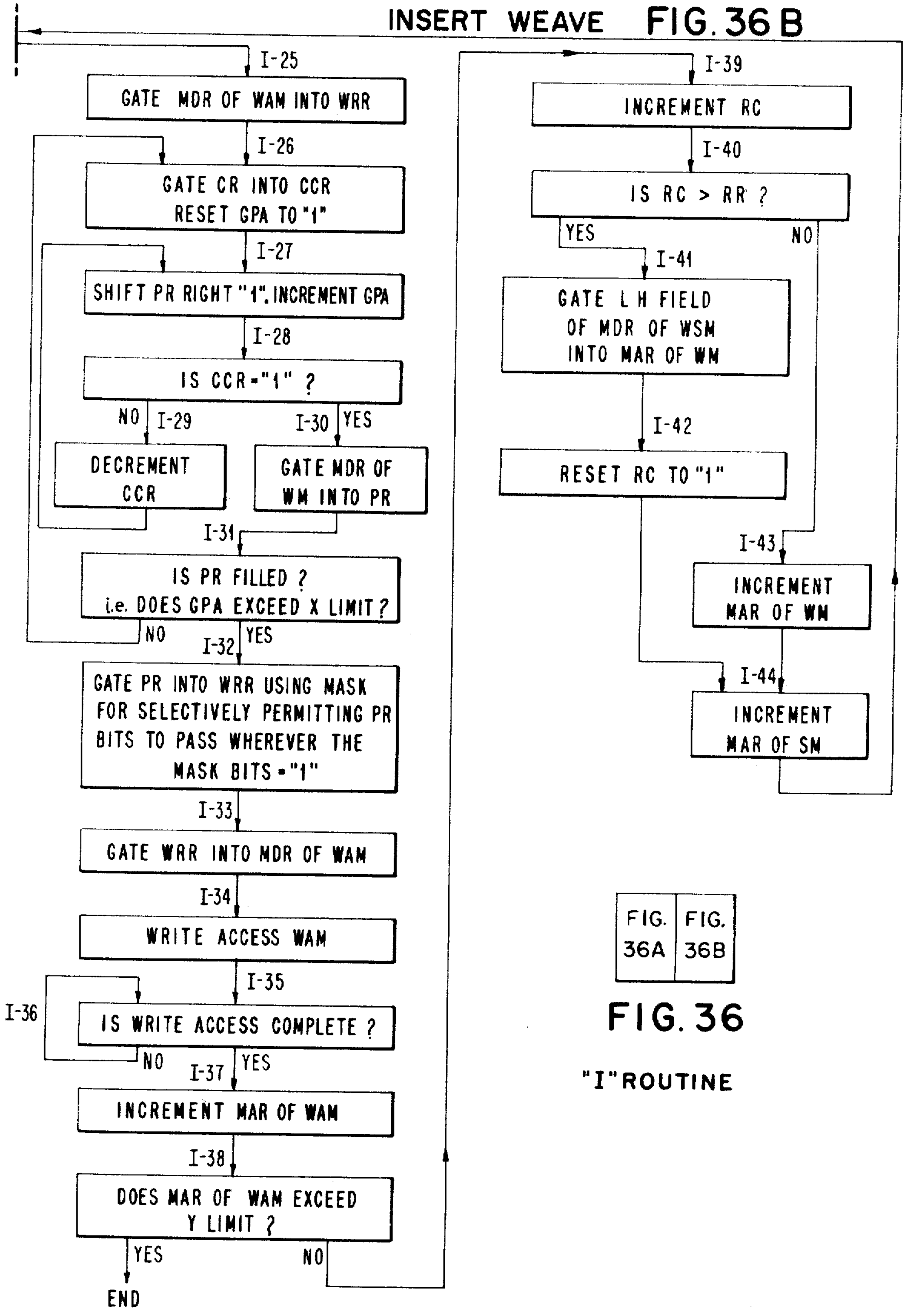

Any selected one of the weave patterns stored in the "weave library" of the system can be displayed in any selected area of the outline design by employing the "Insert Weave" (I) procedure, FIGS. 36A and 36B. Before considering this operation in detail, the general procedure for inserting a weave pattern into a designated area will be described.

Figure 9:
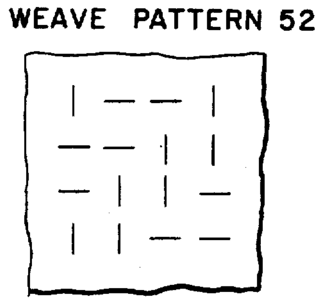
Figure 10:
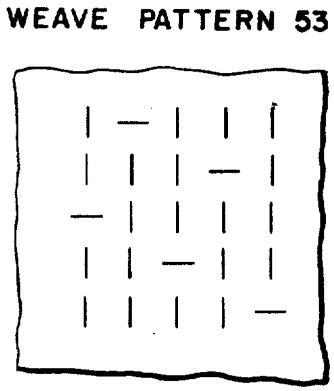
Figure 11:
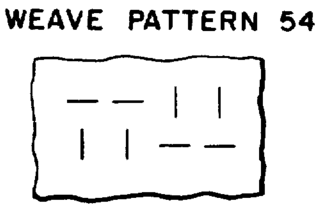

Let it be assumed, by way of example, that the twill weave pattern No. 52 shown in FIG. 9 is to be inserted into the area labeled "2" in FIG. 24. This means, in effect, that a binary bit pattern, FIG. 30, corresponding to the twill weave pattern shown in FIG. 9, is to be placed repetitively within an array of memory cells having a configuration corresponding to the arrangement of squares numbered "2" in FIG. 23. The memory cells for storing all inserted weave patterns are contained within a storage unit herein called the "woven area memory" WAM, FIGS. 26F and 35, which is a binary matrix for storing patterns of 1's and 0's wherein the 1's represent warp-over-weft thread crossings while the 0's represent weft-over-warp thread crossings.

Figure 35:
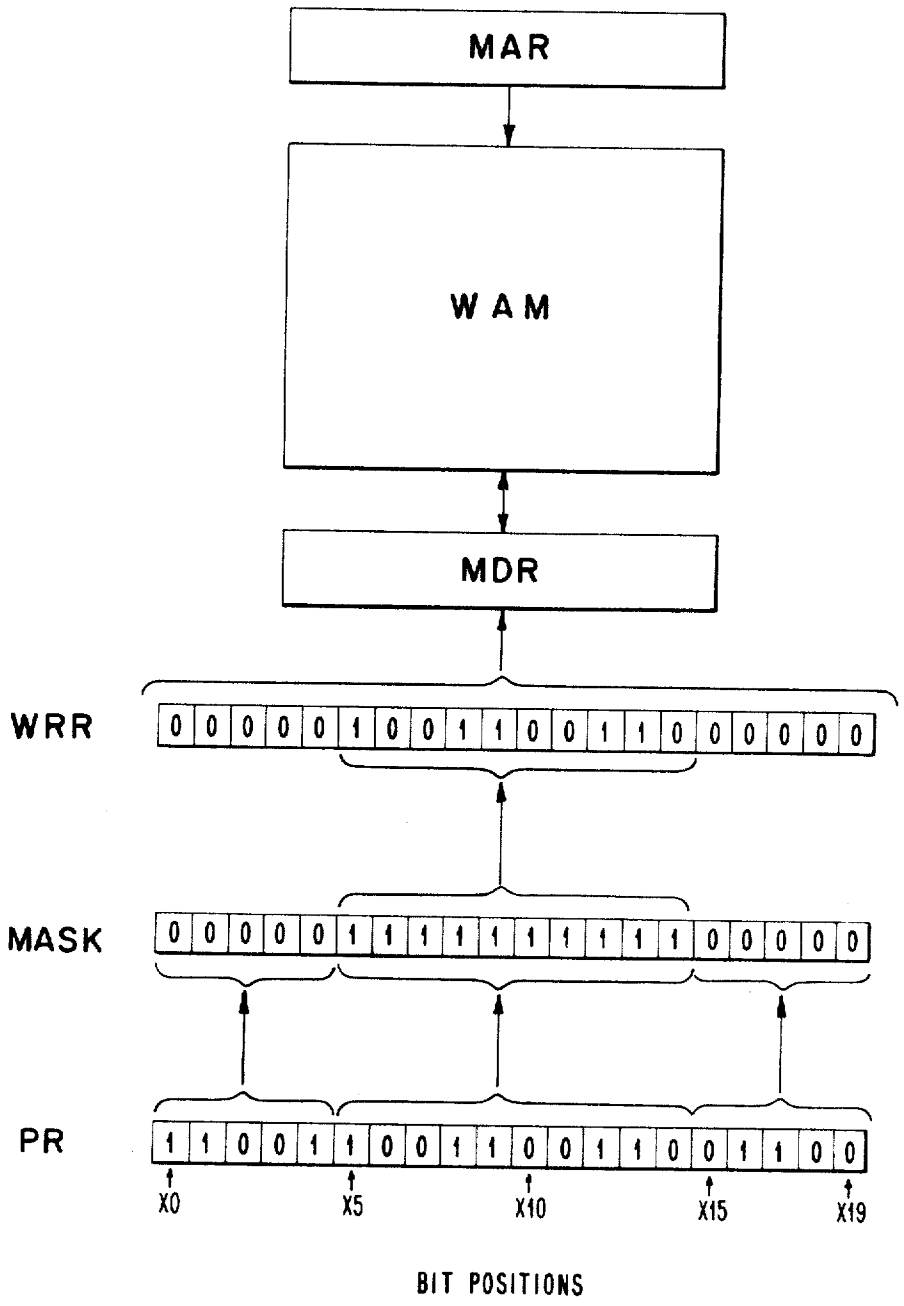

The general logic of the "Insert Weave" procedure involves, first, storing a row of the selected weave pattern bits in a "pattern register" PR, FIGS. 31 and 35, repeatedly entering this weave row pattern into PR and shifting it to the right therein as often as necessary (FIGS. 32 and 33) until the weave pattern bits completely fill the register PR. Although FIG. 33 represents the PR filled evenly with groups of weave pattern bits that exactly fit into the allotted space, this is not a necessary condition. No harm will be done if only part of a bit group is left at the end of PR, the other bits in this group having been shifted out of the register.

Next a setting for a MASK, FIGS. 26B, 34, 35 and 47, is generated under the control of the scan memory SM (which now stores the scan table that was developed during the SCAN operation described above). The bit positions of this MASK are set to their "open" and "closed" conditions selectively according to the zone number of the area that is to be filled with the chosen weave pattern. In the present case it has been decided that the bits of the chosen weave pattern are to be inserted into area 2, i.e., into all row segments identified by the zone number 2, FIG. 23. Hence, in each of the stored row segments identified by the zone number 2, the woven area memory WAM is to receive bits representing the arrangement of the thread crossings in a row of the chosen weave pattern 52.

The rows of the woven area memory WAM correspond to those of the outline memory OM. Each of these memories may be referenced to FIG. 23. Assume that we now are working in row Y3, FIG. 23. The first segment of this row, comprising bit positions X0 through X4, is in zone 1. Since we are not presently interested in zone 1, the first five positions of the MASK are kept "closed," i.e., at a 0 setting, as indicated in FIG. 34. The next ten positions, from X5 through X14, are in zone 2; accordingly, in those bit positions the MASK is opened, i.e., set to 1. The remaining five positions, X15 through X19, again are in zone 1; consequently the MASK is kept closed in these latter positions, FIG. 34.

The next step is to gate the contents of the pattern register PR through the MASK into a "weave row register" WRR, as indicated in FIG. 35. If WRR initially was set at all 0's, such zero setting will remain unchanged in positions X0 to X4, inclusive, and in positions X15 to X19, inclusive, inasmuch as these portions of the register are blocked by the closed positions of the MASK (i.e., those positions of the MASK which are set to 0). Only in the row segment bearing the selected zone number or area label, which is "2" in this instance, will the MASK be open to permit the transfer of weave pattern bits from the pattern register PR into the weave row register WRR, as shown in FIG. 35.

In the present instance, since we are assumed to be working in row Y3, FIG. 23, the weave pattern bits will be permitted to pass through the MASK in positions X5 through X14 only. After this has been accomplished, the contents of WRR are transferred to the memory data register MDR of the woven area memory WAM, from which they are transferred into the appropriate row of WAM. This same row of bits can be read out from WAM at a later time for updating its contents, when it is desired to insert weave row patterns into other segments of the row that have not yet received any weave pattern bits, or to modify any weave row patterns that already have been inserted into this row.

Thus far we have considered the insertion of only one row of the selected weave pattern, namely, row 1, FIG. 30, which contains the repetitive bit pattern 1100. In row 2 of the same weave pattern, the order of the bits has been shifted so that the row pattern 0110 now is manifested. This weave row pattern will be inserted into the next succeeding row of the area that is being filled with the selected weave pattern. As will become evident hereinafter, the system automatically maintains proper alignment of the weave row patterns with each other so that each row of the weave pattern is inserted into the selected area of the design in its proper position with respect to other rows of this weave pattern that have been or will be inserted into that same area. After row 2 is inserted, rows 3 and 4, FIG. 30, then are inserted into the next succeeding two rows of the selected area; whereupon the rotation of the weave pattern rows commences again with row 1.

The weave library of the system is stored in a weave memory WM, FIGS. 26G and 31, the contents of which are transferred as needed to the pattern register PR through the memory data register MDR of WM. The weave memory WM is addresed in accordance with the numbers of the selected weave patterns. Such weave pattern numbers are stored in a weave selection memory WSM, FIGS. 26G and 31, which keeps a record of the weave pattern numbers that are available in the "library," i.e., the weave memory WM.

The foregoing describes in a general way the procedure followed for inserting a selected weave pattern into a selected area of the weave design. A detailed description of this operation now is presented with reference to the flow chart, FIGS. 36A and 36B, and the circuit diagram FIGS. 26A to 26M. Where appropriate, elements of the circuit diagram, FIGS. 26A to 26M, are cross-referenced to the various steps of the flow chart indicated by the boxes labeled "I–1," "I–2," etc., in FIGS. 36A and 36B.

It is assumed that all of the disjoint areas in the displayed outline design have been appropriately labeled as shown, for example, in FIG. 24, and that the operator desires to insert the twill weave pattern, FIG. 9, into the area labeled "2" in FIG. 24.

Certain preliminary operations (not indicated in the circuit diagram) are performed as indicated in FIG. 36A. Thus, the operator touches the light pen to the point on the screen at which the selected area symbol, in this case "2," is displayed, and depresses a foot switch (not shown), furnishing to a "buffer location" register, BUF LOC) not shown), the location in the display unit buffer from which the symbol 2 is being displayed. The BUF LOC setting then is gated into a TEMP (temporary) register, FIG. 26G, following which a correction factor designated "DMB" (display memory-to-buffer, or vice versa) is gated into TEMP with the appropriate sign, thereby converting the buffer location into the corresponding address of the display memory DM, FIGS. 26D and 37. This address then is gated from the TEMP register into the memory address register MAR of DM for enabling DM to be read-accessed at an address therein that corresponds to the buffer location at which the designation of the area symbol in question is stored (this being the buffer location that controls the generation and display of the area label, as mentioned above).

At this point of the operation, therefore, the MDR of DM, FIG. 26D, now stores in its right-hand field the label of the area selected by the operator, into which the chosen weave pattern is to be inserted. The next step, which still is part of the preliminary operation, FIG. 36A, is to gate this area label information from the MDR of DM into a special "LABEL" register, FIG. 26H, where it is retained for subsequent reference during the "Insert Weave" operation.

Having selected the area into which the weave pattern is to be inserted, the operator then selects the number of the weave pattern which is to be inserted into that area. This may be done by manipulating the program function keys 29, FIG. 14. Certain initialization steps now are performed, as indicated in the box numbered I–1 in FIG. 36A. The weave number set up on the keyboard 29 is transferred to the memory address register of the weave selection memory WSM. The Y LIMIT is set, and the memory address register of the woven area memory WAM is initialized. It is assumed herein that the weave number selected by the operator is available in the weave library of the system. If no such weave number were available, however, the memory address register of WM then would not be set to a meaningful address. If desired, an appropriate warning indication could be given automatically to the operator under these conditions.

At each address of the weave selection memory WSM,

FIG. 31, three items of information are stored, namely, the weave number, the number of rows in the stored weave pattern, and the number of columns in the stored weave pattern. Thus, for example, in weave pattern No. 52, illustrated in FIG. 30, the stored pattern contains four rows and four columns of bits. As can be seen from an examination of FIGS. 8 to 11, different weave patterns may require different numbers of rows and columns in order to express the smallest recurrent pattern unit of this weave.

Following the read-accessing of the weave selection memory WSM (steps I-2 and I-3, FIG. 36A), the memory data register MDR of WSM contains the aforesaid three items of information relating to the selected weave pattern. Referring now to step I-5 of the sequence, FIG. 36A, the weave number in the left-hand field of the MDR of WSM is gated into the memory address register MAR of the weave memory WM to find the weave pattern designated by the selected number. At the same time, the number of rows in such weave pattern is entered into the row register, RR, FIG. 26G, and the number of columns in the selected weave pattern is entered into a column register CR, FIG. 26G. A row counter RC, FIG. 26J, is set to the number 1 .The memory address register of the scan memory SM is initialized. The general position accumulator GPA then is reset to 1, and the ring R is reset to 0 (step I-6).

The operations now described are performed for each entry of a weave row pattern into the woven area memory WAM. The scan memory SM is read-accessed (steps 1-7 and I-8), thereby placing into the memory data register of the scan memory SM the zone number and number of positions associated with the first segment of the row now being analyzed in the stored outline design, FIG. 23. The right-hand field of the MDR of SM contains the number of positions in this segment, which number is now entered into a HOLD register, FIG. 26E, and also into the general position accumulator GPA (step I-10). The zone number in the left-hand field of MDR of SM now is compared with the area label stored in the LABEL register, FIG. 26H, as indicated at step I-11 in FIG. 36A. This comparison is performed by the COMPARE unit 80, FIG. 26L.

The system now generates the bits of a MASK in accordance with the correspondence or lack of correspondence between the zone numbers of the row segments and the area label selected by the operator. In the present example we have assumed that the operator selected area No. 2. Let it be assumed that we now are working in row Y3. It will be noted in FIG. 23 that the first segment of row Y3 (bit positions X0 through X4) is in zone 1. Hence, under these conditions an inequality between "zone" and "label" numbers is detected at step I-11, FIG. 36A. This causes a "0" bit to be gated into the MASK at a position determined by the present ring setting.

If the zone number of the row segment presently being examined corresponds to the area label selected by the operator, then the comparison test I-11 will show an equality (step I-12). This causes a "1" to be gated into the bit position of the MASK determined by the ring setting.

As each 1 or 0 bit is entered into the bit position of the mask which corresponds to the ring setting, the ring R is advanced one stage, and the HOLD register is decremented by 1 (step I-14). Then a test is performed (step I-15) by COMPARE unit 80, FIG. 26L, to determine whether the HOLD setting has been reduced to zero. If not, the above-described steps I-11, I-12 (or I-13), I-14 and I-15 are repeated. Since the HOLD register setting initially is made equal to the number of positions in the current row segment, and this setting is decremented right after each bit is entered into the MASK, the HOLD setting reaches 0 when the last mask bit of this segment has been gated into the MASK. By that time there will have been set up in the MASK a string of either 0's or 1's positioned according to the location of the current row segment within its row. If the row segment bears zone number 1, and area 2 is of interest, the mask bits generated during this phase of the operation will be 0's. This can readily be seen by referring to FIG. 34. On the other hand, if the zone number of a segment corresponds to the area label, then a series of "1" mask bits will be generated, as indicated for zone 2, FIG. 34.

Each time the mask bit generating process goes through a segment of a row, reducing the HOLD register setting to 0, the memory address register of the scan memory SM is incremented, as indicated at step I-16, FIG. 36A. A test then is made by COMPARE unit 82, FIG. 26J, to see whether the end of the row has been reached (step I-17). If not, the scan memory SM is read-accessed again (step I-7), bringing another segment thereof out to the memory data register MDR for analysis. The steps from I-7 to I-17 are repeated as often as needed to exhaust the segments in that row.

When the end of the row is reached, there will be a "yes" output from step I-17, FIG. 36A. The complete MASK for the row now has been generated. The next phase of the operation involves filling the pattern register PR with the bits of the weave row pattern. The weave memory WM is read-accessed at step I-18, FIG. 36A. When this read-access is complete, the memory data register of WM stores one row of the selected weave pattern. This row, of course, will be much shorter than the length of the pattern register PR. The pattern bits of this row are gated into as many bit positions of register PR as are needed to accommodate them. For example, if the selected weave pattern contains four columns, the four weave pattern bits then are entered into the first four bit positions of the pattern register PR, as indicated in FIG. 31, this action occurring at step I-21 of the flow chart, FIG. 36A.

The woven area memory WAM also is read-accessed at this time (steps I-22 and I-23, FIG. 36A) thereby placing the currently addressed row of WAM into the memory data register of this memory. This row now is transferred from the MDR of WAM into the weave row register WRR. The system now prepared to shift the weave pattern bits in groups progressively through the pattern register PR, in order to fill this register with the basic weave row pattern, repeated several times. This operation is set forth in steps I-26 to I-29 of the flow chart, FIG. 36B. The number of columns in the bit pattern previously was stored in the column register CR. To preserve this information, the setting of register CR now is gated into a column count register CCR, which will be decremented progressively in the manner presently described. At this time the general position accumulator GPA is reset to 1. At step I-27 the pattern register PR performs a right shift of one unit, and the GPA is incremented by 1. The column count register (CCR) setting now is tested by COMPARE unit 80, FIG. 26L (step I-28), to see if it is "1." Since it is not, there is a "no" output from I-28. The CCR is decremented 1, and another right shift is performed. This process is continued in the loop I-27, I-28 and I-29 until the CCR setting has been reduced to 1, producing a "yes" output at I-28.

At this time the initial group of weave pattern bits entered into the register PR will have been shifted right a sufficient amount to make room for the next succeeding group of weave pattern bits to be entered into PR, this next group of bits being a repeat of the preceding group that was just shifted right in PR. The contents of the memory data register of the weave memory again are gated into the register PR (step I-13), the result of this entry being indicated in FIG. 32, where a second group of pattern bits 1100 is positioned immediately to the left of a first group of pattern bits 1100 in the pattern register PR. A test now is made by COMPARE unit 82, FIG. 26J, (step I-31, FIG. 36B) to see whether the pattern register PR now is filled with weave pattern bits, which is not true at this time. The general position accumulator GPA at this time will have been incremented an amount equal to the number of columns registered in the column register CR. Hence, the GPA setting does not exceed X LIMIT, and a new cycle of right shift operations therefore is initiated (steps I–27, etc.).

The above-described pattern entry and shift operations are repeated as many times as needed to bring the GPA setting just past the X LIMIT value, thereby initiating an end-of-row operation. This involves gating the contents of the pattern register PR through the MASK into the weave row register WRR, as indicated in FIG. 35 and at step I–32, FIG. 36B. The MASK permits the PR bits to pass through it only where the mask bits are equal to "1," the PR bits in all other positions being blocked by the mask. The register WRR now contains the selected weave pattern bits only in the segment thereof identified by the zone number 2, FIG. 35, assuming that this is the zone into which we wish to insert the weave pattern.

From the weave row register WRR the row of information just entered is now gated into the MDR of the woven area memory WAM (step I–33) and a write-access operation is performed for entering the contents of MDR into WAM. The memory address register of WAM then is incremented, and a test is made by COMPARE unit 82, FIG. 26J, (step I–38) to see whether the MAR setting has exceeded the Y LIMIT. If not, the program branches to the step I–39, FIG. 36B, where the row counter RC is incremented 1, bringing it to its "row 2" setting.

The system now prepares to bring the next row of the weave pattern (i.e., row 2 in the present instance) into the pattern register PR. A test is made by COMPARE unit 80, FIG. 26L, to see whether the row counter (RC) setting is greater than the setting of the RR register, which stores the number of rows in the weave pattern (step I–40). If not, then the memory address registers of the weave memory WM and the scan memory SM are incremented (step I–44, FIG. 36B), and the ring R and GPA are reset (step I–6, FIG. 36A). The system then goes through the sequence of operations designated by steps I–7, etc., for feeding the new row of the weave pattern progressively into the pattern register PR until the latter is filled therewith. A new mask setting is generated in accordance with the location of the segment bearing the desired zone number in the row currently being analyzed. Then the contents of the PR register are gated through the MASK into the weave row register WRR, thence into the woven area memory WAM.

This procedure is repeated row by row. Eventually a point will be reached where the row count exceeds the number of rows stored in the row register RR, whereupon a "yes" output is obtained from the test step I–40, FIG. 36B. At this point it is necessary to re-address the weave memory WM in order that row 1 of the weave pattern again can be read out of WM into the pattern register PR, as indicated in FIG. 31. This is accomplished at step I–41 of the flow chart, FIG. 36B. The left-hand field of the data stored in the MDR of the weave selection memory WM, thereby, in effect, re-initiating the readout of the selected weave pattern.

The selected weave pattern must be read out repeatedly in this manner until all rows of the labeled outline design have been traversed. Each time the weave pattern readout operation is indexed back to row 1, the row counter RC is reset to 1, as indicated at step I–42, FIG. 36B, so that it may start the row count anew.

The completion of the "Insert Weave" operation is indicated by a "yes" output from the test at step I–38, FIG. 36B, when the MAR setting of the woven area memory WAM exceeds the Y LIMIT previously set up. The next operation called is a "Display" operation whereby there is displayed on the viewing screen a representation of the outline design with the selected weave pattern "woven" into a selected area thereof. The "display" operation involves, in the present instance, transferring the contents of the woven area memory WAM into the display memory DM, FIG. 37. This operation is similar to transferring the contents of any other binary matrix, such as the outline memory OM, to the display memory DM; hence, a description of the way in which this is accomplished for the memory WAM will suffice for all similar transfer operations. Outline information and woven area information can be stored in the same section of the display memory DM, with the appropriate address initializations.

Referring to FIG. 37, a point P displayed on the viewing screen 26 of the display unit is assumed to be positioned with reference to a screen coordinate grid having approximately 1000 x 1000 positions. The screen coordinates of each displayed point P, herein referred to as SCREEN X and SCREEN Y, respectively, are stored in the X and Y fields of the display memory DM, along with a coded representation of the symbol to be displayed at that point, stored in the "symbol" field. Each addressable row of the display memory DM pertains to a point on the screen coordinate grid. These screen coordinates do not necessarily correspond to the coordinates of the point P′ in the woven area memory WAM where the bit corresponding to the displayed point P is stored. As a general rule, there are certain multiplicative factors and certain additive factors which must be taken into account in converting WAM coordinates to screen coordinates. Thus, referring to FIG. 37, the SCREEN X coordinate is equal to the product of WAM X times the multiplicative factor MX SCALE, plus the additive factor KX SCALE. Similarly, the SCREEN Y coordinate is equal to the product of WAM Y times the multiplicative factor MY SCALE, plus the additive factor KY SCALE.

The process of displaying upon the screen 26 a weave pattern stored in the woven area memory WAM involves, first, converting the binary 1 and 0 bits in WAM to the appropriate coded representations of symbols to be displayed, and then converting the WAM X and WAM Y coordinates to SCREEN X and SCREEN Y coordinates. Insofar as the symbol display is concerned, it will be assumed in the present description that a binary 1 stored in WAM is to be displayed at least initially as a "dot" on the screen 26, while a binary 0 bit stored in WAM will be represented at least initially as a blank on the screen 26. Subsequently, a "line and dash" display may be substituted for the "dot and blank" display. Representations of the symbols which are available for display are assumed to be stored in suitable registers, herein identified as the DOT, LINE and DASH registers, respectively, FIG. 26D. The indicia relating to the SCREEN X and SCREEN Y coordinates and the symbol to be displayed are stored in the three fields of the display memory DM. For each point such as P′ in the woven area memory WAM, FIG. 37, there is a three-field entry in one row of the display memory DM. The steps involved in making this conversion will be explained.

After each desired weave pattern has been inserted into a selected area of the outline design (in accordance with the "Insert Weave" (I) routine that was described above in connection with FIGS. 36A and 36B, a display routine is initiated. To obtain a dot-and-blank display of the inserted weave pattern, the operator calls for the "Display" (D) routine illustrated in FIGS. 38A and 38B. It is assumed herein that any "D" routine can, if desired, be preceded by an operation which clears the display memory DM of its previous contents and re-enters the outline boundary information therein. Area labels can be re-applied readily wherever necessary.

Figure 38A:
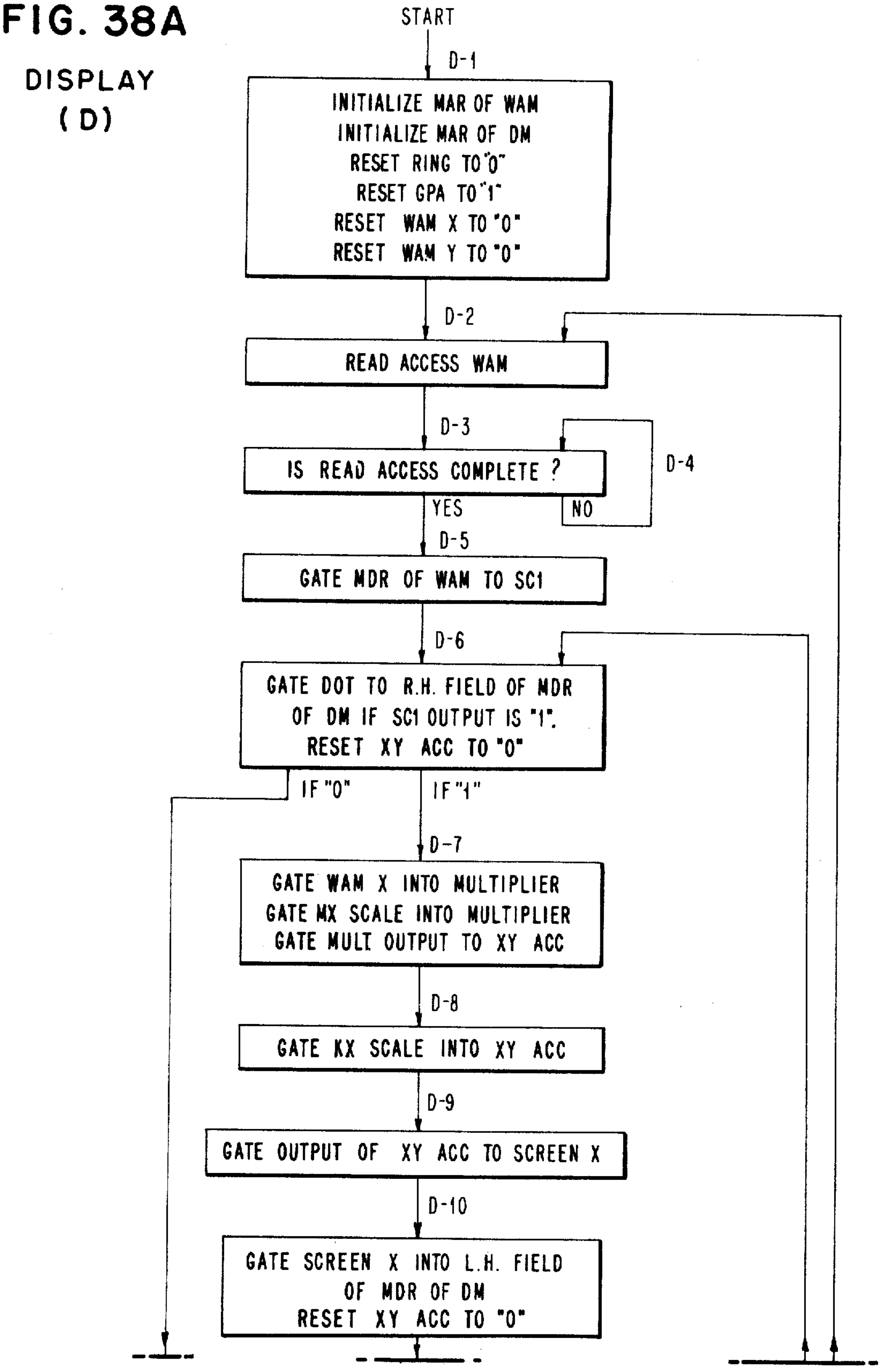
FIGS. 38A and 38B constitute a flow chart of a procedure for causing stored binary patterns to be displayed in "dots and blanks" form.
Figure 38B:
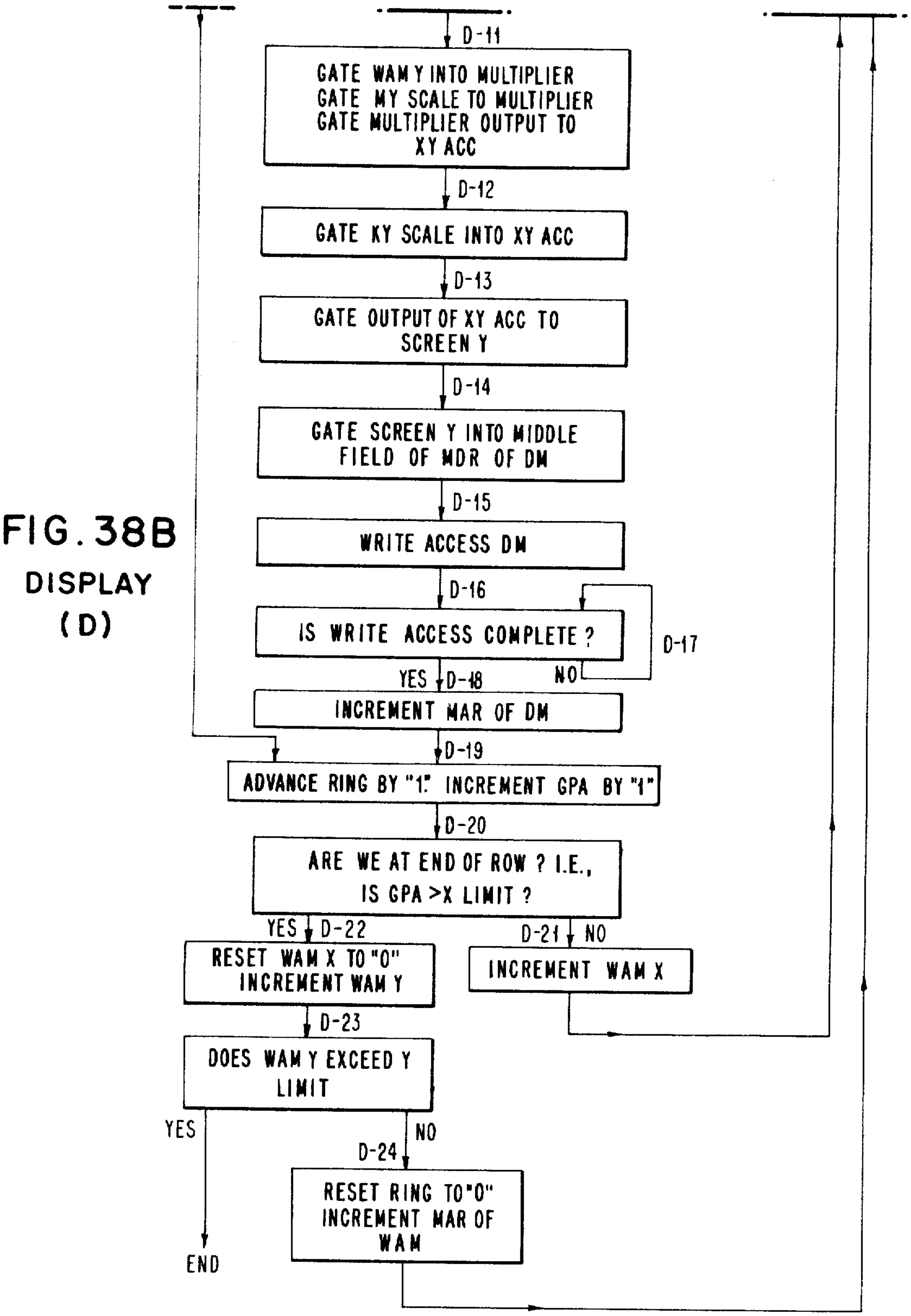

The step numbers D–1, D–2, etc., of the flow chart shown in FIGS. 38A and 38B are referenced to corresponding portions of the circuit diagram in FIGS. 26A to 26M. At step D–1 the ring R is reset to 0 and the general position accumulator GPA is reset to 1. The WAM X and WAM Y registers are reset to 0. The memory address registers of the woven area memory WAM and the display memory DM are initialized. The woven area memory WAM now is read-accessed, and the first row of information is read out therefrom to the current row register SC1 (steps D–2 to D–5, FIG. 38A).

There now follows a step (D–6) in which the current row bit denoted by the ring setting (SC1 output) is checked to see whether it is a binary 1 or 0. If the WAM bit is a 1, then the contents of the DOT register are entered into the right-hand or "symbol" field of the memory data register of the display memory DM. If the WAM bit is a 0, denoting a blank, no entry is made into the display memory DM, and the operation then skips to step D–19 of the "D" routine (FIG. 38B). Thus, a binary 1 stored in the woven area memory WAM is converted to a DOT representation for display purposes, and a binary 0 bit stored in WAM is, in effect, ignored in the present mode of operation.

Assuming that a DOT has been entered into the display memory DM, the system now proceeds to convert the WAM X and WAM Y coordinates into their corresponding screen coordinates for storage in the display memory DM. Thus, referring to step D–7, FIG. 38A, the settings of the WAM X and MX SCALE registers are gated into a multiplier unit for obtaining the product of these two factors, which then is gated into an XY accumulator. Next, the additive KX SCALE factor is entered into the XY accumulator (step D–8). The computed output then is gated into the SCREEN X register, from whence it is gated into the left-hand field of the memory data register of the display memory DM (steps D–9 and D–10). A similar process is followed for converting the WAM Y coordinate to a corresponding SCREEN Y coordinate, which is entered into the middle field of the memory data register of the display memory DM (steps D–11 to D–14, FIGS. 38A and 38B).

All of the information in the MDR of DM now is entered into the currently addressed row of DM (write-access operation, steps D–15 to D–17). The MAR of DM is incremented (D–18) to receive the next entry, and the settings of the ring R and general position accumulator GPA are advanced (D–19).

At step D–20 an "end-of-row" test is made by gating the GPA setting and X LIMIT into the COMPARE unit 82, FIG. 26J. If the result of the end-of-row test is "no," then the WAM X register is incremented by 1 (step D–21), and the sequence of steps from D–2 through D–20 is repeated for the next bit position in the current row of the woven area memory WAM. Eventually the end of the current row is reached, so that the end-of-row test (D–20) produces a "yes" output. The WAM X register then is reset to 0 (step D–22) in preparation for the next row readout operation. The WAM Y register is incremented by 1 in order to indicate an advance to the next row of WAM. A test then is performed by COMPARE unit 82, FIG. 26J, to determine whether the setting of WAM Y now exceeds the Y LIMIT value (step D–23). If not, the ring is reset to 0; the memory address register of the woven area memory WAM is incremented by 1; and the operation returns to step D–2, FIG. 38A. Thus, a new row readout operation is commenced. When the WAM Y setting exceeds Y LIMIT, indicating that the final row of the woven area memory WAM has been read out and converted into the appropriate screen display data, the Display routine is ended.

Figure 39A:
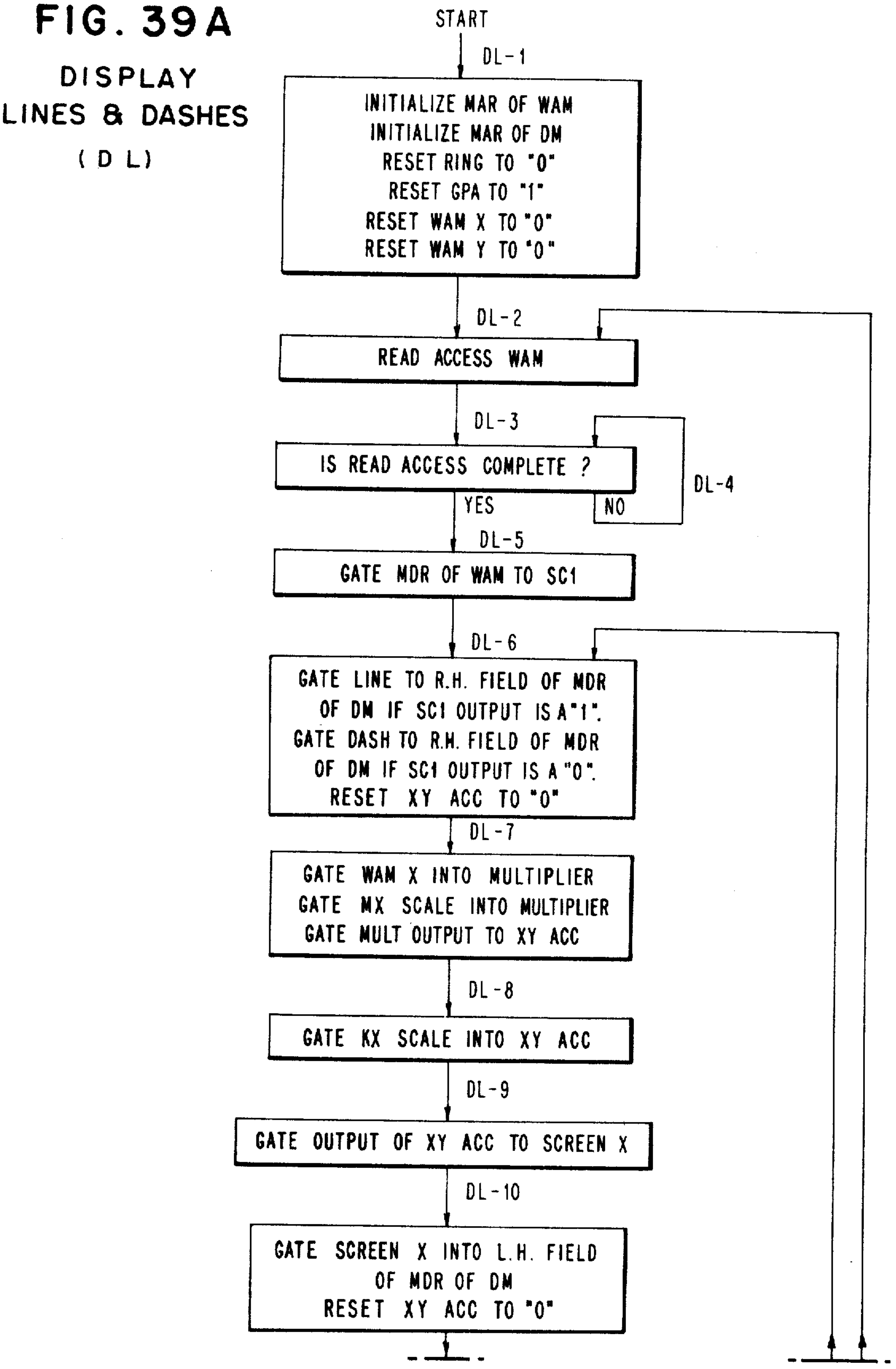
FIGS. 39A and 39B constitute a flow chart of a procedure for causing stored binary patterns to be displayed in "lines and dashes" form.
Figure 39B:
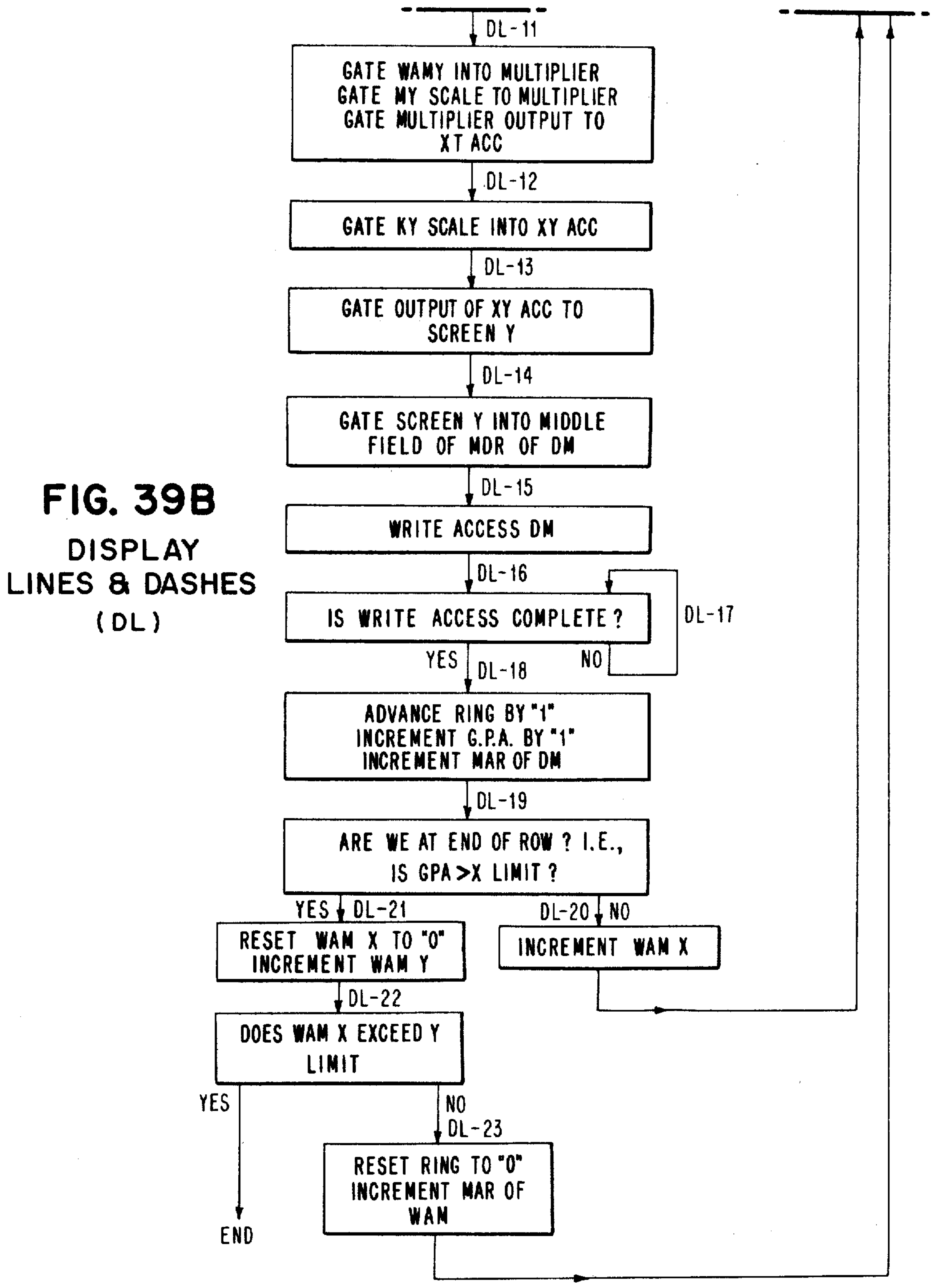

When all of the disjoint areas of the design have been "woven" with dot-and-blank weave patterns, the operator may desire to convert the displayed weave design into a line-and-dash form, which more nearly resembles the actual appearance of the woven cloth. Such a conversion from one form of display to another can readily be accomplished by utilizing the "Display Lines & Dashes" (DL) routine shown in FIGS. 39A and 39B. It may be found preferable to precede the DL routine with an operation clearing the display memory DM of its contents. The DL routine is identical in form with the Display (D) routine just described, except that in the DL routine each "1" bit read from current row register SC1 causes a LINE symbol representation to be stored in the right-hand "symbol" field of the addressed location in the display memory DM, while each "0" bit read from SC1 causes a DASH symbol representation to be stored in said symbol field (step DL–6, FIG. 39A). As mentioned hereinabove, all outline boundaries are "woven out" in the final lines-and-dashes display of the weave design.

Conversion from one form of display to the other can readily be accomplished whenever desired. Before changing back to a dots-and-blanks display from some other form of display such as lines-and-dashes, however, it is necessary first to clear the display memory DM. This can be done by conventional means under the control of the function keyboard 29. It then is necessary to re-execute the procedures by which the outline and weave pattern information originally was entered into DM in dots-and-blanks form.

Thus far we have not described the procedure for causing the outline design stored in OM to be displayed upon the screen. Whenever it is desired to create a new display of the outline design, the operator calls a display routine which is identical with the Display (D) routine, shown in FIGS. 38A and 38B, except that it involves the contents of the outline memory OM rather than those of the woven area memory WAM. The circuitry for accomplishing this is not indicated in the circuit diagram, FIGS. 26A to 26M, since its configuration is considered obvious from the preceding description. As indicated above, the display memory DM may have to be cleared before displaying or re-displaying the outline.

Erase weave

Figure 40:
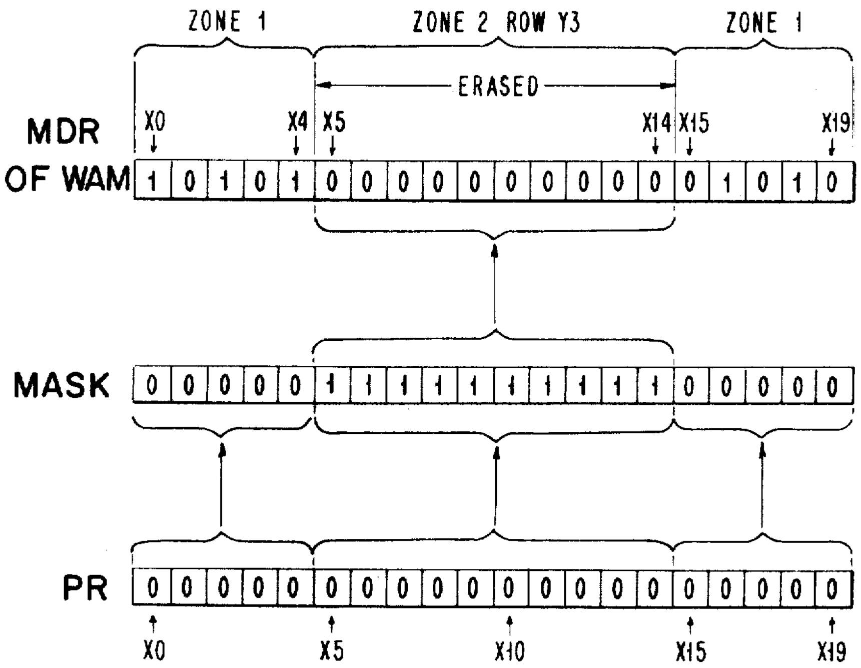
FIG. 40 is a diagram illustrating a phase of an "Erase weave" operation.

An operator may decide that a weave pattern which has been inserted into a particular area is not suited for inclusion in the weave design and should be erased from that area. Assume, for instance, that area 2, FIG. 24, has been filled with a weave pattern which the operator now wants to remove from that area. In each row segment bearing zone number "2" (such as, for example, the segment comprising bit positions X5 through X14 in row Y3, FIG. 23), the bits of the weave pattern now stored in each of these row segments are to be reset to 0's, and the corresponding portion of the screen is to be blanked. The general procedure for accomplishing this is as follows:

Referring to FIG. 40, there is generated (in a manner presently to be described) a MASK setting having 1's in the bit positions of the row segment which are to be reset and 0's in all other bit positions of that row. The pattern register PR is reset to all zeros. The contents of PR then are gated through the MASK to the memory data register (MDR) of the woven area memory (WAM), which now stores the pattern bits of the row under consideration. In those positions of the MASK which are set to 1 (namely, positions X5 through X14, which are in zone 2 of row Y3, FIG. 23) the MASK is open; consequently the 0's from the pattern register PR pass through these bit positions of the MASK and are entered into the corresponding bit positions of the MDR of WAM. In other bit positions of the row in question, the MDR setting is not disturbed, because the MASK prevents the passage of zero bits from PRR to MDR in those positions where the MASK bits are set to zero. Hence, only in the zone selected by the operator for erasure will the bit settings of the memory data register MDR be disturbed, i.e., reset to all 0's.

The above procedure is repeated row-by-row through the entire WAM matrix. Each row of the woven area memory WAM in turn is read out to the MDR of WAM, and it is automatically determined whether in this row there is a zone or zones in which the weave pattern bits are to be erased. Wherever there is a row segment identified by a zone number corresponding to the label of the area in which the operator desires to erase a weave pattern, the bits of such segment will be reset to all 0's. As weave pattern erasure (if any) is accomplished in that row, the row of bits as modified is written back into the appropriate location in the memory WAM.

Upon completion of the Erase Weave operation, the contents of the woven area memory WAM are re-displayed upon the viewing screen. It is preferable in this instance to utilize a dot-and-blank mode of display rather than a line-and-dash mode of display, inasmuch as the latter would involve filling the erased area with dashes rather than blanks as desired. If a dot-and-blank form of display is selected, then of course the entire weave design will be displayed in that mode, and a subsequent "Display Lines and Dashes" (DL) routine will have to be called in order to display a weave design simulated by lines and dashes.

Figure 41A:
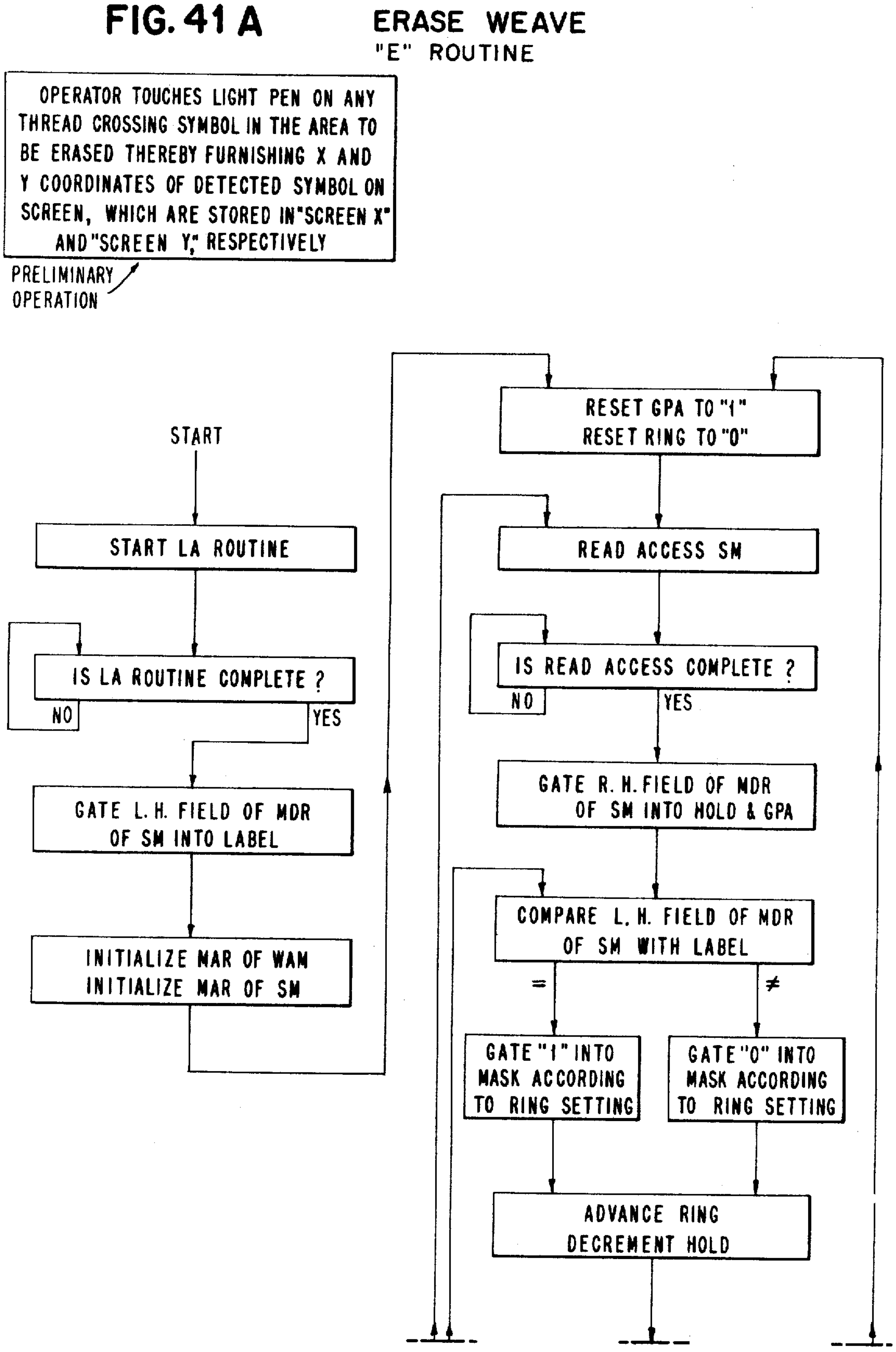
FIGS. 41A and 41B are a flow chart of the "Erase weave" procedure.
Figure 41B:
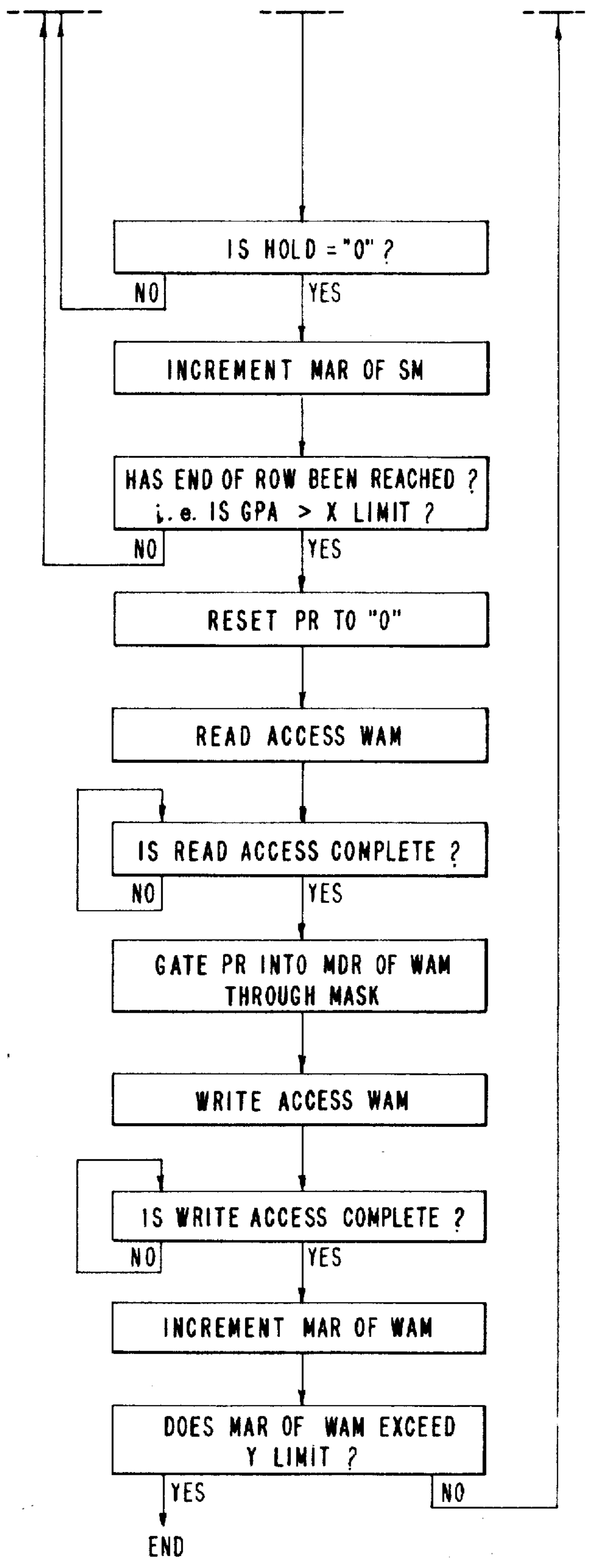

The flow chart for the Erase Weave operation is shown in FIGS. 41A and 41B. The steps of this flow chart are not cross-referenced to the circuit diagram, FIGS. 26A to 26M. However, because of the similarity between the Erase Weave operation and other operations described hereinabove, the manner in which the present routine is implemented by the circuitry of the system is considered to be obvious from the foregoing description.

The initial mode of display is immaterial in the present instance. As a preliminary step, the operator touches the light pen to any one of the illuminated thread crossing symbols displayed in the area from which the weave pattern is to be erased and operates the foot switch, thereby furnishing the X and Y screen coordinates of the detected symbol. These coordinates are stored in the SCREEN X and SCREEN Y registers, respectively. The initial portion of the Erase Weave routine is identical with the above described portion of the Label (L) routine designated LA, FIG. 28. Briefly, the execution of this LA routine involves finding the zone in which the symbol touched by the light pen is located, and storing that zone number in the left-hand field of the memory data register MDR of the scan memory SM.

The first step in the Erase Weave operation proper ("E" routine), following the completion of the LA routine, FIG. 41A, is to gate the zone number or area label representation from the left-hand field of the MDR of SM into the LABEL register. The memory address registers of the woven area memory WAM and the scan memory SM are initialized, and the general position accumulator GPA and ring R are reset to their normal settings.

The procedure now requires that the contents of the scan memory SM be examined segment by segment to find which segments bear the zone number of the area in which erasure of the weave pattern bits is to occur. For each row examined, a MASK setting which corresponds thereto is generated. Each time the scan memory SM is read-accessed, the number of positions stored in the right-hand field of its memory data register MDR is gated into a HOLD register and also into the GPA, and the zone number stored in the left-hand field of the MDR of SM is compared with the number registered in the LABEL register. If the zone and label numbers are equal, this signifies that the segment under consideration lies in a zone from which the weave pattern bits are to be erased. Hence, for each bit position in this segment, there must be generated a "1" bit in the corresponding position of the MASK. On the other hand, if the zone number of the segment under consideration does not correspond with the area number stored in the LABEL register, than a zero bit must be generated in the MASK at every position corresponding to a bit position in that segment.

A count is maintained of the number of 1 or 0 bits gated into the MASK relative to the number of bit positions in the particular row segment under consideration. This is done by decrementing the HOLD register each time the ring R is advanced, and when the setting of the HOLD register reaches 0, the memory address register of the scan memory SM is incremented to bring the next succeeding segment into play.

As each new segment is read-accessed, the number of positions in that segment, as registered in the right-hand field of the MDR of SM, is gated into the HOLD register and into the general position accumulator GPA. Eventually the GPA setting exceeds the X LIMIT, indicating that the end of the row has been reached. By this time, a complete MASK setting has been generated for the current row.

It may be observed that the MASK setting which is generated for each row in the present instance is identical with the MASK setting that was generated for the same row when the weave pattern originally was inserted therein. (Compare FIGS. 40 and 35, for example.) In the present case, however, the "open" positions of the MASK will be used to pass 0's rather than the bits of a weave pattern.

The next step involves resetting the pattern register PR to all zeros. The woven area memory WAM then is read-accessed to store the contents of the current row in the memory data register (MDR) of WAM. The zone erasure step proper is performed by gating the "all-zeros" contents of the pattern register through the MASK into the MDR of WAM, meaning that 0's will pass through the MASK only in those bit positions thereof where the MASK setting is "1." This causes all stored weave pattern bits in the row segment selected for erasure to be replaced by zeros in the MDR or WAM. Next, a write-access operation is performed for storing this modified row of bits in the currently designated address of the woven ara memory WAM. The memory address register (MAR) of WAM then is advanced to its next row address.

The foregoing operation is repeated for each row of the woven area memory WAM, so that eventually all of the pattern bits within the area designated for erasure have been set to an all-zeros condition. When the memory address register MAR of WAM passes the Y LIMIT of its advance, the Erase Weave routine is ended.

Now the contents of the woven area memory WAM, as thus modified, are transferred to the display memory DM for enabling the stored weave design as it now stands, to be re-displayed upon the screen, absent the weave pattern contained initially in the area selected for erasure. In a lines-and-dashes mode of display, such erasure would be indicated by the presence of dashes at all points of the selected area. In a dot-and-blank mode of display, the erased area will appear blank. Whatever mode of display is chosen for a particular area, the weave patterns in all other areas of the design will be displayed in that same mode.

The label of the erased area can be re-displayed on the screen by following an area labeling procedure as described elsewhere herein.

Alteration of a thread crossing

Figure 18:
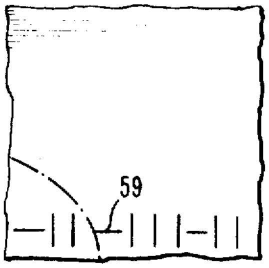

As described herein above in connection with FIGS. 16, 17 and 18, the operator may desire to change any one or more of the thread crossings in the weave design from the warp-over-weft type of the weft-over-warp type, or vice versa, in order to satisfy structural rules or aesthetic considerations. In the present system the alteration of a thread crossing involves locating the particular bit position in the storage matrix of the woven area memory WAM where the binary representation of the selected thread crossing is stored, inverting the setting of the memory cell in that position so as to change a stored 1 to 0, or vice versa, and displaying the altered thread crossing.

Figure 42:
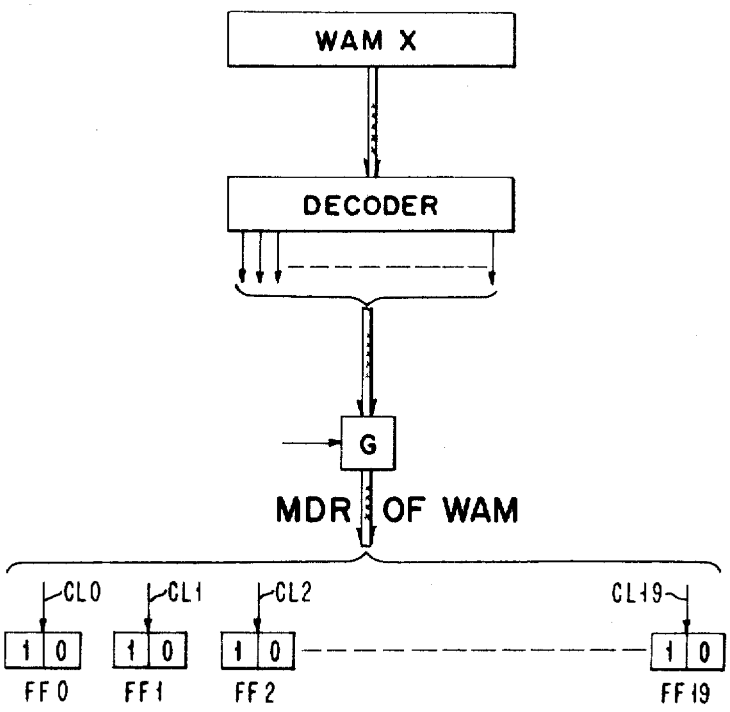
FIG. 42 is a diagram showing one phase of the procedure for altering a thread crossing representation or symbol.

Assume for the present that the WAM memory cell storing the bit in question already has been found (the technique for accomplishing this being explained very shortly). There now will be described, with reference to FIG. 42, the procedure for altering the chosen thread crossing representation. The row of the woven area memory WAM containing the bit in question has been located, and the contents of this row have been stored in the memory data register (MDR) of WAM. As indicated in FIG. 42, this register comprises a series of flip-flops FF0 to FF19, which are in the form of binary triggers. The arrows respectively pointing downward to the middle portions of these flip-flop symbols represent bit complementing lines CL0 to CL19, inclusive, that are adapted to be pulsed selectively for complementing the settings of their respective flip-flops. That is to say, a pulse on one of these complementing lines will cause the respective flip-flop to switch from one binary state to the opposite binary state, so that if the flip-flop initially had stored a 1, it now stores 0, or vice versa. Each flip-flop also has associated therewith the usual "1" and "0" entry lines, which are not shown in FIG. 42.

As explained hereinabove, a register designated WAM X, FIG. 42, is adapted to be set in accordance with the bit position that currently is being indexed in the addressed row of woven area memory bits. In the Erase Weave operation, register WAM X is set to correspond with the X-coordinate of the point where the inversion of a weave pattern bit (i.e., thread crossing) is to occur. Through a decoder, the WAM X setting is translated into a "one out of *n* units" setting for selectively causing one of the bit complementing lines CL0 through CL19, FIG. 40, to be pulsed at the appropriate time. For example, if the WAM X setting indicates that the X-coordinate is 2, then the complementing line CL2 is pulsed for inverting the flip-flop FF2 in the memory data register MDR of the woven area memory WAM. Hence, when the MDR contents are stored back in the appropriate row of WAM, a selected one of the thread crossing representations contained in this row will have been altered in the desired manner.

Figure 43:
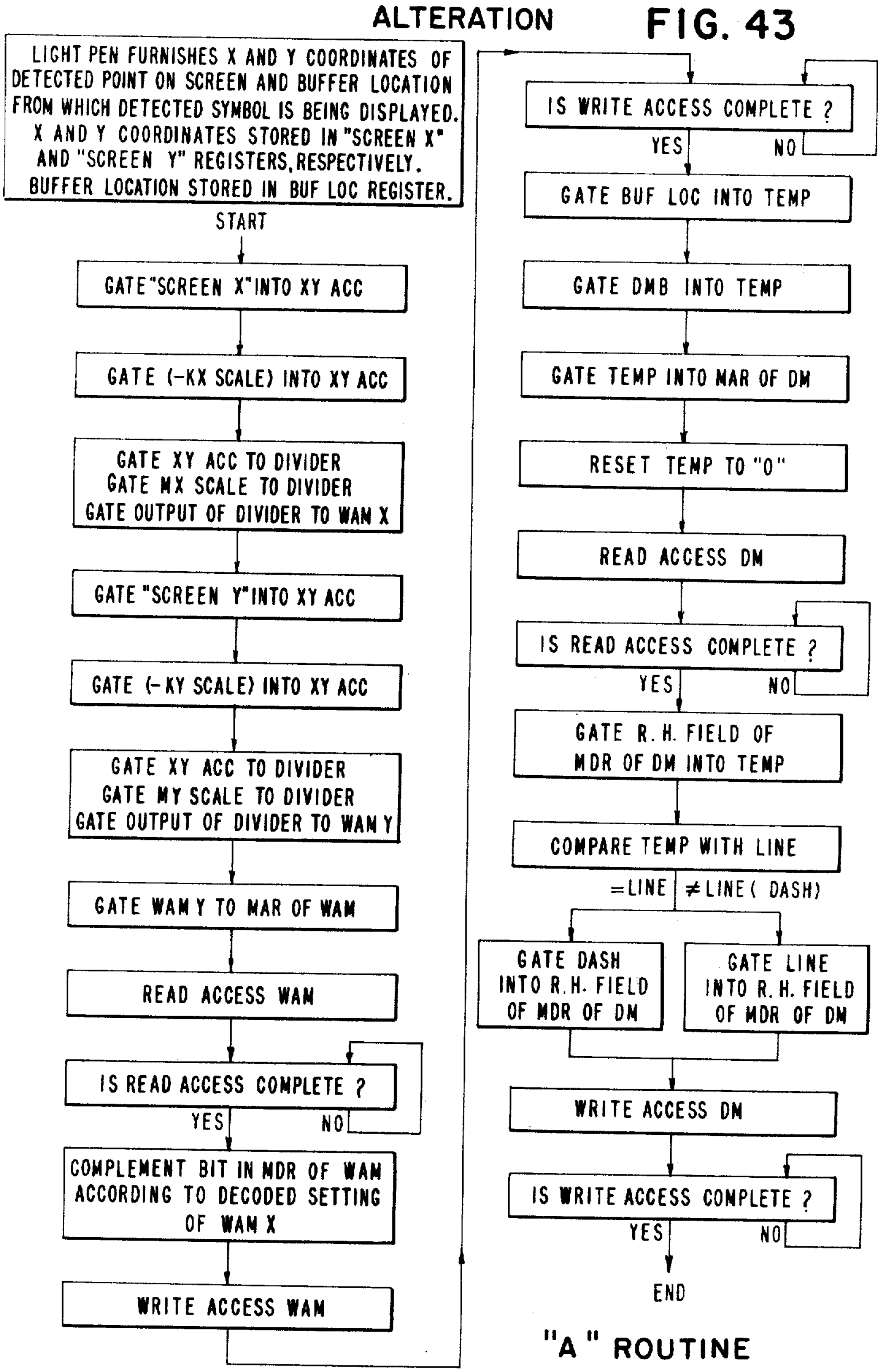
FIG. 43 is a flow chart of the "Alteration" routine.

Reference now is made to the flow chart of the "Alteration" (A) routine shown in FIG. 43. The steps of this chart have not been cross-referenced to the circuit diagram. However, because of the similarity between the Alteration routine and some of the other routines described hereinabove, the manner in which the Alteration functions are performed by the circuitry of the system is considered obvious from the teachings presented hereinabove.

As a preliminary step in the "Alteration" routine, the operator must furnish to the system the following information: (a) the X and Y screen coordinates of the thread crossing symbol which is to be altered, and (b) the buffer location from which such symbol is being displayed. The operator generates this information by applying the light pen to the desired one of the thread crossing symbols displayed on the screen, as indicated in FIG. 17, and closing a foot switch, which causes the X and Y screen coordinates to be stored in the SCREEN X and SCREEN Y registers, respectively, while the buffer location is stored in the BUF LOC register (not shown). It is assumed for present purposes that the display now is in a lines-and-dashes form, so that every coordinate point on the screen displays an illuminated symbol of one kind or another, i.e., a line or a dash. It is assumed also that, if necessary, the weave design display will be expanded on the screen to permit the selection of one symbol to the exclusion of its neighboring symbols. Such display expansion techniques are well known and will not be described herein.

The first phase of the Alteration routine consists of converting the screen coordinates of the chosen point into the corresponding coordinates of the woven area memory WAM. This process is the inverse of the procedure followed in converting WAM coordinates into screen coordinates as described hereinabove with reference to FIG. 37, in connection with the Display routine. Thus, the setting of the SCREEN X register is gated into the XY accumulator, and the KY SCALE factor is entered subtractively into this accumulator. Next, the contents of the XY accumulator and the MX SCALE register are entered into a divider unit, the output of which designates the X-coordinate in WAM which corresponds to the present SCREEN X value. This number is gated into the WAM X register.

A similar procedure is followed for converting the Y screen coordinate into the corresponding Y-coordinate of WAM. Thus, SCREEN Y is gated into the XY accumulator along with a negative entry of the KY SCALE factor. The difference is entered into the divider unit along with the MY SCALE factor, and the output of the divider is gated to the WAM Y register to indicate the Y-coordinate in the woven area memory WAM which corresponds to the Y screen coordinate of the point in question.

The setting of the WAM Y register now is gated into the memory address register of the woven area memory WAM in order to select the row of weave pattern bits which contains the bit corresponding to the selected point on the screen. The woven area memory WAM then is read-accessed to bring this row of bits into the memory data register of WAM.

The next step is to complement the particular bit in WAM representing the thread crossing in question. This bit now is among the weave pattern bits currently stored in the MDR of WAM. To select the proper bit, the setting of the WAM X register is decoded, as indicated in FIG. 42, and the decoded output is applied to the appropriate one of the bit complementing lines CL0 through CL19 for inverting the respective one of the flip-flops FF0 through FF19, that is to say, changing its state from 1 to 0 or vice versa. A write-access operation then is performed for transferring the modified row of weave pattern bits back into the appropriate location of the woven area memory WAM.

Thus far, what has been accomplished is to invert the stored bit in the woven area memory WAM which corresponds to the displayed thread crossing symbol that the operator desires to alter. Such alteration has not yet been accomplished on the screen of the display unit, however. To do this it, is necessary to alter the data stored in the display memory DM to correspond with the aforesaid alteration of the data stored in the woven area memory WAM. Referring to the right-hand column in FIG. 43, the setting of the BUF LOC register (which stores the buffer address from which the symbol in question is being displayed) now is gated into the TEMP register. An appropriate display-memory-to-buffer (DMB) factor also is gated into the TEMP register (with the appropriate algebraic sign) for converting the given buffer address into a corresponding address in the display memory DM. The contents of the TEMP register now are gated into the memory address register MAR of DM, and the TEMP register is reset to 0. The MAR thus is set to the address of the particular row in the display memory DM which contains the stored representations of the symbol in question and its associated screen coordinates.

When the display memory DM is read-accessed, there is stored in the right-hand field of its memory data register MDR an identification of the thread crossing symbol which is to be altered, i.e., whether it is a line or a dash. This symbol representation now is gated into the TEMP register, and the TEMP setting is compared with the setting of a LINE register which stores a standard line symbol. If the two representations are equal, this means that the displayed symbol in question is in the form of a line and must be changed to a dash. Under these circumstances, an appropriate signal is sent to the DASH register for causing its contents to be gated into the right-hand field of the memory data register MDR of the display memory DM, thereby replacing the line symbol initially stored therein with a dash symbol.

On the other hand, if the TEMP register has been set to store a dash symbol, the comparison test just made results in an inequality (indicating that a dash is being displayed at the point in question), and under these circumstances a signal is sent to the LINE register for causing a line representation to be gated into the right-hand field of the MDR of DM, replacing the dash symbol initially stored there.

Alteration of the selected line or dash symbol to the opposite dash or line symbol, respectively, now has been accomplished. A write-access operation thereupon is performed for storing back into the appropriate location of the display memory DM the modified information which will cause the desired new symbol to be displayed at the point on the screen selected by the operator. This ends the Alteration routine.

Output

It is assumed now that all necessary operations have been performed for producing on the screen of the display unit a weave design which is completely satisfactory to the operator. It now is desired to transfer the complete pattern of binary bits representing this design from the woven area memory WAM to an output unit, which may be a device for recording such information on cards or tape, or perhaps the textile weaving mechanism itself as indicated in FIG. 19.

Figure 44:
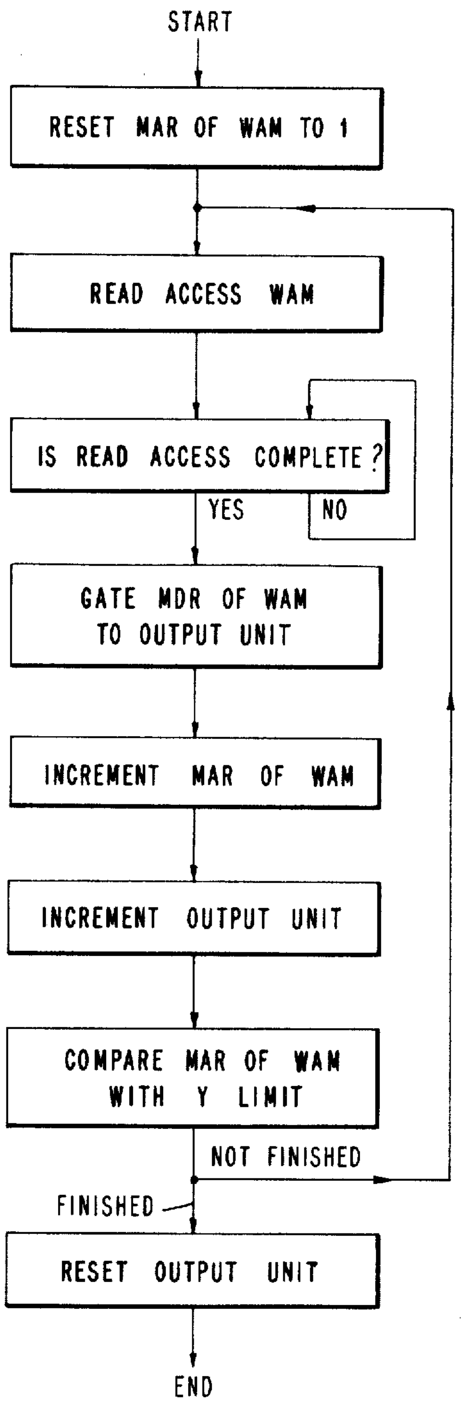
FIG. 44 is a flow chart of the "Output" routine.

The Output routine shown in FIG. 44 is a simple operation for transferring binary information row by row from the woven area memory WAM to the output unit. This operation is started by resetting the memory address register of WAM to 1 (first row). This row is read-accessed to enter its stored information into the memory data register MDR, from which it is gated to the output unit. The memory address registers of WAM and the output unit are incremented, and a test is made to determine whether WAM has been incremented to its Y LIMIT. If not, the sequence of steps described above, starting with "Read-access WAM," is repeated until the MAR setting of the woven area memory WAM exceeds the Y LIMIT, indicating that the transfer of information from WAM to the output unit is completed. The output unit then is reset to end the Output routine. The binary bit pattern defining the complete weave design now has been stored in a suitable record medium or else woven directly into fabric.

Alternative area labeling procedure

There has been described hereinabove, under the heading "Scan and Label," a method of labeling the various disjoint areas of a design whereby the operator decides at what place a label is to be displaced on the screen, and the system then determines automatically which area label should be displayed at that point, causing the appropriate character display to be generated accordingly. It may be desirable to provide a labeling procedure which is automatic not only as to the selection of the area labeling symbol for display but also as to the placement of such symbol on the screen. Moreover, it may be desirable to give the operator a warning indication of some kind if the area about to be labeled has not been completely defined by its supposed boundary.

In drawing the outline design upon the screen, the designer inadvertently may fail to complete the boundary drawn around a particular area, so that a small opening or "leak" exists in this boundary, i.e., the absence of a boundary point where there should be one. Under these circumstances, the scanning procedure described hereinabove would apply identical zone numbers to all row segments of the area under consideration and to all row segments of the area into which it "leaks." This then would result in the application of identical labels to both of these areas. If the operator were alert, he would notice identical labels being applied to two supposedly separate areas, and he would investigate the cause of this condition. If he failed to notice the identity of the area labels, however, he would not become aware of the faulty condition until he had inserted a weave pattern into one of these two areas and found that it flowed into the other area also.

Figure 48:
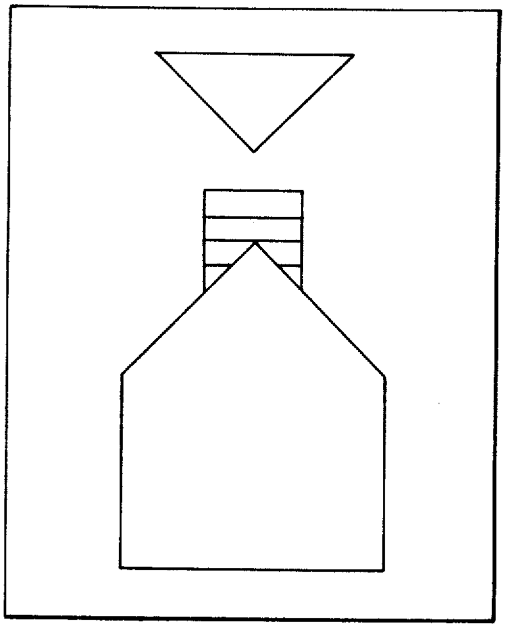
FIGS. 48 and 49 are schematic views showing different phases of an alternative labeling procedure described herein.

Suitable modifications can be made in the disclosed system, within the scope of the teachings presented hereinabove, to handle the special problems just mentioned. To give warning to an incompletely enclosed area in the outline design, a special horizontal lining ("HL") routine is provided for causing horizontal lines to appear temporarily on the screen in every row of the area that is about to be labeled. For instance, if an area label is to be applied to the area designated "3" in FIG. 24, the system first causes this area to be filled with horizontal lines, as shown in FIG. 48. If there is a leak in the boundary of the area (into the background area, for example) then such lines will appear in every row of both areas, meaning in this case that the entire background area, as well as area No. 3, will become filled with such lines. This gives the operator a clear warning to investigate the cause of the faulty condition and "touch up" the area boundary line with a light pen where necessary. The horizontal warning lines then are erased from the screen before applying a label to the area in question.

The information for generating the horizontal lines just mentioned is obtained from the scan memory SM and is supplied to a section of the display memory DM which is to be used for this purpose alone. As a preliminary step in the "HL" routine, FIGS. 50A and 50B, the memory address register MAR of the display memory DM is initialized to the first available address in the display memory DM, this initial DM address being stored in a special register provided for that purpose. The HL routine then is started. The selected area number is entered into the LABEL register. Since it is assumed in the present case that zone numbers will be used as the area numbers to be displayed, it would be convenient to select the area numbers in sequence, starting with "1." Such a sequence could be programmed to occur automatically, if desired.

Figure 50B:
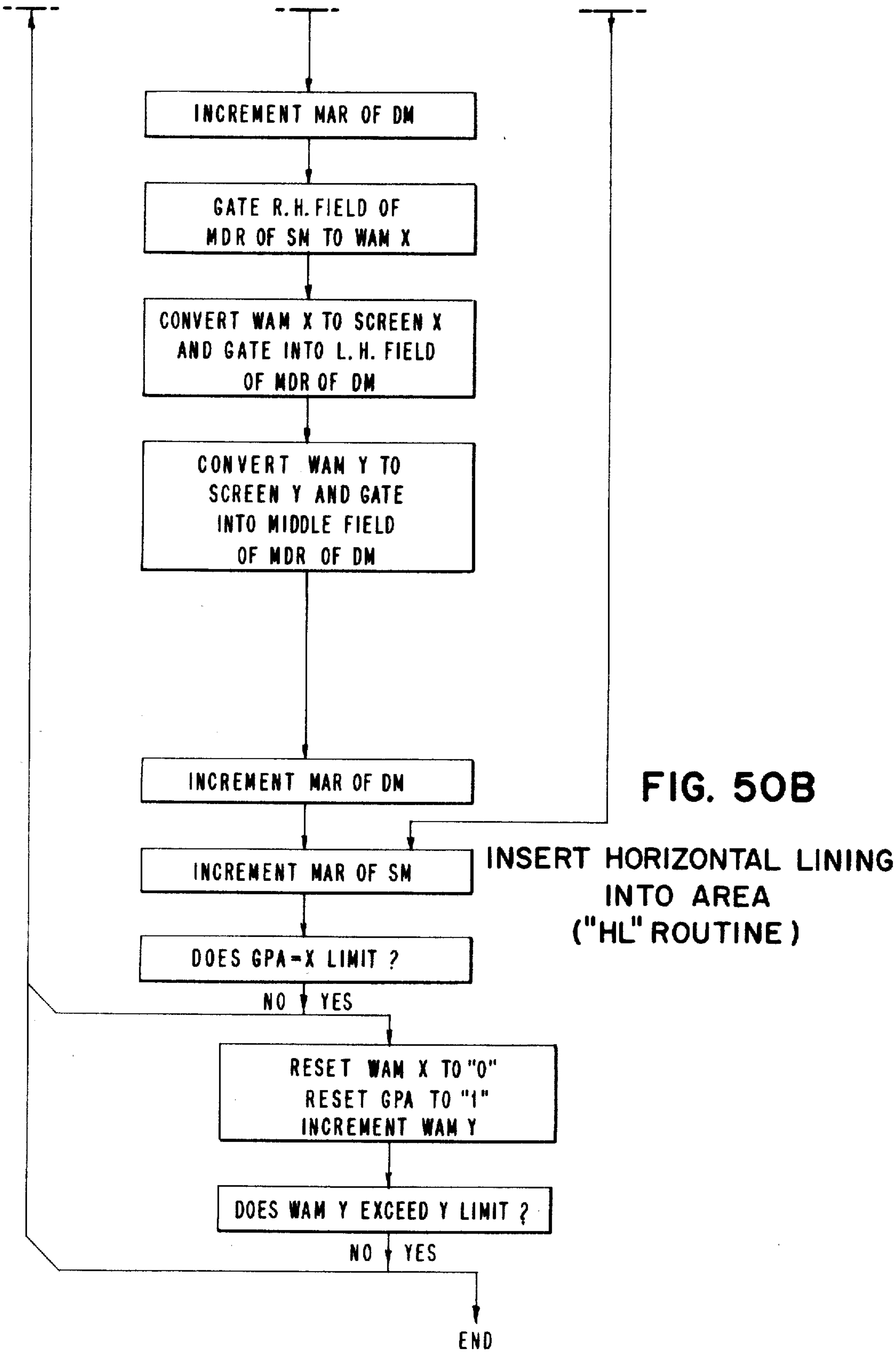

The HL routine shown in FIGS. 50A and 50B is believed to be obvious from the flow chart and will not be described in detail. Briefly, each segmental entry stored in scan memory SM is examined in turn to see whether its zone number corresponds to the given area label. If it does, two entries are made in the display memory DM, one to mark a point at the beginning of this row segment where a horizontal line is to commence (i.e., the beam unblanking position) and the other to mark a point at the end of said row segment where the horizontal line is to end (i.e., the beam blanking position). As a result of this procedure, there is stored in the aforesaid section of the display memory DM a table of the respective points at which the horizontal lines in the selected rows are to start and stop.

When the procedure described above is completed, the screen will display a set of horizontal lines throughout the area identified by the zone number in question. If no such zone number has been assigned to an area, then, of course, no such lines will appear anywhere on the screen. If two supposedly distinct areas actually are numbered alike, the horizontal lining on the screen will appear in both areas, indicating a "leak" in the area boundary that must be located and touched up with a light pen.

Figure 51:
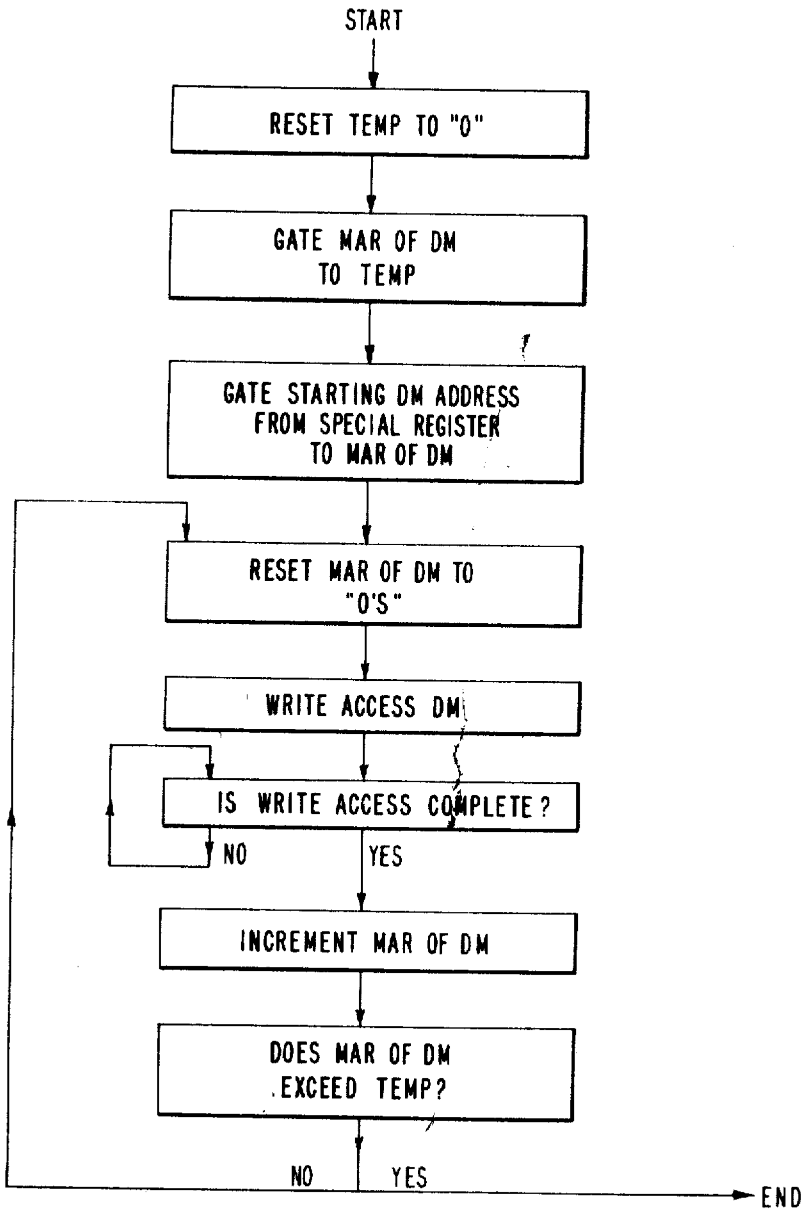

Prior to labeling the area in question, the horizontal lines are erased from this area by the "EHL" procedure illustrated in FIG. 51. In brief, the display memory DM is cleared of its contents between the initial DM address (which was saved at the start of the "HL" routine) and the current DM address, thereby deleting the horizontal line display from the screen.

Figure 52A:
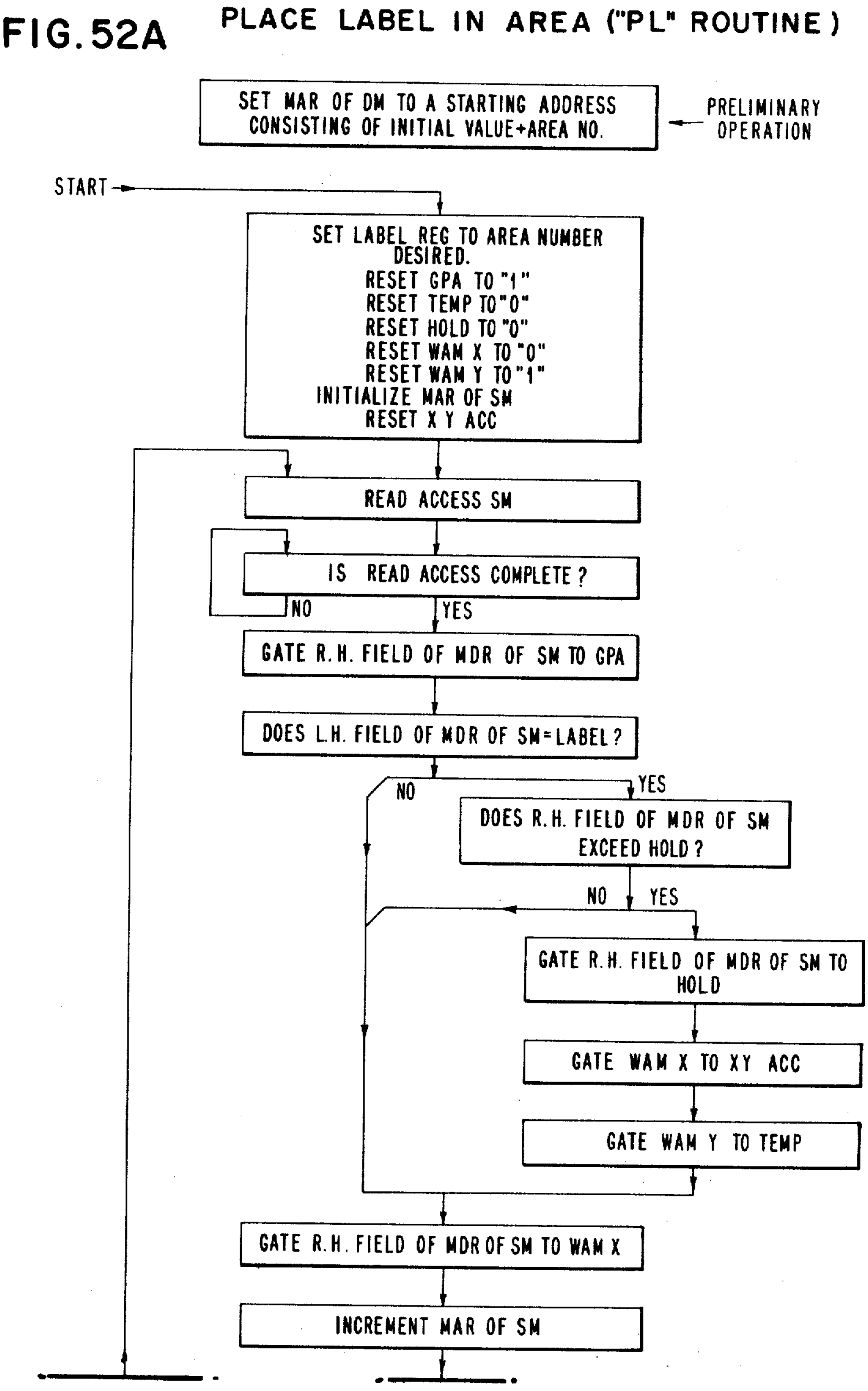
Figure 52B:
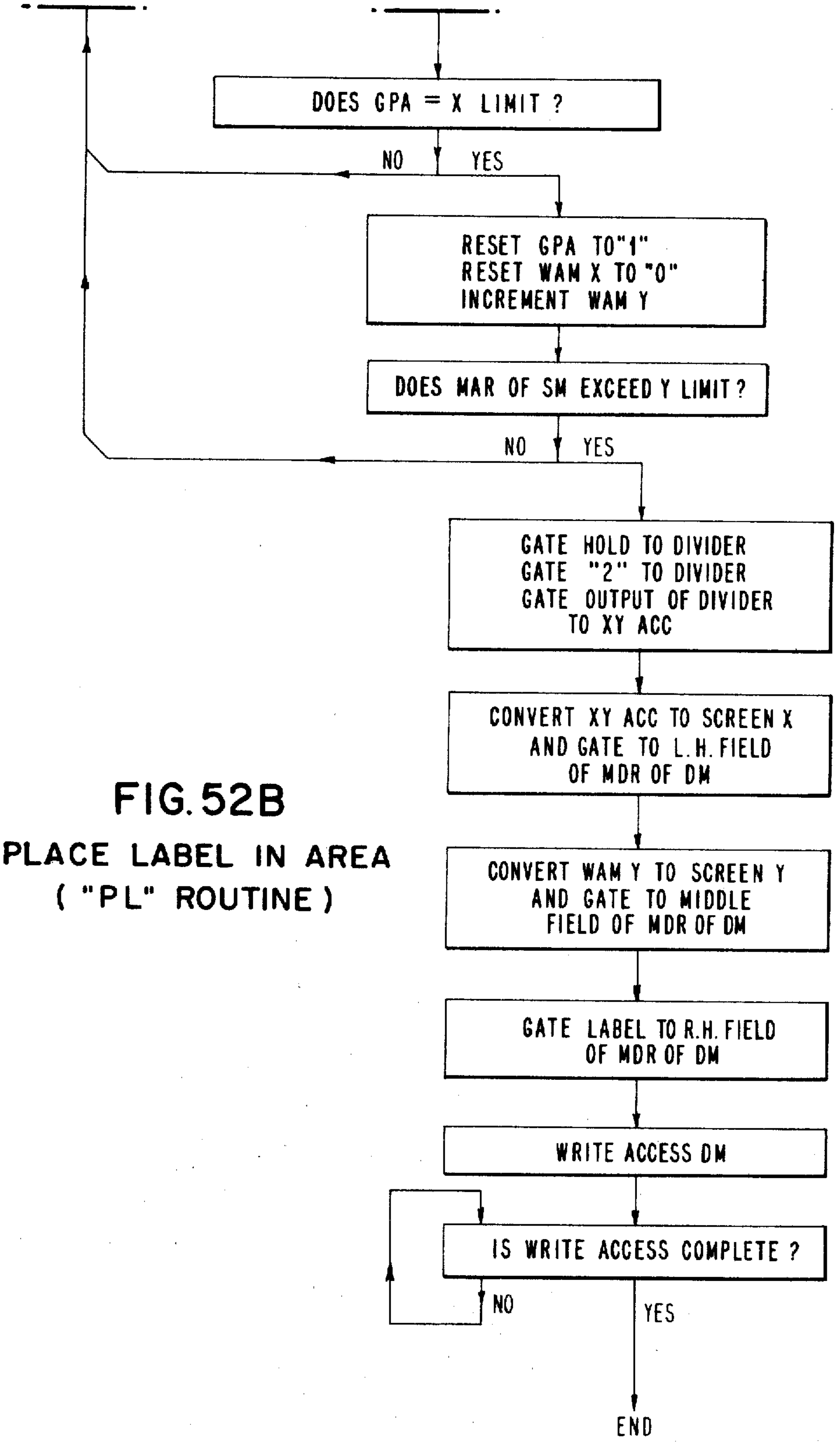

After determining that an area is ready to be labeled with a given zone number (stored in the LABEL register), the "PL" routine illustrated in FIGS. 52A and 52B is followed. Briefly, the purpose of this procedure is to find the longest row segment contained in the selected area and to place the area label at the midpoint of this longest segment. If a number of such segments have equal lengths, the first or lowermost of them is chosen. The labeling information thus determined is stored in a "label" section of the display memory DM. The memory address register MAR of the display memory DM is appropriately indexed each time a new label number is to be entered. A detailed description of the labeling procedure will not be given inasmuch as it is considered obvious from the flow chart in FIGS. 52A and 52B.

Figure 49:
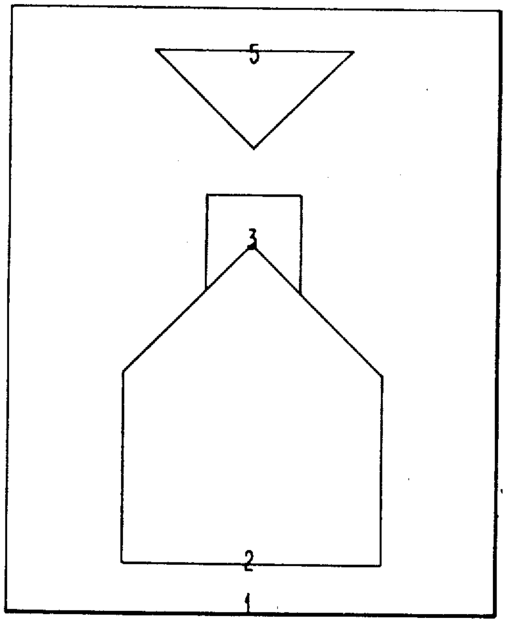

The "PL" labeling procedure just described will in many instances cause an area label to be displayed very close to a boundary line of its area. In the case of the design shown in FIG. 20, for example, all of the area labels will be positioned adjacent to their boundary lines, as indicated in FIG. 49. If this is found inconvenient or undesirable, it is a simple matter to move any displayed symbol from one location on the screen to another location on the screen by using a light pen in the "tracking cross" mode of operation. This procedure is well known and need not be described in detail herein. It involves moving the light pen 28 from the location where the area label is being displayed to the point where it should be displayed, and by means of the function keys 29 instructing the system to re-display the area label at the point last contacted by the light pen 28 while erasing it from the point first contacted by the light pen. This is done for each area label that is to be relocated on the screen. If additional storage fields are required in the display memory locations to accommodate this type of operation, it can be assumed that such additional storage capacity is available in the display memory.

Wherever the expressions "row" and "column" are used in the description and claims, it should be understood that these terms are interchangeable according to the mode of operation which is being employed. Terms such as "horizontal," "vertical," "above" and "below" likewise are intended to be figurative expressions only.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for graphically developing a textile weave design from an outline design composed of arbitrarily bounded disjoint areas, said apparatus comprising:

first data storage means (WM) for storing a plurality of weave patterns each represented by a distinctive array of stored bits, second data storage means including a data table (SM) denoting the relative positions of points on the boundaries of the respective areas, selecting means (28, 29, WSM and LABEL register) for making successive selections of stored weave patterns and areas into which such weave patterns are to be inserted, pattern register means (PR) for making the bits in at least a single row of the selected weave pattern available for insertion into any of the disjoint areas of the design, third storage means (WAM, WRR and MASK register) for selectively storing bits of each selected weave pattern in a weave design array, keeping each such assembly of weave pattern bits within limits effectively determined by the area boundary data stored in said second storage means (SM), while excluding from said design array those bits of each weave pattern available in said pattern register means which are not positionable within the selected area limits, and design manifesting means (DM and 25, or other output means) for manifesting symbols corresponding to the weave pattern bits stored in said third storage means.

2. Apparatus for graphically developing a textile weave design from an outline design having arbitrarily bounded disjoint areas positioned upon an assumed coordinate grid, said apparatus comprising:

first data storage means (WM) for storing arrays of bits respectively representing a plurality of arbitrary weave patterns, each having a distinctive arrangement of warp and weft thread crossings, second data storage means (OM and/or SM) for storing data to designate the positions, if any, in each row of said assumed coordinate grid that are located within each of the disjoint areas of said outline design, pattern selecting means (29 and WSM) for designating which of the available weave patterns is to be manifested in each of the areas of the outline design, area selecting means (28 and LABEL register) for determining the area in which each of the selected weave patterns is to be manifested, pattern register means (PR) settable under the control of said pattern selecting means and said first storage means for storing in positions respectively corresponding to tht positions in at least one row of said coordinate grid a pattern of bits corresponding to the bit pattern in at least one row of the selected weave pattern, said pattern register means storing such data bits for all positions of said coordinate grid row, third data storage means (WAM) for storing bits in a coordinate array of bit storing positions, selective data transfer means (FIG. 35) operable under the control of said area selecting means and said second storage means for transferring weave pattern bits from said pattern register means to those bit storing positions in said third storage means which correspond exclusively to the coordinate grid position within the selected area, and design manifesting means DM and 25, or other output means) for manifesting the bit pattern stored in said third storage means as an array of symbols representing a composite weave design.

3. Apparatus as set forth in claim 2 wherein said transfer means (FIG. 35) includes a selectively settable means (MASK register) for preventing the transfer of bits from said pattern register means to any of said bit storing positions that do not correspond to grid positions located within the currently selected area.

4. Apparatus as set forth in claim 2 wherein said second storage means includes the following:

a bit storing matrix (OM) adapted to store in some of its positions bits representing boundary points of the outline design positioned on said coordinate grid and in other positions thereof bits representing the intervening spaces in said outline design, whereby each row of said matrix is divided by the stored boundary bits into one or more segments, each segment containing a series of consecutively positioned space bits no two of which are separated by a boundary bit, and tabular data storing means (SM) for storing a series of data entries respectively listing the various row segments and the number of bit positions occupied by each.

5. Apparatus as set forth in claim 2 including pattern register means (PR) settable to store an "erase" bit pattern representing the absence of a distinctive weave pattern, said data transfer means being operable under the control of said area selecting means and said second storage means for transferring the bits of said "erase" pattern from said last-mentioned pattern register means to those bit storing positions in said third storage means which correspond exclusively to the coordinate grid positions within the selected area, thereby deleting any stored representation of a weave pattern previously manifested in such area.

6. Apparatus as set forth in claim 2 wherein said design manifesting means is operable to manifest bits having one kind of binary value as short vertical lines and bits having the other kind of binary values as short horizontal lines.

7. Apparatus as set forth in claim 2 including bit altering means operable to complement any selected one of the bits stored in said third storage means and to perform a corresponding inversion of the manifested symbol representing that bit (FIGS. 17, 18 and 42).

8. An apparatus for graphically analyzing an outline design composed of arbitrarily bounded disjoint areas positioned upon an assumed coordinate grid for the purpose of designating which coordinate grid points are contained within each of said areas, said apparatus comprising:

first storage means (OM) containing a coordinate array of bit storing positions respectively corresponding to the points of said coordinate grid and adapted to store in some of said positions bits representing grid points in the spaces between said boundaries, said boundary bits dividing the rows of bit storing positions in said array into row segments, each row segment containing a single series of one or more consecutively positioned space bits no two of which are separated by a boundary bit, each such series of bits being limited by boundary bits;

row scanning and zone numbering means for successively scanning the rows of said array to successively detect the bits stored in each of said rows and including the following means for assigning zone numbers to the respective row segments:

(a) means effective if none of the space bits in a row segment currently being considered is positioned in adjoining relationship to a space bit in the next previous row, for assigning to the current row segment the next available zone number not previously assigned to any other row segment;

(b) means effective if in a row segment currently being considered, and to which no zone number yet has been assigned, there is a space bit positioned in an adjoining relationship to a space bit in the next previous row for assigning to the current row segment the same zone number as that given to the previous row segment containing the last-mentioned space bit; and tabular data storage means (SM) operable under the control of said row scanning and zone numbering means to store successive data entries each denoting the zone number assigned to a respective one of said row segments and the number of bit positions contained in that segment, said entries denoting by identity of zone numbers a plurality of row segments located in the same disjoint area.

9. Graphical design analyzing apparatus as set forth in claim 8 wherein said row scanning and zone numbering means includes:

(c) means effective if a row segment currently being considered already has received a zone number from means (b) of claim 8, and said segment contains yet another space bit which is positioned in an adjoining relationship to a space bit in a differently numbered segment of the next previous row, for effectively rendering the zone numbers of these two segments equivalent for the purpose of identifying row segments located in the same disjoint area.

10. Graphical design analyzing apparatus as set forth in claim 9 wherein said row scanning and row numbering means further includes means for converting all previous row zone numbers to the current row zone number in each instance where means (c) of claim 9 has been effective.

11. Apparatus as set forth in claim 9 further including means operable under the control of said tabular data storage means for causing a plurality of parallel lines to be displayed on said coordinate grid in any selected one of said areas, each line corresponding in length and position to a row segment in the selected area as determined by the data stored in said tabular data storage means.

12. Apparatus as set forth in claim 9 further including labeling means operable to display on said coordinate grid, in any selected one of said areas, an area labeling symbol corresponding to the zone number assigned to the row segments in that area.

13. Apparatus as set forth in claim 9, wherein said labeling means includes positioning means for determining the point in each selected area where the labeling symbol is to be displayed.

14. Apparatus for causing patterns of visible symbols representing binary data bit arrays to be displayed in arbitrarily bounded disjoint areas of an outline design positioned upon an assumed coordinate grid, said apparatus comprising:

pattern storage means for storing a plurality of bit arrays from which arbitrary patterns of visible symbols can be generated, each of said arrays being identified by an individual pattern designation, tabular data storage means for storing area designations respectively identifying the disjoint areas of said design along with other data denoting the various positions of said assumed coordinate grid which are located within each of said areas, data assembling means having variable locations therein corresponding respectively to the disjoint areas of said design and capable of storing bit arrays from which symbol displays are to be generated, selecting means operable in conjunction with said pattern storage means, said tabular data storage means and said data assembling means for establishing an operative interrelationship between any selected pattern designation and any selected area designation within said data assembling means, whereby said data assembling means is caused to assemble a composite bit pattern composed of various bit arrays stored in locations therein corresponding to various disjoint areas of said design, and display means for causing a symbol pattern corresponding to the bit pattern stored in said data assembling means to be displayed upon said coordinate grid.

15. In a data processing system having a graphic display means, apparatus for developing a graphic display in which symbols representing arbitrarily selected design features are displayed in arbitrarily bounded areas of a given outline design positioned upon an assumed coordinate grid, said apparatus comprising:

first storage means for storing data representing the coordinate grid positions of points on the boundaries of the respective areas in the given outline design;

second storage means for storing data representing selectable design features that can be incorporated as desired in the respective areas of the outline design;

scanning means for analyzing the data stored in said first storage means to determine which of the coordinate grid positions lie within each of said areas, said scanning means including:

third storage means responsive to the contents of said first storage means for storing data representations symbolically identifying the locations of the constituent design areas on the coordinate grid, and fourth storage means for storing representations of the respective set of coordinate grid positions located within each of the areas identified by one of the area symbols in said third storage means;

and display selecting means operable in response to the arbitrary selection of an area symbol stored in said third storage means and the arbitrary selection of a design feature stored in said second storage means to produce in the corresponding area of the displayed design a display of the corresponding design feature, said display selecting means including:

data coordinating means responsive to the selections of the design feature and the area symbol and to the contents of said fourth storage means for causing a representation of the selected design feature to be manifested among the grid positions corresponding to the selected area symbol.

16. A method of operating a data processing system having data storage means and visual data manifesting means for graphically developing a textile weave design from an outline design composed of arbitrarily bounded areas, said method comprising the steps of:

operating a portion of said storage means as a weave memory (WM) for storing a plurality of arbitrary weave patterns each represented by a distinctive array of stored bits, each of said weave patterns being available for inclusion in any of said areas;

operating a portion of said storage means as an area data table (SM) for storing symbolic designations of the various areas in association with data denoting the relative positions of points on the boundaries of such areas;

supplying input data to said system for selecting weave patterns from said weave memory and for designating the respective areas of the weave design in which such patterns are to appear;

operating a portion of said storage means as a woven area memory (WAM) in response to said input data and under control of the data stored in said weave memory and area data table to form a design array in which the bits of each selected weave pattern are positioned within the part of said design array that corresponds to the area or areas designated to receive such pattern but are excluded from other parts of said array; and manifesting in said data manifesting means a visual presentation of weave pattern bits stored in said design array.

17. A weave designing method as set forth in claim 16 wherein the exclusion of the selected weave pattern bits from parts of the design array in which they are not wanted is accomplished in each instance by masking all parts of the array other than the part or parts thereof corresponding to the chosen area designation.

18. A method of graphically developing a textile weave design from an outline design displayed upon an assumed coordinate grid by operating a data processing system having data storage means and graphic data display means to display arbitrary weave patterns within arbitrarily bounded areas of said outline design, said method comprising the steps of:

operating a portion of said storage means as a weave memory (WM) for assembling stored bits in coordinate arrays representing a plurality of available weave patterns, each having a distinctive arrangement of warp and weft thread crossings;

operating a portion of said storage means as an area data table (SM) to store entries designating the positions, if any, in each row of said assumed coordinate grid which are located within each of the bounded areas of said outline design;

entering into said system data for selecting which of the weave patterns are to be displayed and the respective areas of the design which they are to be displayed;

operating a portion of said storage means as a pattern store (PR) for making the bits of each selected weave pattern available for display throughout the various positions in at least same of the rows of said coordinate grid; and operating said display means in accordance with the data stored respectively in said pattern store and said area data table to display in at least some of the rows of said coordinate grid, but only in the positions thereof located within the selected area or areas of said design, graphic symbols representing the thread crossings of each selected weave pattern, excluding from such display any bits of the selected pattern whose symbols would lie outside of the area or areas designated to receive that pattern.

19. A weave designing method as set forth in claim 18 wherein each stored weave pattern bit representing a warp-over-weft thread crossing is displayed as an illuminated point, with no symbols being displayed for any of the weft-over-warp thread crossings.

20. A weave designing method as set forth in claim 18 wherein each weave pattern bit representing a warp-over-weft thread crossing is displayed as a short vertical line, and each weave pattern bit representing a weft-over-warp thread crossing is displayed as a short horizontal line.

21. A weave designing method as set forth in claim 18 which includes the additional steps of:

discontinuing the display of a particular weave pattern within a selected area; and thereafter displaying a different weave pattern within said area.

22. A weave designing method as set forth in claim 18 which includes the additional steps of:

discontinuing the display of any selected warp-over-weft or weft-over-warp thread crossing within a selected area; and replacing the discontinued thread crossing display with a display of the inverse thread crossing.

23. A method of graphically developing a textile weave design by operating a data processing system having information storage means and a graphic data display means to form a display of arbitrary weave patterns positioned selectively within arbitrarily bounded areas of an outline design, said method comprising the steps of:

operating a portion of said storage means as a weave memory (WM) for storing bits arranged in coordinate arrays respectively representing a plurality of available weave patterns, each pattern having a distinctive arrangement of warp and weft thread crossings;

operating a portion of said storage means as an outline memory (OM) for storing bits arranged in successive rows of a first coordinate array to represent those points on the area boundaries which are positioned in corresponding rows of an assumed coordinate grid;

operating said display means under control of said outline memory for displaying said boundary points as guides for the placement of weave patterns within the respective areas defined by the displayed boundary points;

supplying input data to said system for selecting any of said areas to receive a display of a weave pattern and for selecting the weave pattern to be stored therein;

operating a portion of said storage means as an area data table (SM), in response to data stored in said outline memory, to store data establishing for each row the number of coordinate grid positions intervening between the respective area boundary points in that row;

operating a portion of said storage means as a woven area memory (WAM), in response to said input data and under control of the data stored in said weave memory and area data table, for storing in each row of a second coordinate array, between positions therein respectively representing the points, if any, at which the boundary of a selected area crosses the corresponding row of said assumed coordinate grid, pattern bits from the corresponding row of the selected weave pattern array, excluding such pattern bits from any other portion of that row in said second coordinate array; and operating said display means under control of the data stored in said woven area memory for displaying thread crossing representations which correspond to weave pattern bits in said second coordinate array.

24. A method of operating a data processing system having data storage means, graphic data input means and display means for graphically analyzing an outline design composed of arbitrarily bounded areas positioned upon an assumed coordinate grid and designating which of the coordinate grid points are contained within each of said areas, said method comprising the steps of:

operating a portion of said storage means as an outline memory (OM) for storing a coordinate array of bits relatively positioned in a manner corresponding to the arrangement of points in said assumed coordinate grid, some bits of said array representing grid points on the boundaries of the respective areas, and other bits of said array representing grid points in the spaces between such boundaries; each row of said array containing one or more segments, the length of each segment being limited at each end thereof by a boundary bit or an end of its respective row and containing one or more space bits, no two of which are separated by a boundary bit; and operating a portion of said storage means as a scan memory (SM) under the control of the data stored in said outline memory and in accordance with a predetermined scanning procedure for applying to each of said row segments a designation which collectively identifies the set of bits contained in that segment and in all other segments so identified, said scanning procedure including the following steps:

scanning row by row through said array, and bit by bit through each row, to count the number of bits in each of said row segments;

assigning successive zone numbers to the respective segments of an initially scanned row;

then, for each succeeding row of the array, assigning zone numbers to the respective segments thereof in accordance with the following rules:

(a) if in a row segment currently being considered, and to which no zone number yet has been assigned, there is a space bit positioned in an adjoining relationship to a space bit in the next previous row, then assign to the current row segment the same zone number as that given to the previous row segment containing the last-mentioned space bit;

(b) if none of the space bits in the row segment currently being considered is positioned in an adjoining relationship to a space bit in the next previous row, then assign to the current row segment the next available zone number not previously assigned to any other row segment; and forming in said scan memory a table of the zone numbers respectively assigned to the various row segments together with the number of bit positions contained in each of said segments, the entries in said table being arranged in the same order as that in which the respective row segments have been considered, identical zone numbers indicating a plurality of row segments in the same area.

25. A graphical design analyzing method as set forth in claim 24, further comprising the step of detecting the equivalency of different zone numbers assigned to segments in the same area, according to the following additional rule:

(c) If a row segment currently being considered already has received a zone number in accordance with rule (a) in claim 45, and said segment contains yet another space bit which is positioned in an adjoining relationship to a space bit in a differently numbered segment of the next previous row, then the zone numbers of these two segments are treated as equivalent for the purpose of identifying row segments located in the same area.

26. A graphical design analyzing method as set forth in claim 25, further comprising the step of converting all previous row zone numbers to the current row zone number in each instance where the rule (a) of claim 46 applies, whereby said table applies the same zone number to all of the row segments in each of the areas.

27. A graphical design analyzing method as set forth in claim 25, further including the steps of displaying on said display means a representation of said outline design, and at least momentarily displaying on said display means a plurality of parallel lines each corresponiing in length and position to a respective one of the row segments in a selected one of said areas, thereby causing the area in question to be identified in the design display by a group of parallel lines located within that area.

28. A graphical design analyzing method as set forth in claim 25, further comprising the step of operating said display means for displaying a representation of said outline design having within each of its bonded areas a labeling symbol that is uniquely related to a zone number identifying the row segments in that area.

29. A graphical design analyzing method as set forth in claim 28 wherein the symbols selected as area labels correspond respectively to the zone numbers of the respective areas.

30. A graphical design analyzing method as set forth in claim 28, including the additional steps of:

selecting in each area one of the row segments that is not exceeded in length by any other row segment in that area, and causing the label for that area to be displayed at a location on said display means which corresponds to a predetermined point in the selected row segment.

31. A method of operating a data processing system having a data storage means and a graphic data display means to develop a design of binary data-representing symbols from an outline design displayed upon an assumed coordinate grid by said display means, the developed design consisting of arbitrary patterns of said symbols arranged in arbitrarily bounded areas of said outline design, said method comprising the steps of:

Operating a portion of said storage means as a multiple pattern memory for storing bits arranged in various coordinate arrays to represent a plurality of available symbol patterns;

operating a portion of said storage means as an area data table for storing data to designate those bit positions of said assumed coordinate grid which are located within each of said areas;

entering into said system certain selection data for selecting which of the symbol patterns is to be displayed in each of the areas of said design;

operating a portion of said storage means as a single pattern store in response to said pattern selection data, and under the control of the data stored in said weave memory, for making the bits of each selected pattern tentatively available for inclusion in the several areas of said design; and operating said display means under the control of the data stored in said single pattern store and in response to said area selection data to display in each selected design area the symbols corresponding to the selected pattern, excluding from such display any symbols of the pattern stored in said single pattern store that would fall outside of the selected area in each instance.

32. A method of selectively displaying symbol patterns as set forth in claim 31, which further includes the steps of:

assigning distinctive designations to the respective symbol patterns, assigning distinctive designations to the respective areas, and interrelating the pattern designations with the area designations in a selected manner to determine which of the patterns will be displayed in each of the selected areas.

33. A method of selectively displaying data patterns as set forth in claim 31, further comprising the steps of:

operating said display means to remove from the display any of the symbols therein which are designated by said area selection data and said area data table as being located within a selected one of said areas, and in response to said pattern selection data and under control of said area data table, replacing the removed symbols with other symbols representing a pattern different from the pattern that was represented by the removed symbols.

34. A method of selectively displaying data patterns as set forth in claim 31, further comprising the step of altering any selected one of the symbols which is being displayed and its corresponding bit in storage.

35. A method of operating a data processing system having data storage means and display means to develop a textile weave design from an outline design having a plurality of arbitrarily bounded areas displayed upon an assumed coordinate grid, said method comprising the steps of:

operating a portion of said storage means as a weave memory (WM) for storing a plurality of available weave patterns, each having a distinctive arrangement of warp and weft thread crossings;

operating a portion of said storage means as an area data table (SM) to store data for designating which positions of said coordinate grid are located within each of said areas;

entering selection data into said system for designating which of said weave patterns are selected and the respective areas of said design that are selected to receive them;

operating a portion of said storage means as a pattern store in response to each selection of a weave pattern, and under the control of the data stored in said weave memory, for making the bits of the selected pattern tentatively available for inclusion in several areas of said design;

operating a portion of said storage means as a woven area memory (WAM) in response to each area selection, and under control of the data currently stored in said pattern store and in said area data table, for arranging the bits of each selected weave pattern in a location corresponding to each of the areas selected to receive such pattern, while excluding such bits from other locations of said woven area memory; and manifesting a weave design composed of symbols representing the bits assembled in said woven area memory.

36. A method of operating a data processing system having a memory and a graphic display means for developing a display in which symbols representing arbitrarily selected design features are displayed in arbitrarily bounded areas of a given outline design positioned upon an assumed coordinate grid, said method comprising the steps of:

operating a portion of said memory as a first storage means for storing data representing the coordinate grid positions of points on the boundaries of the respective areas in the given design;

operating another portion of said memory as a second storage means for storing data representing selectable design features that can be incorporated as desired in the respective areas of the outline design;

operating still another portion of said memory as a third storage means in response to data stored in said first storage means for storing area identification data whereby the set of coordinate grid positions located within each of said areas is identified by a unique area symbol;

entering selection data into said system for designating which selected one of the design features stored in said second storage means is to be included in each of one or more areas of said outline design represented by a selected area symbol or symbols; and operating said display means in response to said selection data and said area identification data for causing a representation of each selected design feature to be displayed among the coordinate grid positions coresponding to the selected area symbol in each case.

References Cited

UNITED STATES PATENTS

| | | | |
|---|---|---|---|
| 3,248,705 | 4/1966 | Dammann et al. ---- | 340—172.5 |
| 3,332,071 | 7/1967 | Goldman et al. ---- | 340—172.5 |
| 3,346,853 | 10/1967 | Koster et al. ------ | 340—172.5 |
| 3,391,392 | 7/1968 | Doyle ----------- | 340—172.5 |
| 3,408,485 | 10/1968 | Scott et al. | |

OTHER REFERENCES

Lourie et al., "On-line textile designing," Proceedings of A.C.M., Sept. 1, 1966.

PAUL J. HENON, Primary Examiner

U.S. Cl. X.R.

139—317

PO-1050
(5/69)

UNITED STATES PATENT OFFICE
CERTIFICATE OF CORRECTION

Patent No. 3,529,298 Dated September 15, 1970

Inventor(s) Janice Richmond Lourie

It is certified that error appears in the above-identified patent and that said Letters Patent are hereby corrected as shown below:

Column 51, line 73: "45" should read --24--.
Column 52, line 8: "46" should read --25--.

Signed and sealed this 11th day of May 1971.

(SEAL)
Attest:

EDWARD M.FLETCHER,JR.
Attesting Officer

WILLIAM E. SCHUYLER, JR.
Commissioner of Patents